United States Patent
Mitsuya et al.

(10) Patent No.: US 8,525,904 B2
(45) Date of Patent: Sep. 3, 2013

(54) IMAGE PROCESSING DEVICE, IMAGE PROCESSING METHOD, AND CAPTURING DEVICE

(75) Inventors: Koji Mitsuya, Tokyo (JP); Tohru Kurata, Saitama (JP)

(73) Assignee: Sony Corporation (JP)

( * ) Notice: Subject to any disclaimer, the term of this patent is extended or adjusted under 35 U.S.C. 154(b) by 639 days.

(21) Appl. No.: 12/657,990

(22) Filed: Jan. 29, 2010

(65) Prior Publication Data

US 2010/0201828 A1   Aug. 12, 2010

(30) Foreign Application Priority Data

Feb. 6, 2009   (JP) .................................. 2009-025540

(51) Int. Cl.
*H04N 5/217*   (2011.01)
(52) U.S. Cl.
USPC .......................................................... 348/241
(58) Field of Classification Search
USPC .................. 348/362, 208.99, 302, 222.1, 241, 348/218.1, 248, 249, 208.6, 340; 382/167
See application file for complete search history.

(56) References Cited

U.S. PATENT DOCUMENTS

| 6,778,210 | B1 | 8/2004 | Sugahara et al. |
| 7,190,845 | B2 * | 3/2007 | Iida ............................... 382/274 |
| 7,791,655 | B2 * | 9/2010 | Makino et al. ............... 348/251 |
| 7,865,031 | B2 * | 1/2011 | Bushell et al. .............. 382/274 |
| 2008/0111903 | A1 * | 5/2008 | Makino et al. .............. 348/302 |

FOREIGN PATENT DOCUMENTS

| JP | 2000-299874 A | 10/2000 |
| JP | 2001-086398 A | 8/2002 |
| JP | 2006-135805 A | 5/2006 |

* cited by examiner

*Primary Examiner* — Tuan Ho
*Assistant Examiner* — Ahmed A Berhan
(74) *Attorney, Agent, or Firm* — Lerner, David, Littenberg, Krumholz & Mentlik, LLP

(57) ABSTRACT

A process output image generator generates one sheet of a process output image by performing a process using plural sheets of captured images sequentially output from a pickup device in consideration of one of the plural sheets of captured images as a reference image. A deterioration corrector corrects the image deterioration occurring in the captured images by an optical pickup system, with respect to the captured images in a front end of the process output image generator. A controller can control whether to perform the correction in the deterioration corrector for one sheet of the captured images, and controls to perform the correction with respect to at least the reference image among the plural sheets of captured images.

1 Claim, 35 Drawing Sheets

| 250 | 201 | 114 | 85 | 60 | 41 | 30 | 25 | 29 |
|---|---|---|---|---|---|---|---|---|
| 261 | 200 | 119 | 58 | 50 | 40 | 17 | 10 | 20 |
| 249 | 150 | 100 | 60 | 45 | 22 | 10 | 7 | 11 |
| 231 | 111 | 70 | 50 | 30 | 21 | 11 | 15 | 18 |
| 200 | 190 | 210 | 69 | 40 | 30 | 20 | 18 | 19 |
| 190 | 150 | 121 | 109 | 72 | 50 | 31 | 30 | 33 |
| 210 | 210 | 150 | 120 | 100 | 80 | 61 | 60 | 65 |
| 310 | 300 | 200 | 120 | 102 | 101 | 80 | 70 | 90 |
| 312 | 311 | 290 | 270 | 270 | 220 | 120 | 119 | 120 |

FIG. 18

(EQUATION 3) AFFINE TRANSFORMATION $$\begin{bmatrix} v \\ w \end{bmatrix} = \begin{bmatrix} a & b & c \\ d & e & f \end{bmatrix} \begin{bmatrix} x \\ y \\ 1 \end{bmatrix} = \begin{bmatrix} a \cdot x + b \cdot y + c \\ d \cdot x + e \cdot y + f \end{bmatrix}$$

FIG. 19

(EQUATION 4)
APPLY LEAST SQUARE METHOD FOR AFFINE TRANSFORMATION 1

$$V_n = \begin{bmatrix} a & b & c \\ d & e & f \end{bmatrix} \begin{bmatrix} x_n \\ y_n \\ 1 \end{bmatrix}$$

$$\varepsilon_n^2 = \left| V_n - \begin{bmatrix} v_n \\ w_n \end{bmatrix} \right|^2$$

$$\varepsilon^2 = \sum \varepsilon_n^2$$

$$= \sum \{(a \cdot x_n + b \cdot y_n + c - v_n)^2 + (d \cdot x_n + e \cdot y_n + f - w_n)^2\}$$

WHERE, $x_n$ = HORIZONTAL COMPONENT OF CENTER COORDINATES OF RESPECTIVE BLOCK n
$y_n$ = VERTICAL COMPONENT OF CENTER COORDINATES OF RESPECTIVE BLOCK n
$v_n$ = HORIZONTAL COMPONENT OF MOTION VECTOR OF RESPECTIVE BLOCK n
$w_n$ = VERTICAL COMPONENT OF MOTION VECTOR OF RESPECTIVE BLOCK n
$V_n$ = THEORETICAL VECTOR IN RESPECTIVE BLOCK n OBTAINED FROM AFFINE TRANSFORMATION
$\varepsilon_n$ = ERROR (I.E. DISTANCE) BETWEEN MOTION VECTOR AND THEORETICAL VECTOR IN RESPECTIVE BLOCK n
$\varepsilon$ = TOTAL SUM OF $\varepsilon_n$

| (EQUATION 5) EXTENDED EQUATION OF AFFINE TRANSFORMATION |
|---|
| $\begin{bmatrix} v \\ w \end{bmatrix} = \begin{bmatrix} p0 \cdot x + q0 \cdot y + r0 & p1 \cdot x + q1 \cdot y + r1 & c \\ p2 \cdot x + q2 \cdot y + r2 & p3 \cdot x + q3 \cdot y + r3 & f \end{bmatrix} \begin{bmatrix} x \\ y \\ 1 \end{bmatrix}$ |

FIG. 23

(EQUATION 6) EXTENDED AFFINE TRANSFORMATION

$$\begin{bmatrix} v \\ w \end{bmatrix} = \begin{bmatrix} a & b & c & d & e & f \\ g & h & i & j & k & l \end{bmatrix} \begin{bmatrix} x^2 \\ xy \\ y^2 \\ x \\ y \\ 1 \end{bmatrix}$$

$$= \begin{bmatrix} a \cdot x^2 + b \cdot xy + c \cdot y^2 + d \cdot x + e \cdot y + f \\ g \cdot x^2 + h \cdot xy + i \cdot y^2 + j \cdot x + k \cdot y + l \end{bmatrix}$$

FIG. 24

(EQUATION 7) SOLUTION 1 OF LEAST SQUARE METHOD FOR EXTENDED AFFINE TRANSFORMATION

$$a = \frac{V0 \cdot C1 - V1 \cdot C0}{A0 \cdot C1 - A1 \cdot C0}$$

$$b = \frac{W0 \cdot D1 - W1 \cdot D0}{B0 \cdot D1 - B1 \cdot D0}$$

$$c = \frac{V0 \cdot A1 - V1 \cdot A0}{A1 \cdot C0 - A0 \cdot C1}$$

$$d = \frac{W0 \cdot B1 - W1 \cdot B0}{B1 \cdot D0 - B0 \cdot D1}$$

FIG. 25

(EQUATION 8) SOLUTION 2 OF LEAST SQUARE METHOD FOR EXTENDED AFFINE TRANSFORMATION $$e = \frac{1}{xy \cdot y - x \cdot y2} \{(x2y \cdot x - x3 \cdot y)a + (xy2 \cdot x - x2y \cdot y)b + (x \cdot y3 - xy2 \cdot y)c + (xy \cdot x - x2 \cdot y)d + vx \cdot y - vy \cdot x\}$$

$$f = \frac{1}{x \cdot y2 - xy \cdot y} \{(x2y \cdot xy - x3 \cdot y2)a + (xy2 \cdot xy - x2y \cdot y2)b + (xy \cdot y3 - xy2 \cdot y2)c + ((xy)^2 - x2 \cdot y2)d + vx \cdot y2 - vy \cdot vx\}$$

(g, h, i, j, k, AND l REPLACE v OF EQUATIONS OF a, b, c, d, e, AND f WITH w)

FIG. 26

(EQUATION 9) SOLUTION 3 OF LEAST SQUARE METHOD
FOR EXTENDED AFFINE TRANSFORMATION

WHERE,

| | |
|---|---|
| t0 | $R2 \cdot S3 - R3 \cdot S2$ |
| t1 | $P2 \cdot S3 - P3 \cdot S3$ |
| t2 | $Q2 \cdot S3 - Q3 \cdot S3$ |
| t3 | $T2 \cdot S3 - T3 \cdot S3$ |
| t4 | $R0 \cdot S3 - R3 \cdot S0$ |
| t5 | $R1 \cdot S3 - R3 \cdot S1$ |
| t6 | $Q2 \cdot P3 - Q3 \cdot P2$ |
| t7 | $R2 \cdot P3 - R3 \cdot P2$ |
| t8 | $S2 \cdot P3 - S3 \cdot P2$ |
| t9 | $T2 \cdot P3 - T3 \cdot P2$ |
| t10 | $Q0 \cdot P3 - Q3 \cdot P0$ |
| t11 | $Q1 \cdot P3 - Q3 \cdot P1$ |
| | |
| A0 | $t0 (P0 \cdot S3 - P3 \cdot S0) - t4 \cdot t1$ |
| C0 | $t0 (Q0 \cdot S3 - Q3 \cdot S0) - t4 \cdot t2$ |
| V0 | $t0 (T0 \cdot S3 - T3 \cdot S0) - t4 \cdot t3$ |
| | |
| A1 | $t0 (P1 \cdot S3 - P3 \cdot S1) - t5 \cdot t1$ |
| C1 | $t0 (Q1 \cdot S3 - Q3 \cdot S1) - t5 \cdot t2$ |
| V1 | $t0 (T1 \cdot S3 - T3 \cdot S1) - t5 \cdot t3$ |
| | |
| B0 | $t6 (R0 \cdot P3 - R3 \cdot S0) - t10 \cdot t7$ |
| D0 | $t6 (S0 \cdot P3 - S3 \cdot S0) - t10 \cdot t8$ |
| W0 | $t6 (T0 \cdot P3 - T3 \cdot S0) - t10 \cdot t9$ |
| | |
| B1 | $t6 (R1 \cdot P3 - R3 \cdot P1) - t11 \cdot t7$ |
| D1 | $t6 (S1 \cdot P3 - S3 \cdot P1) - t11 \cdot t8$ |
| W1 | $t6 (T1 \cdot P3 - T3 \cdot P1) - t11 \cdot t9$ |

FIG. 27

(EQUATION 10) SOLUTION 4 OF LEAST SQUARE METHOD FOR EXTENDED AFFINE TRANSFORMATION $t12 = n \cdot y2 - y \cdot y$
$t13 = n \cdot x2y - x2 \cdot y$
$t14 = n \cdot y3 - y2 \cdot y$
$t15 = n \cdot xy2 - xy \cdot y$
$t16 = n \cdot xy - x \cdot y$
$t17 = n \cdot vy - v \cdot y$
$t18 = n \cdot wy - w \cdot y$ $P0 = t12 \ (n \cdot x4 - x2 \cdot x2 - t13 \cdot t13$
$Q0 = t12 \ (n \cdot x2y2 - x2 \cdot y2 - t13 \cdot t14$
$R0 = t12 \ (n \cdot x3y - x2 \cdot xy - t13 \cdot t15$
$S0 = t12 \ (n \cdot x3 - x2 \cdot x - t13 \cdot t16$
$T0 = t12 \ (n \cdot vx2 - x2 \cdot v - t13 \cdot t17$ $P1 = t12 \ (n \cdot x2y2 - y2 \cdot x2 - t14 \cdot t13$
$Q1 = t12 \ (n \cdot x4 - y2 \cdot y2 - t14 \cdot t14$
$R1 = t12 \ (n \cdot xy3 - y2 \cdot xy - t14 \cdot t15$
$S1 = t12 \ (n \cdot xy2 - y2 \cdot x - t14 \cdot t16$
$T1 = t12 \ (n \cdot vy2 - y2 \cdot v - t14 \cdot t17$ $P2 = t12 \ (n \cdot x3y - xy \cdot x2 - t15 \cdot t13$
$Q2 = t12 \ (n \cdot xy3 - xy \cdot y2 - t15 \cdot t14$
$R2 = t12 \ (n \cdot x2y2 - xy \cdot xy - t15 \cdot t15$
$S2 = t12 \ (n \cdot x2y - xy \cdot x - t15 \cdot t16$
$T2 = t12 \ (n \cdot vxy - xy \cdot v - t15 \cdot t17$ $P3 = t12 \ (n \cdot x3 - x \cdot x2 - t16 \cdot t13$
$Q3 = t12 \ (n \cdot xy2 - x \cdot y2 - t16 \cdot t14$
$R3 = t12 \ (n \cdot x2y - x \cdot xy - t16 \cdot t15$
$S3 = t12 \ (n \cdot y2 - x \cdot x - t16 \cdot t16$
$T3 = t12 \ (n \cdot vx - x \cdot v - t16 \cdot t17$

FIG. 28

(EQUATION 11) SOLUTION 5 OF LEAST SQUARE METHOD FOR EXTENDED AFFINE TRANSFORMATION

WHERE, n = TOTAL NUMBER OF BLOCKS $x4 = \Sigma x^4$
$x3y = \Sigma x^3 y$
$x2y2 = \Sigma x^2 y^2$
$xy3 = \Sigma xy^3$
$y4 = \Sigma y^4$ $x3 = \Sigma x^3$
$x2y = \Sigma x^2 y$
$xy2 = \Sigma xy^2$
$y3 = \Sigma y^3$ $x2 = \Sigma x^2$
$xy = \Sigma xy$
$y2 = \Sigma y^2$ $x = \Sigma x$
$y = \Sigma y$ $vx2 = \Sigma vx^2$
$vxy = \Sigma vxy$
$vy2 = \Sigma vy^2$
$vx = \Sigma vx$
$vy = \Sigma vy$
$v = \Sigma v$

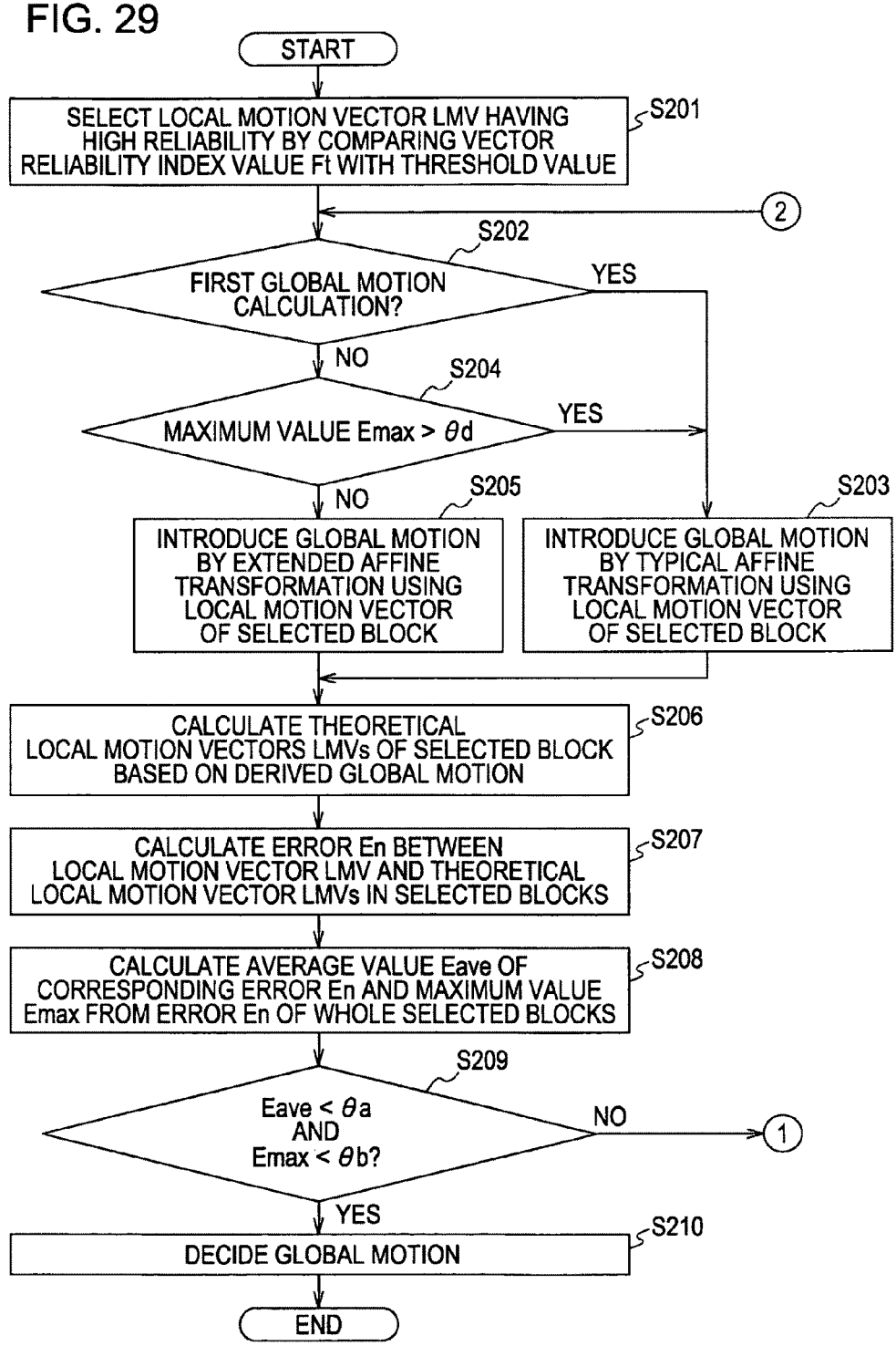

FIG. 41

| GAIN GA | HIT RATE β | ADDING RATE α (MULTIPLE) FOR STANDARD ADDING RATE $\alpha_0$ |
|---|---|---|
| 0 | 0 | 1 TIME ($\alpha = \alpha_0$) |
|  | 0.25 | 1.25 TIMES ($\alpha = \alpha_0 + 0.25\alpha_0$) |
|  | 0.5 | 1.5 TIMES ($\alpha = \alpha_0 + 0.5\alpha_0$) |
|  | 1.0 | 2 TIMES ($\alpha = \alpha_0 + \alpha_0$) |
| 1 | 0 | 1 TIME ($\alpha = \alpha_0$) |
|  | 0.25 | 1.5 TIMES ($\alpha = \alpha_0 + 0.5\alpha_0$) |
|  | 0.5 | 2 TIMES ($\alpha = \alpha_0 + \alpha_0$) |
|  | 1.0 | 3 TIMES ($\alpha = \alpha_0 + 2\alpha_0$) |
| 2 | 0 | 1 TIME ($\alpha = \alpha_0$) |
|  | 0.25 | 2 TIMES ($\alpha = \alpha_0 + \alpha_0$) |
|  | 0.5 | 3 TIMES ($\alpha = \alpha_0 + 2\alpha_0$) |
|  | 1.0 | 5 TIMES ($\alpha = \alpha_0 + 4\alpha_0$) |
| 3 | 0 | 1 TIME ($\alpha = \alpha_0$) |
|  | 0.25 | 3 TIMES ($\alpha = \alpha_0 + 2\alpha_0$) |
|  | 0.5 | 5 TIMES ($\alpha = \alpha_0 + 4\alpha_0$) |
|  | 1.0 | 9 TIMES ($\alpha = \alpha_0 + 8\alpha_0$) |

FIG. 43

| GAIN GA | HIT RATE β | STEP WIDTH |
|---|---|---|
| 0 | 0 | 8 |
|  | 0.25 | 8 |
|  | 0.5 | 8 |
|  | 1.0 | 4 |
| 1 | 0 | 8 |
|  | 0.25 | 8 |
|  | 0.5 | 4 |
|  | 1.0 | 2 |
| 2 | 0 | 8 |
|  | 0.25 | 4 |
|  | 0.5 | 2 |
|  | 1.0 | 1 |
| 3 | 0 | 8 |
|  | 0.25 | 2 |
|  | 0.5 | 1 |
|  | 1.0 | 0 |

IMAGE PROCESSING DEVICE, IMAGE PROCESSING METHOD, AND CAPTURING DEVICE

CROSS-REFERENCE TO RELATED APPLICATION

The present application claims priority from Japanese Patent Application No. JP 2009-025540 filed in the Japanese Patent Office on Feb. 6, 2009, the entire content of which is incorporated herein by reference.

BACKGROUND OF THE INVENTION

1. Field of the Invention

The present invention relates to a correction device for correcting image distortion, such as distortion aberration or chromatic aberration, produced by an optical pickup system, with respect to an image captured by a capturing element, an image processing device, an image processing method, and a capturing device.

The present invention relates to an image processing device including, for example, a processing device for creating one sheet of image from plural sheets of images captured by a capturing element, and a correction device for correcting image deterioration caused by chromatic aberration produced by an optical pickup system with respect to the captured images, an image processing method, and a capturing device.

2. Description of the Related Art

For example, in a capturing device such as a digital still camera and so on, schemes for obtaining a still image having a reduced noise in a time direction by creating one sheet of image through addition of plural sheets of captured images, have been proposed.

For example, Japanese Unexamined Patent Application Publication No. 2001-86398 discloses a sensorless vibration correction technology for still images. That is, Japanese Unexamined Patent Application Publication No. 2001-86398 discloses a method of capturing a plurality of images with a high-speed shutter operation that does not produce vibration, overlapping the captured images having low illumination, and obtaining one sheet of a still image having high illumination, in view of a vibration effect.

This technology is to reduce noise by dispersing the noise, which is a random component, through overlapping of sequentially captured images in view of noise reduction, and is closely related to a moving image frame noise reduction (NR) method. The moving image frame NR method is related to a technology overlapping a current frame on a reference frame in real time, in which the current frame and the reference frame consistently overlap one another in a 1:1 manner.

On the other hand, in the case of a still image NR, plural reference frames are typically given with respect to one sheet of a current frame. According to the still image NR method, the influence of vibration is reduced as the speed of a shutter becomes fast, and the noise reduction effect becomes large as the number of overlapping sheets of images is increased, so that high sensitivity can be expected.

A method of seeking noise reduction through overlapping plural sheets of images (hereinafter referred to as "addition NR process"), which is disclosed in Japanese Unexamined Patent Application Publication No. 2000-299874, is performed with respect to YC data (including a illumination component (Y) and a color component (C)) after a gamma correction and so on is performed, rather than a raw image from a capturing element.

Also, in a capturing device, correction of aberration occurring in an optical system is performed with respect to captured image information. A kind of aberration occurring in the optical system may be chromatic aberration of a lens. A refraction rate of a lens differs in response to wavelengths of light, i.e. colors. For this reason, focus distances differ in accordance with the wavelengths, even though the same lens is used, and thus there is a difference in size and position between images. This is called chromatic aberration.

The chromatic aberration may be divided into an axial chromatic aberration and a lateral chromatic aberration. Of these, the axial chromatic aberration causes image blurring since the focus distances of a lens differ in accordance with the wavelengths, and thus the position of an imaging plane is moved before and behind in accordance with colors.

In addition, the lateral chromatic aberration causes the magnification of an image to differ in accordance with the colors, and thus the sizes of an image on the imaging plane differ. That is, due to the lateral chromatic aberration of an image pickup lens, as illustrated in FIG. 46, optical sizes of a red component KR, a green component KG, and a blue component KB of an object OBJ, which is formed on an imaging plane PS of a capturing element, differ. As a result, for example, in the case of capturing an image of a white object, color distortion may occur, in which an edge part of its image is not white, but is dyed in rainbow colors to appear to be radially spread. The color mismatch due to the lateral chromatic aberration appears small on the optical axis of the lens, but becomes large and noticeable due to the influence of the refraction rate in a position far from the optical axis.

Diverse methods for correcting the lateral chromatic aberration with respect to image data, in addition to the correction method through study of the constitution of the optical system, have been proposed. For example, Japanese Unexamined Patent Application Publication No. 2000-299874 or Japanese Unexamined Patent Application Publication No. 2006-135805 proposes a method for correcting image deterioration caused by the lateral chromatic aberration by software.

SUMMARY OF THE INVENTION

In general, correction of image deterioration based on lateral chromatic aberration and so on is performed with respect to a captured image before a specified image process, such as an addition NR process and so on, is performed with respect to the captured image. Due to this, for example, in the case of the addition NR process, it is necessary to perform the correction of the image deterioration with respect to all the plural image frames received for the overlapping addition NR process.

However, correction of the image deterioration takes a relatively long processing time due to the large amount of computation involved, and particularly, in the case in which such correction is processed by a software program through a computer, it takes a long time to perform such correction.

The present invention has been made taking into account the above-described points, and it is desirable to correct image deterioration occurring in captured images by an optical pickup system in a relatively short processing time to obtain one sheet of output image through a specified process of plural sheets of captured images.

In order to solve the above-described problems, according to an embodiment of the invention, there is provided an image processing device, which includes a process output image generator generating one sheet of a process output image by performing a process using plural sheets of captured images sequentially output from a pickup device in consideration of one of the plural sheets of captured images as a reference image; a deterioration corrector correcting image deterioration occurring in the captured images by an optical pickup system including a pickup lens, with respect to the captured images in a front end of the process output image generator; and a controller capable of controlling whether to perform the correction in the deterioration corrector for one sheet of the captured images, and controlling to perform the correction with respect to at least the reference image among the plural sheets of captured images.

According to an embodiment of the invention, the deterioration corrector can control, under the control of the controller, whether to perform the correction for one sheet of the plural images to be processed by the process output image generator.

The deterioration corrector, under the control of the controller, performs correction of deterioration with respect to at least the reference image among the plural sheets of images to be processed by the process output image generator. In addition, the deterioration corrector is controlled by the controller not to perform the correction of deterioration with respect to at least one sheet through all of the other captured images excluding the reference image at most.

Accordingly, the correction of image deterioration is performed with respect to at least the reference image. With respect to other captured images excluding the reference image, the correction of the image deterioration is not performed. In general, captured image information excluding the reference image is not used as it is by the process output image generator, but is used to achieve the expected object with respect to the reference image. Accordingly, image deterioration somewhat remains, but the correction effect of the image deterioration can be secured to a certain extent.

On the other hand, since it is not necessary to perform the correction of deterioration through the deterioration corrector with respect to all the sheets of captured images to be processed through the process output image generator as in the related art, the correction processing time can be shortened by as much as the number of captured images of which deterioration correction is not necessary.

Accordingly, process output images securing a specified picture quality can be obtained from the process output image generator as the length of correction processing time is kept within an actually permissible range.

According to an embodiment of the invention, the process output image generator performs noise reduction in a time direction through addition of the plural sheets of captured images as it compensates for motion between the captured images, and includes an image adder that performs the addition through determination of an adding rate so that the adding rate is lowered in a part in which motion occurs.

According to an embodiment of the invention, other captured image information is added to the reference image to which the correction of image deterioration has been performed to reduce the noise. In this case, the adding rate is lowered in a part in which motion occurs.

In the case in which the correction of image deterioration is performed with respect to the reference image and no correction of image deterioration is performed with respect to other captured images, the probability that a part, in which the image deterioration is severe, is decided to be a motion occurrence part, is heightened due to a difference between both image parts, and thus its adding rate is lowered. Accordingly, the part, which is decided to be a motion occurrence part and in which the image deterioration is severe, is not added to the reference image. Thus, in a part in which the image deterioration is severe, there is a tendency that the image part of the reference image, of which correction of image deterioration has been performed, is output as it is.

According to an embodiment of the invention, the output image, to which the correction of image deterioration has been performed and which has a noise reduction effect through the addition NR process, can be obtained as the length of correction processing time is kept within an actually permissible range.

In this case, since the addition NR process is not performed with respect to a part in which the image deterioration is severe, the noise reduction effect of an image in a time direction may deteriorate. However, although the image deterioration such as the lateral chromatic aberration is likely to be seen at an edge region of the image, the image noise is difficult to see at the edge region of the image. Accordingly, even if the noise reduction effect might deteriorate, its detrimental influence would be lowered.

According to an embodiment of the invention, the length of the correction processing time is kept within an actually permissible range, and a process output image securing a specified picture quality can be obtained from the process output image generator.

BRIEF DESCRIPTION OF THE DRAWINGS

FIG. 18 is a diagram illustrating an equation used to explain a process example of obtaining a global motion from a local motion vector in an image processing device according to an embodiment of the present invention;

FIG. 19 is a diagram illustrating equations used to explain a process example of obtaining a global motion from a local motion vector in an image processing device according to an embodiment of the present invention;

FIG. 23 is a diagram illustrating an equation used to explain a process example of obtaining global motion from a local motion vector in an image processing device according to an embodiment of the present invention;

FIG. 24 is a diagram illustrating an equation used to explain a process example of obtaining global motion from a local motion vector in an image processing device according to an embodiment of the present invention;

FIG. 25 is a diagram illustrating an equation used to explain a process example of obtaining global motion from a local motion vector in an image processing device according to an embodiment of the present invention;

FIG. 26 is a diagram illustrating an equation used to explain a process example of obtaining global motion from a local motion vector in an image processing device according to an embodiment of the present invention;

FIG. 27 is a diagram illustrating an equation used to explain a process example of obtaining global motion from a local motion vector in an image processing device according to an embodiment of the present invention;

FIG. 28 is a diagram illustrating an equation used to explain a process example of obtaining global motion from a local motion vector in an image processing device according to an embodiment of the present invention;

FIG. 29 is a diagram illustrating a part of a flowchart explaining a processing operation of a global motion calculation unit in an image processing device according to an embodiment of the present invention;

FIG. 41 is a diagram illustrating an example of the configuration of an adding rate calculation unit according to an embodiment of the present invention;

FIG. 43 is a diagram illustrating an example of the configuration of an adding rate calculation unit according to an embodiment of the present invention;

DESCRIPTION OF THE PREFERRED EMBODIMENTS

Hereinafter, a case in which an image processing device and method according to embodiments of the present invention are applied to a capturing device of still images will be described with reference to the accompanying drawings.

A capturing device according to an embodiment of the present invention performs an addition NR process for reducing noise in a time direction by overlapping and adding in a time direction plural still images captured by a pickup device (i.e. imager) as matching their positions through motion compensation. That is, a process output image generator is an addition NR processor.

In addition, in the embodiment of the present invention, an image deterioration corrector becomes a lateral chromatic aberration corrector. The image deterioration corrector performs the correction of lateral chromatic aberration only with respect to a reference captured image among plural captured images necessary to perform the addition NR process, but does not perform the correction of lateral chromatic aberration with respect to other captured images.

[Example of Hardware Configuration of Capturing Device According to Embodiments of the Invention]

Figure 1:
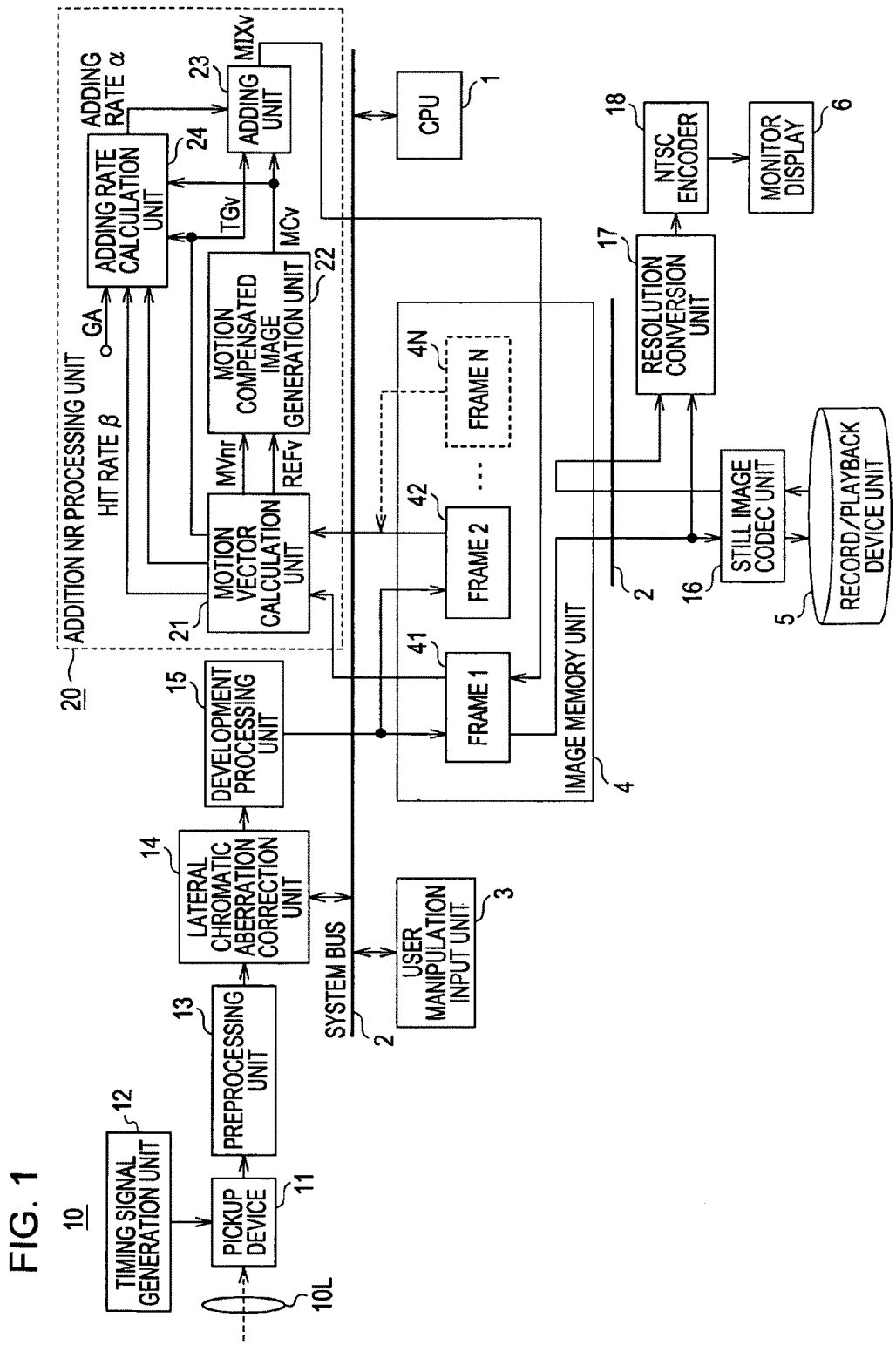
FIG. 1 is a block diagram illustrating the configuration of a capturing device to which an image processing device according to an embodiment of the present invention is applied.

FIG. 1 is a block diagram illustrating an example of a capturing device to which an image processing device according to an embodiment of the present invention.

As illustrated in FIG. 1, in a capturing device according to an embodiment of the present invention, a central processing unit (CPU) 1 is connected to a system bus 2. In addition to a system bus 2, a captured image signal processing device 10, a user manipulation input unit 3, an image memory unit 4, a record/playback device unit 5, and the like, are connected. In the description of the present invention, the CPU 1, although not illustrated in the drawing, includes a read only memory (ROM) for storing programs performing diverse software processes, a random access memory (RAM) for a working area, and the like.

The captured image signal processing system of the capturing device of FIG. 1 receives a captured image record start manipulation through the user manipulation input unit 3, and performs recording of captured image data of a still image to be described later. In addition, the capturing device of FIG. 1 receives a captured recorded image playback start manipulation through the user manipulation input unit 3, and performs playback of the captured image date recorded on a recording medium of the record/playback device unit 5.

As illustrated in FIG. 1, in the captured signal processing device 10, incident light from an object through a camera optical system (not illustrated) provided with a pickup lens 10L is irradiated onto and captured by a pickup device 11. In this embodiment, the pickup device 11 includes a charge coupled device (CCD) imager. The pickup device 11 may include a complementary metal oxide semiconductor (CMOS) imager.

According to the capturing device in this embodiment, if the pickup recording start manipulation is performed, an image input through the pickup lens 10L is converted into a captured image signal by the pickup device 11. In addition, as a signal that is synchronized with a timing signal from a timing signal generation unit 12, an analog captured signal, which is a RAW signal of a Bayer arrangement that includes three primary colors of, red (R), green (G), and blue (B), is output from the pickup device 11. The output analog captured signal is supplied to a preprocessing unit 13 to be preprocessed through defect correction or γ-correction, and then is supplied to a lateral chromatic aberration correction unit 14.

In the embodiment of the present invention, the lateral chromatic aberration correction unit 14 has a configuration as disclosed in Japanese Unexamined Patent Application Publication No. 2000-299874 or Japanese Unexamined Patent Application Publication No. 2006-135805, and the lateral chromatic correction, which is an image deterioration correction, is performed by software.

In the embodiment of the present invention, the lateral chromatic aberration correction unit 14, under the control of the CPU 1, controls whether to perform the correction for one sheet of a captured image.

In the embodiment of the present invention, the CPU 1 makes the lateral chromatic aberration correction unit 14 to control whether to perform the correction for every one sheet of a captured image in plural images overlapping one another in the addition NR process. Also, the CPU 1 controls the degree of noise reduction in a space direction in the corresponding plural sheets of images in the unit of an image group including plural sheets of images.

In the embodiment of the present invention, the CPU 1, to be described later, controls the lateral chromatic aberration correction unit 14 to perform lateral chromatic aberration correction with respect to a reference image, e.g. a first sheet of image, among the plural sheets of images overlapping one another in the addition NR process, and controls the lateral chromatic aberration correction unit 14 not to perform lateral chromatic aberration correction with respect to other images, starting from a second sheet of image.

The captured image signal (i.e. the RAW signal) resulting from the process through the lateral chromatic aberration correction unit 14 is supplied to the development processing unit 15.

The development processing unit 15 performs a demosaicing process, gamma correction, white balance control, picture quality correction or picture quality control, and the like, with respect to an analog captured signal that is the RAW signal input thereto. In addition, the development processing unit 15 converts the RAW signal of red (R), green (G), and blue (B) input thereto into a digital captured signal (i.e. YC data; YUV image) including illumination signal component Y and chrominance signal component Cb/Cr.

Plural sheets N (where, N is a natural number not less than 2) of digital captured signals to be addition-NR-processed, which are from the development processing unit 15, are written in the image memory unit 4 based on a still image pickup instruction through the user manipulation input unit 3.

That is, if a still image pickup instruction is input by pressing a shutter button as a pickup instruction through the user manipulation input unit 3, N sheets (i.e. N frames) of digital captured signals from the development processing unit 15 are written sheet by sheet in N frame memories 41 to 4N. That is, N frames of digital captured signals from the development processing unit 15, which are to overlap one another through the addition NR processing unit, are written frame by frame in first to N-th (N is the number of overlapped still image sheets) frame memories 41 to 4N of the image memory unit 4.

In this example, the first frame sheet of the image data, which is counted from the time point when the shutter button is pressed, is written in the first frame memory 41 as the image data of a target frame to be described later. Then, the data of frame images after the second sheet when counting the sheets from the point of pressing the shutter button are sequentially written in the second to N-th frame memories 42 to 4N as the image data of reference frames to be described later. In this case, the number of frames is set to N=6.

In the following description, for convenience in explanation, the first, second, . . . , and N-th image frames, which are counted from the time point when the shutter button is pressed, are simply referred to as "the first, second, . . . , and N-th image frames."

After the plural frame sheets of images are written in the image memory unit 4, the CPU 1 reads out the corresponding plural frame sheets of images from the image memory unit 4, and the addition NR processing unit 20 performs the addition NR process with respect to the read frame sheets of images.

In the embodiment of the present invention, the CPU 1, as described later, reads out first image frame and the second image frame from the image memory unit 4, and the addition NR processing unit 20 detects motion (i.e. motion vector) of both the first and second image frames. The addition NR processing unit 20 then makes the two image frames overlap each other as it compensates for the motion using the detected motion vector.

In the embodiment of the present invention, the detection of a motion vector is performed in the unit of a block of a specified size, and simultaneously it is decided whether the block corresponds to a background part of a still image or a moving object part. Specifically, the adding rate in the background part is heightened, and the adding rate in the moving object is lowered. Accordingly, by overlapping plural frames in a moving object part, the image is prevented from being in a multi-exposure image state, and a desired noise reduction effect can be obtained with respect to a background still image part.

If addition of the first and second image frames is completed, the third image frame is read out from the image memory unit 4, and the read third image frame and the image, which results from the addition of the first and second image frames, overlap each other as motion between the two frames is compensated for. After the fourth image frame, the image which results from the addition and the image frame overlap each other as motion between the frames is compensated for, in the same manner as the third image frame.

The image data MIXv resulting from the overlapping through the addition NR processing unit 20, as described hereinafter, is overwritten in the image memory unit 4. The image frame resulting from the overwriting in the image memory unit 4 is used to detect motion between the image frames to overlap. The image frame resulting from the final overlapping stored in the image memory unit 4 becomes the recorded image frame on a recording medium.

That is, the image data MIXv of the added image, which is the NR image resulting from the overlapping stored in the image memory unit 4 is supplied to a still image codec unit 16 through a system bus 2 to be codec-converted. The output data from the still image codec unit 16 is recorded, for example, on a recording medium such as a digital versatile disc (DVD), a hard disc, and the like, through a record/playback device unit 5. In the embodiment of the present invention, the still image codec unit 16 performs image compression encoding of a JPEG (Joint Photographic Experts Group) type still image.

In the still image pickup mode, before the shutter button is pressed, the image data from the development processing unit 5 is supplied to a resolution conversion unit through the image memory unit 4. The image data is converted into image data having a specified resolution in the resolution conversion unit 17, and then supplied to an NTSC (National Television System Committee) encoder 18. In the NTSC encoder 18, the image data is converted into an NTSC type standard color image signal, and then is supplied to a monitor display 6 which includes, for example, a liquid crystal display (LCD). On the display screen of the monitor display 6, a monitor image in a still image pickup mode is displayed.

The image data of the still image recorded on the recording medium of the record/playback device unit 5 is read out in accordance with the playback start manipulation through the user manipulation input unit 3, and is supplied to the still image codec unit 16 to be playback decoded. In addition, the image data of the playback decoded still image is supplied to the NTSC encoder 18 through a buffer memory (not illustrated) of the image memory unit 4 and the resolution conversion unit 17. The image data, which has been converted into the NTSC type standard color image signal through the NTSC encoder 18, is supplied to the monitor display 6, so that the playback image is displayed on the display screen.

Although not illustrated in FIG. 1, the output image signal from the NTSC encoder 18 can be derived to an outside through an image output terminal.

In the embodiment of the present invention, the image data is compressed by the still image codec unit 16 to be recorded. However, the still image codec unit 16 may be omitted, and the image data may be recorded without being compressed.

[Example of Configuration of the Lateral Chromatic Aberration Correction Unit 14 and its Processing Operation]

Figure 2:
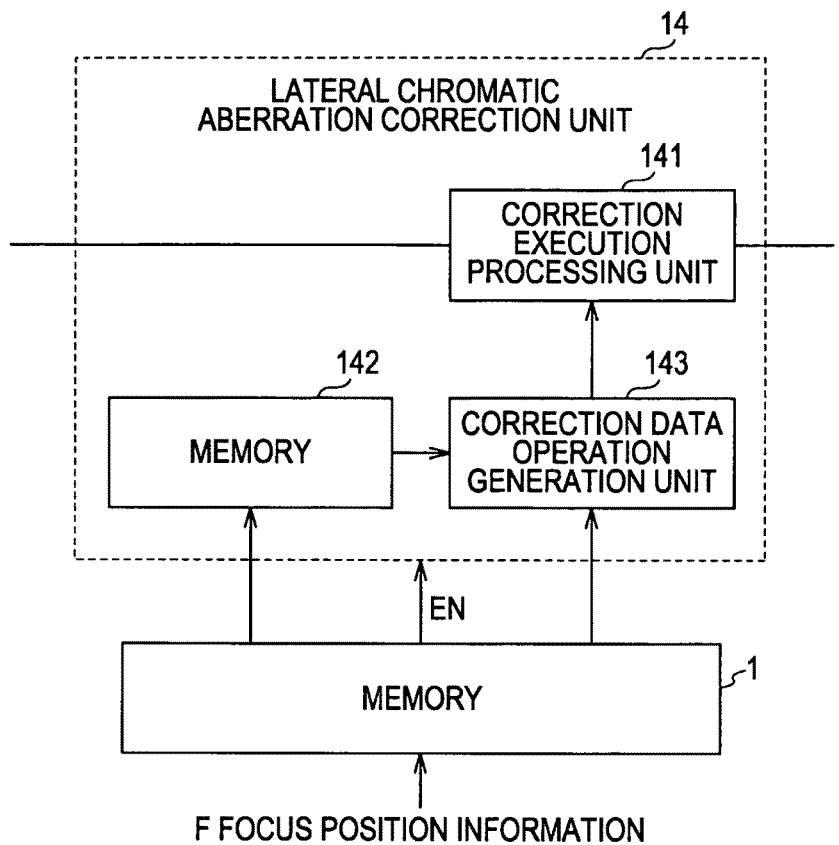
FIG. 2 is a block diagram illustrating an example of the configuration of a lateral chromatic aberration correction unit in an image processing device according to an embodiment of the present invention.

FIG. 2 is a block diagram illustrating an example of the configuration of a lateral chromatic aberration correction unit 14 according to an embodiment of the present invention. An example of the lateral chromatic aberration correction unit 14 uses the method disclosed in Japanese Unexamined Patent Application Publication No. 2000-299874. The principle of the method disclosed in Japanese Unexamined Patent Application Publication No. 2000-299874 is as follows.

Figure 3:
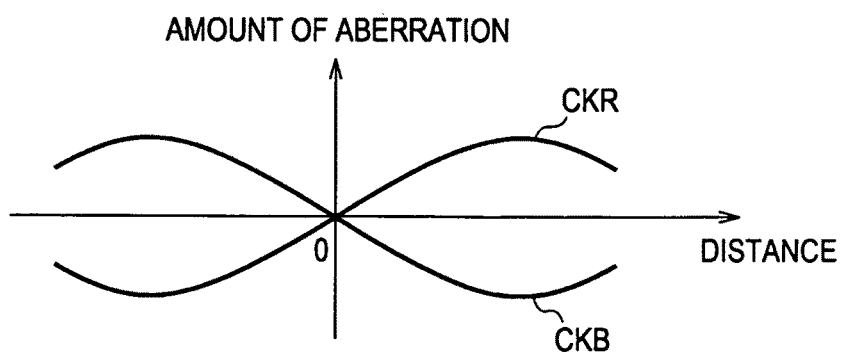
FIG. 3 is a diagram illustrating the characteristic of lateral chromatic aberration.

In a captured image, as illustrated in FIG. 3, chromatic aberration, which has a size indicated by a characteristic curve that approximates a third-order curve having a distance from a center position (i.e. O point) of the screen as its variable, is generated. FIG. 3 shows aberration amounts of red and blue colors based on a green color. In FIG. 3, the aberration amount of a red color is indicated by a characteristic curve CKR, and the aberration amount of a blue color is indicated by a characteristic curve CKB.

Accordingly, the correction of the lateral chromatic aberration of the captured image is performed in a manner that the aberration amounts of red and blue colors based on a green color, in accordance with the distance from the screen center O of a corresponding pixel, are obtained from the characteristic curves CKR and CKB in FIG. 3, and the correction process is performed in accordance with the obtained aberration amounts. However, the chromatic aberration characteristic of a lens is changed in accordance with the focus position even in the same lens. Accordingly, in the method of Japanese Unexamined Patent Application Publication No. 2000-299874, data of the chromatic aberration characteristic curves CKR and CKB for each focus position is generated from the captured image information obtained by picturing, and the correction of the chromatic aberration is performed based on the data generated for each focus position.

According to the method of Japanese Unexamined Patent Application Publication No. 2000-299874, in order to make the amount of computation as little as possible, the chromatic aberration characteristic curves CKR and CKB of red and blue colors based on a green color, in accordance with the distance from the screen center, are calculated for each focus position using only data of plural scanning lines of the screen center. Then, the correction is performed by generating data for correction of the lateral chromatic color aberration, based on information about the chromatic aberration characteristic curves CKR and CKB calculated for each focus position.

Since the details of the above-described process are described in detail in Japanese Unexamined Patent Application Publication No. 2000-299874, the description thereof will be omitted.

In the example of FIG. 2, the lateral chromatic aberration correction unit 14 is configured to include a correction execution processing unit 141, a memory 142, and a correction data operation generation unit 143.

Control signals are supplied from the CPU 1 to the respective units, and in accordance with the control signal EN from the CPU 1, the lateral chromatic aberration correction unit 14 decides whether to perform its processing operation.

In this example, although not illustrated in FIG. 1, the optical pickup system including the pickup lens 10L includes a focus mechanism, and during the pickup operation, information indicating the focus position is supplied to the CPU 1.

The CPU 1, before performing the pickup operation in an actual pickup mode, generates information about approximate equations on the chromatic aberration characteristic curves CKR and CKB in each focus position from the captured image information in advance, and stores the generated information in the memory 142.

In the pickup mode, the CPU 1 performs the following lateral chromatic aberration correction with respect to the captured image frames of which the lateral chromatic aberration correction is to be performed. On the other hand, the captured image frames, of which the lateral chromatic aberration correction is not to be performed, are supplied to the development processing unit 15, passing through the lateral chromatic aberration correction unit 14.

In the case of performing the lateral chromatic aberration correction, the CPU 1 acquires focus position information from a lens driving system, reads out the approximate equation information on the chromatic aberration characteristic curves CKR and CKB according to the focus position from the memory 142, and supplies the read-out information to the correction data operation generation unit 143.

The correction data operation generation unit 143 generates correction data from the read-out approximate equation information, and supplies the correction data to the correction execution processing unit 141.

The correction execution processing unit 141 performs the lateral chromatic aberration correction of the captured data (i.e. the raw data) from the preprocessing unit 13 by using the correction data generated by the correction data operation generation unit 142.

In the embodiment of the present invention, the correction execution processing unit 141 and the correction data operation processing unit 142 perform their operations by software under the control of the CPU 1, a dedicated microcomputer, or a DSP.

As described in the description of the related art, it is general that the lateral chromatic aberration correction unit 14 performs the correction with respect to all the captured image frames. However, in the embodiment of the present invention, the lateral chromatic aberration correction unit 14 performs the lateral chromatic aberration correction only with respect to the reference image frame among the plural image frames, of which the addition NR process is to be performed, for example, only with respect to the first captured image frame.

Figure 4:
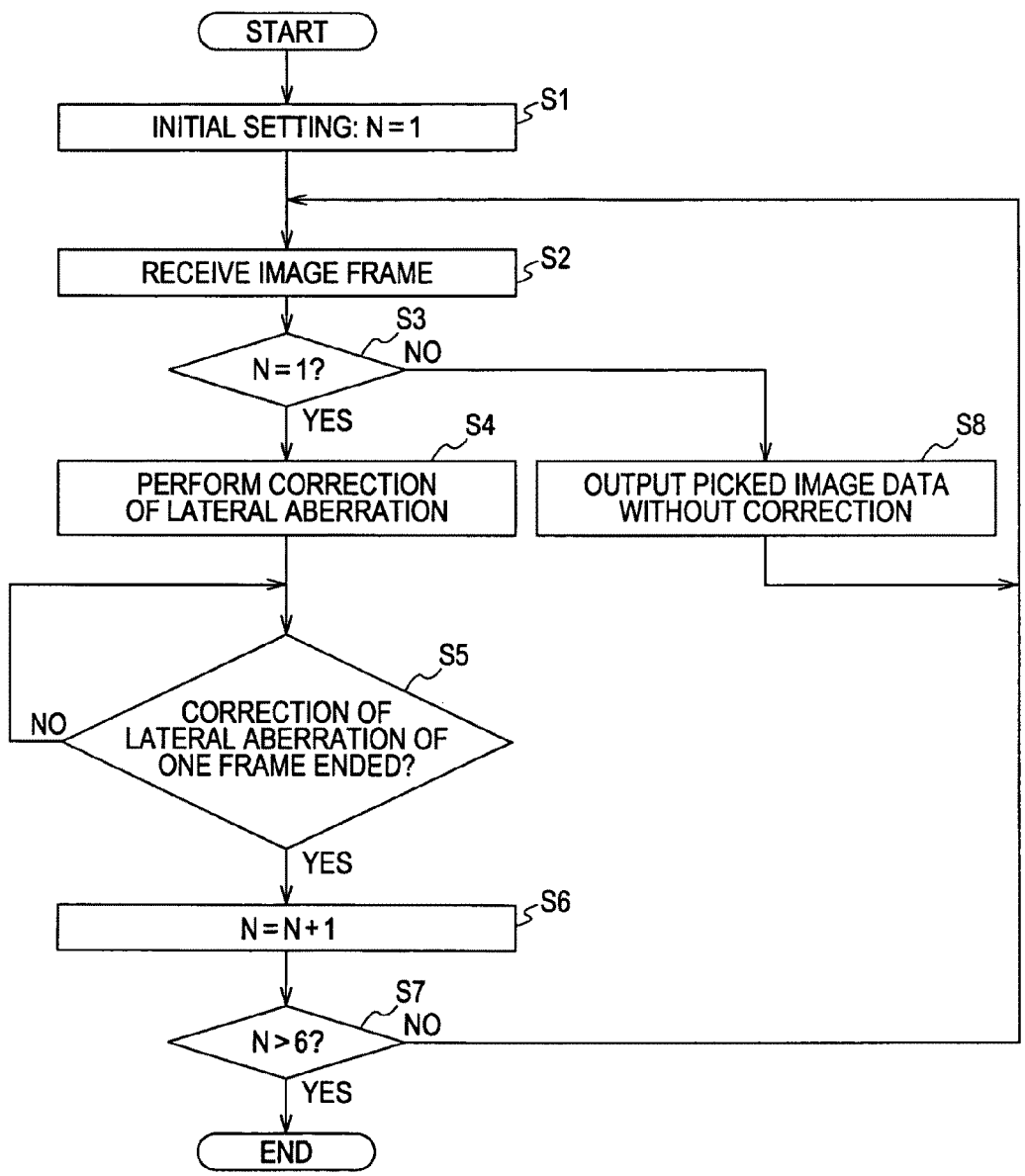
FIG. 4 is a flowchart illustrating the drive control process of a lateral chromatic aberration correction unit in an image processing device according to an embodiment of the present invention.

FIG. 4 is a flowchart illustrating the drive control process of the lateral chromatic aberration correction unit 14 that is performed by the CPU 1. In the flowchart in FIG. 4, the control operation described in the flowchart starts when the shutter button is pressed by a user and the reading of image frames from the pickup device 11 starts.

First, the CPU 1 initially sets the number of image frames N, to be received, from the pressing of the shutter button. That is, the CPU 1 sets N to 1 (step S1). Then, the CPU 1 receives image frame (i.e. raw data) from the preprocessing unit 13 (step S2), and decides whether the received image frame is the first frame, that is, N=1 (step S3).

If it is decided that the number is N=1 in step S3, the CPU 1 makes the lateral chromatic aberration correction unit 14 in a lateral chromatic aberration correction execution state (step S4).

After the step S4, the CPU 1 waits for the completion of the lateral chromatic aberration correction with respect to all pixels of frame 1 (step S5). At this time, since the CPU 1 manages the position and the number of noticed pixels to be processed in frame 1, it can decide whether the lateral chromatic aberration correction of all the pixels of frame 1 has been completed by the management data.

If it is decided that the lateral chromatic aberration correction of all the pixels of frame 1 has been completed in step S5, the CPU 1 updates the number N of image frames to be processed from the shutter button pressing by 1 to make N=N+1 (step S6). Then, the CPU 1 decides whether the number N after the update exceeds 6 (step S7), and if the number N does not exceed 6, it goes back to step S2 and receives the next image frame. Then the process after step S2 is repeated.

If it is decided that the number N after the update exceeds 6 in step S7, the CPU 1 terminates the processing routine.

On the other hand, if it is decided that the number N is not 1 in step S3, the CPU 1 does not perform the correction of the captured image data input to the lateral chromatic aberration correction unit 14, but makes the input captured image data pass through the lateral chromatic aberration correction unit 14 as it is (step S8). Then, the CPU 1 goes back to step S2, and repeats the process after step S2.

[Configuration and Processing Operation of the Addition NR Processing Unit 20]

In the embodiment of the present invention, the capturing device performs overlapping and adding of the plural still images captured by the pickup device (i.e. imager) 11 and stored in the image memory unit 4 to reduce noise in a time direction of the images.

The environment in which image pickup is performed with the capturing device held by hand is an environment in which vibration (or hand blur) is liable to occur. In the embodiment of the present invention, in the case of performing a continuous shooting of still images with the capturing device held by hand, the first captured image is called a target frame, and the second and subsequent captured images are called reference frames. Here, the reference frame is a frame to be processed, that is, a noticed frame. The target frame is a basic frame that is the basis of motion of the corresponding reference frame. In this example, the reference frame is added to the target frame as the reference frame is motion-compensated.

If it is possible to match the reference frame to the position of the target frame through performing modification, which includes parallel movement, rotation, extension, and reduction, with respect to the whole reference frame, the modification being applied to the whole reference frame corresponds to a global motion. Typically, the global motion represents movement of a background still image (hereinafter referred to as "background") of the image and the amount of movement.

Vibration (or hand blur) means the occurrence of global motion in the target frame as much as image deformation, which includes parallel movement, rotation, extension, and reduction, of the reference frame with respect to the target frame.

In the embodiment of the present invention, for simplification of explanation, the first captured sheet of still image is considered as a reference (or target frame). The global motion may be redefined by considering a certain n-th sheet of still image as a target frame and considering a certain m-th (where, n≠m) sheet of still image as a reference frame. The global motion may also be defined with respect to two sheets of frame images, which differ in time, among moving images. In addition, the global motion process may be applied to only a part of one frame image, rather than the whole effective image frame of the captured image.

Once the global motion is obtained, a motion vector can be calculated in accordance with motion being applied to the whole screen between the target frame and the reference frame at each coordinate position on the screen. Hereinafter, a motion vector according to motion being applied to the whole corresponding screen is referred to as "global motion vector." The global motion vector can be obtained with respect to plural target blocks set on the screen. The global motion vector may be obtained for each pixel.

If the global motion vector can be accurately obtained based on the global motion, vibration can be readily corrected. On the other hand, the frame images can overlap each other as the vibration is compensated for, using the global motion vector.

In the description of the present invention, the noise reduction (NR) process which is performed by overlapping plural images using the motion vector detection and motion compensation (e.g. matching of the positions of two frame images using the motion vector) is called an addition NR process. In this case, the noise-reduced image through the addition NR is called an addition NR image.

In the embodiment of the present invention, one screen is divided into plural blocks (i.e. target blocks to be described later), and a motion vector in the unit of a block is detected by a block matching method. The motion vector detected for each block by the block matching method is called a local motion vector.

In the embodiment of the present invention, the reliability index of the local motion vector is detected using correlation values in the block matching method, to be described later. In addition, the global motion is calculated from the local motion vector having a high reliability among the detected local motion vectors, and the global motion vector for each block is detected from the calculated global motion.

In the embodiment of the present invention, using the calculated global motion vector and the local motion vector LMV, it is decided whether the background image part for each block corresponds to a moving object part.

[Summary of Block Matching]

Figure 5A:
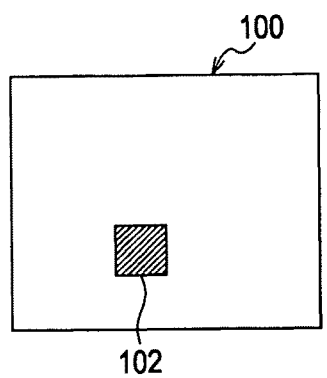
FIGS. 5A and 5B are diagrams illustrating a block matching process in an image processing device according to an embodiment of the present invention.
Figure 5B:
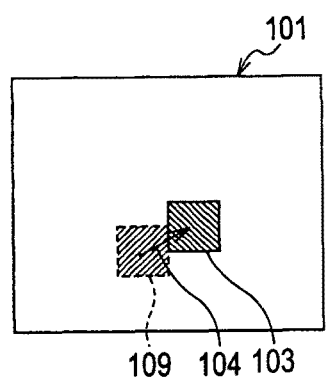

FIGS. 5A to 10 are views explaining the summary of a block matching method. According to the block matching method as described hereinafter, for example, as illustrated in FIG. 5A, a block (i.e. target block) 102 of a tetragonal area having a predetermined size, which includes a plurality of pixels in a horizontal direction and a plurality of lines in a vertical direction, is presented in a target frame 100. In addition, a block (i.e. reference block) having the same size as the target block is presented in a reference frame 101.

According to the block matching, a reference block having a high correlation with the target block 102 is searched for in the reference frame 101. As the search result, the reference block 103 (See FIG. 5B) detected as the reference block having the highest correlation in the reference frame 101 is called a motion compensation block. In addition, the amount of deviation between the target block 102 and the motion compensation block 103 (i.e. reference block having the highest correlation) is called a motion vector (See numeral 104 in FIG. 5B).

The motion vector 104 corresponding to the deviation (including the amount of deviation and the direction of deviation) between the target block 102 and the motion compensation block 103 corresponds to the deviation between the position of a projected image block 109 of the target block in the reference frame 101 and the position of the motion compensation block 103. Here, the position of the projected image block 109 and the position of the motion compensation block 103 are determined, for example, using the center position of the block.

The projected image block 109 of the target block 102 in the reference frame 101 is assumed in the same position as the respective target blocks 102 of the target frame 100.

The summary of the block matching process will be described.

Figure 6:
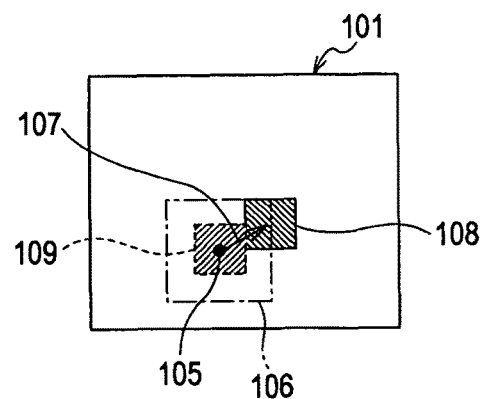
FIG. 6 is a diagram illustrating a block matching process in an image processing device according to an embodiment of the present invention.

First, as indicated as a dotted line in FIG. 6, the projected image block 109 of the target block 102 in the reference frame 101 is assumed in the same position as the target block 102 of the target frame 100. In this case, the coordinates of the center of the projected image block 109 of the target block 102 is assumed as the original point 105 for motion detection. In addition, on the assumption that the motion vector 104 exists in a certain range from the original point 105 for motion detection, the specified range around the original point 105 for motion detection is set as a search range 106 (See the dashed dotted line in FIG. 6).

Next, a block having the same size as the target block 102 (referred to as a "reference block") 108 is set in the reference screen. In addition, the position of the reference block 108 is moved, for example, in the unit of one pixel or plural pixels in horizontal and vertical directions in the set search range 106. Accordingly, in the search range 106, plural reference blocks 108 are set.

Here, movement of the reference block 108 in the search range 106 means movement of the center position of the reference block 108 in the search range 106 since the original point 105 for motion detection is the center position of the target block. Accordingly, pixels constituting the reference block 108 may stick out from the search range 106.

In the search range, a vector (referred to as "reference vector") 107 (See FIG. 6), which indicates the amount of position mismatch between the reference block 108 and the target block 102 and the direction of position mismatch, is set with respect to each of the set reference blocks 108. In addition, the correlation between the image contents of the reference block 108 in a position indicated by the respective reference vector 107 and the image contents of the target block 102 is evaluated.

Figure 7:
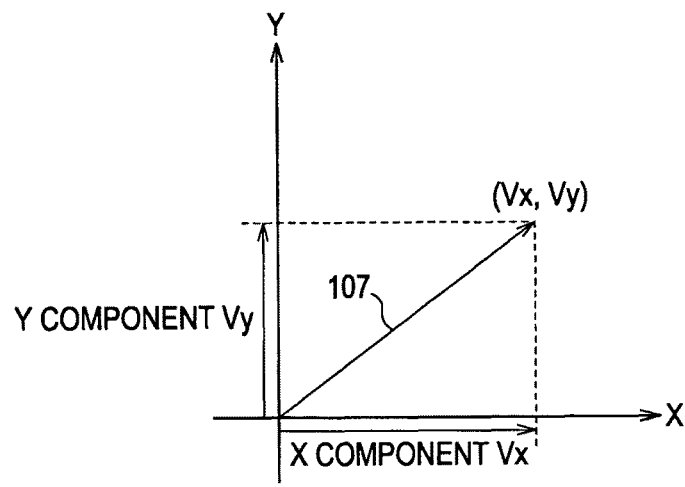
FIG. 7 is a diagram illustrating a block matching process in an image processing device according to an embodiment of the present invention.

As illustrated in FIG. 7, on the assumption that the amount of position mismatch of the reference block 108 in a horizontal direction (i.e. X-axis direction) is Vx, and the amount of position mismatch in a vertical direction (i.e. Y-axis direction) is Vy, the reference vector 107 can be represented as a vector (Vx,Vy). If the position coordinates of the reference block 108 (e.g. coordinates of the center position) are the same as the position coordinates of the target block 102 (e.g. coordinates of the center position), the reference vector 107 is represented as a vector (0,0).

For example, if the reference block 108 is in a position that deviates from the position of the target block 102 by one pixel in an X-axis direction, the reference vector 107 becomes a vector (1,0). In addition, as illustrated in FIG. 8, if the reference block 108 is in a position that deviates from the position of the target block 102 by three pixels in the X-axis direction and by two pixels in the Y-axis direction, the reference vector 107 becomes a vector (3,2).

Figure 8:
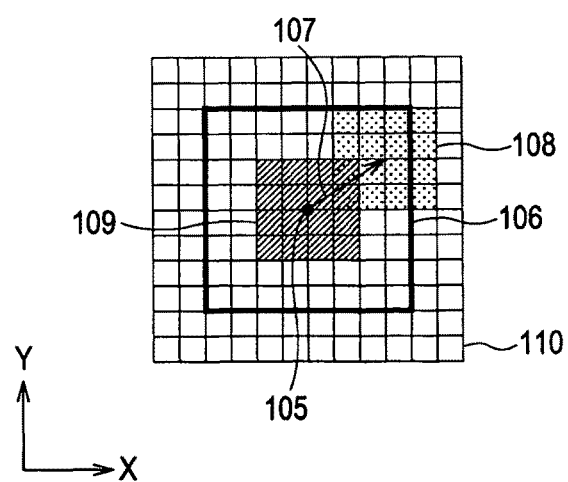
FIG. 8 is a diagram illustrating a block matching process in an image processing device according to an embodiment of the present invention.

That is, the reference vector 107, as illustrated in FIG. 8, means the position mismatch (corresponding to a vector including the amount of position mismatch and the direction of position mismatch) between the respective corresponding reference blocks 108 and the target block 102. In this case, as illustrated in FIG. 8, the positions of the target block 102 and the reference block 108 is assumed as the center positions of the respective blocks.

The reference block 108 is moved in the search range 106. In this case, the center position of the reference block 108 is moved in the search range 106. The reference block 108 includes plural pixels in horizontal and vertical directions. Accordingly, the maximum range, in which the reference block 108 to be block-matched to the target block 102 is moved, becomes the matching process range 110 that is wider than the search range 106, as shown in FIG. 8.

Then, the position of the reference block 108 in the reference frame 101, which is detected as the reference block having the highest correlation with the image contents of the target block 102, is detected as the position (i.e. position after movement) of the target block 102 of the target frame 100 in the reference frame 101. The detected reference block is assumed as the above-described motion compensation block 103. In addition, the amount of position mismatch between the position of the detected motion compensation block 103 and the position of the target block 102 is detected as a motion vector 104 with an amount including a direction component (See FIG. 5B).

Here, the correlation value that indicates the strength of correlation between the target block 102 and the reference block 108 moving in the search range 106 is calculated basically using corresponding pixel values of the target block 102 and the reference block 108. Diverse calculation methods including a method using mean squares have been proposed.

Figures 9, 10:
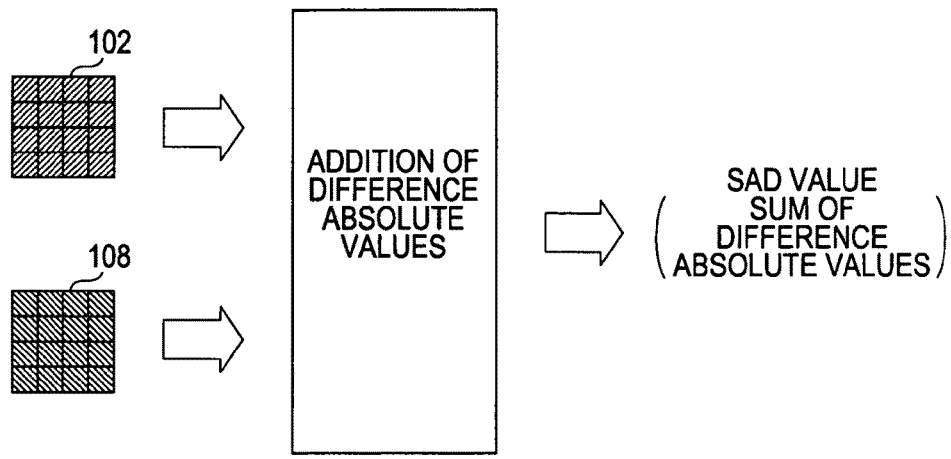
FIG. 9 is a diagram illustrating a block matching process in an image processing device according to an embodiment of the present invention.
FIG. 10 is a diagram illustrating a block matching process in an image processing device according to an embodiment of the present invention.

Among them, as the correlation value generally used when the motion vector is calculated, the sum total of the absolute values, for all pixels within the blocks, of the differences between illumination values of respective corresponding pixels in the reference block 108 and luminance values of respective corresponding pixels in the target block 102 is used (See FIG. 9). The sum total of absolute difference values will be described as the sum of absolute difference (SAD) values.

In the case of using SAD values as the result of the correlation operation, the correlation becomes stronger as the SAD value becomes smaller. Accordingly, among the reference blocks 108 moving within the search range 106, the reference block 108 in a position in which the SAD value is minimized becomes the strongest correlation reference block having the strongest correlation. This strongest correlation reference block is detected as the motion compensation block 103, and the amount of position mismatch between the positions of the detected motion compensation block 103 and the target block 102 is detected as the motion vector.

In general, the reference block having a large correlation value becomes a strong correlation reference block. However, in the case of using the SAD value as the result of the correlation operation, the correlation value becomes large as the SAD value becomes small, and in this case, the reference block has a strong correlation.

As described above, in the block matching, the amounts of position mismatch of the plural reference blocks 108 set in the search range 106 to the position of the target block 102 are represented as reference vectors 107 each of which corresponds an amount including a direction component. The reference vector 107 of each reference block 108 has a value in accordance with the position of the reference block 108 in the reference frame 102. As described above, in the block matching, the reference vector of the reference block 108 having the minimum SAD value as the correlation value is detected as a motion vector 104.

Accordingly, in the block matching, SAD values between the plural reference blocks 108 set in the search range 106 and the target block 102 (for simplification in of explanation, hereinafter referred to as "SAD values for reference blocks 108") are first obtained.

Next, as illustrated in FIG. 10, the obtained SAD values are made to correspond to the reference vectors 107, respectively, in accordance with the positions of the respective reference blocks 108, and the results are stored in a memory. Then, the motion vector 104 is detected through detection of the reference block 108 having the minimum SAD value among the SAD values for all the reference blocks 108 stored in the memory. In this case, for simplification of explanation, the reference vector 107 in accordance with the position of the reference block 106 is called the reference vector 107 of the reference block 108.

The correlation values (in this example, the SAD values) for the respective reference blocks 108, which are stored after corresponding to each other the reference vectors 107 in accordance with the positions of plural reference blocks 108 set in the search range 106, is called a correlation value table. In this example, since the SAD value, which is the sum of the absolute difference values, is used, this correlation value table is called an absolute difference value sum table (hereinafter referred to as "SAD table").

The SAD table TBL in FIG. 10 represents this, and in the SAD table TBL, correlation values (in this example, SAD values) for the respective reference blocks 108 are called correlation value table elements. According to the example of FIG. 10, the SAD value indicated by numeral 111 is a SAD value when a reference vector is a vector (0,0). In addition, according to the example of FIG. 10, since the minimum SAD value is 7 when the reference vector is a vector (3,2), the motion vector 104 to be obtained becomes a vector (3,2).

In this case, the positions of the target block 102 and the reference block 108 mean arbitrary specified positions of the blocks, for example, the center positions thereof in the description above. The reference vector 107 represents the amount of mismatch (including a direction) between positions of the projected image block 109 of the target block 102 in the reference frame 102 and the reference block 108.

The reference vectors 107 corresponding to the respective reference blocks 108 indicate the position mismatches of the respective reference block 108 from the position of the projected image block 109 corresponding to the target block 102 on the reference frame 101. Accordingly, once the position of the reference block 108 is determined, the value of the reference vector corresponding to the position is also determined. Specifically, if an address of a correlation value table element of the reference block in the memory of the SAD table 110 is determined, the corresponding reference vector is also determined.

In this case, the SAD values may be simultaneously calculated in parallel with respect to two or more target blocks.

<Motion Vector Detection in the Unit of a Block and Evaluation of the Reliability>

The above description of the block matching refers to the calculation of a motion vector with respect to one target block. The ratio of this target block occupied to the whole target frame is typically small, as it is generally difficult to obtain the motion of the target frame (i.e. global motion) based on one target block.

Figure 11:
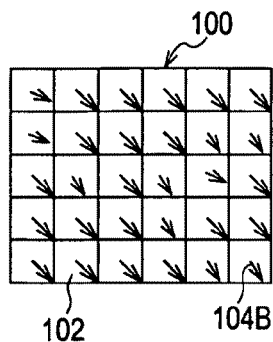
FIG. 11 is a diagram illustrating a block matching process in an image processing device according to an embodiment of the present invention.

In the embodiment of the present invention, as illustrated in FIG. 11, the target frame 100 is divided into plural target blocks 102 having a relative small size, such as 64 pixels 64 lines, and motion vectors (i.e. local motion vectors) 104B for the plural target blocks are first obtained. At this time, the indexes indicating the reliabilities of the respective obtained local motion vectors are also calculated.

Then, based on the reliability indexes of the local motion vectors, only the local motion vectors having high reliabilities are extracted among the plural local motion vectors obtained with respect to the target frame.

Then, a global motion is calculated only from the extracted local motion vectors having high reliabilities, and global motion vectors in the unit of a target block are calculated using the calculated global motion.

Then, based on the result of comparison of the calculated global motion vectors and the local motion vectors for the respective target blocks, it is evaluated and determined whether the respective target block corresponds to the background part or a moving object part. In the embodiment of the present invention, by comparing the calculated global motion vector with the local motion vector for each target block, the degree of coincidence between the global motion vector and the local motion vector is determined, as the result of determination, an index value indicating the degree of coincidence between the local motion vector and the global motion vector for each target block is calculated. In the description of the present invention, the index value is called a hit rate.

The above-described evaluation and determination is made because of the consideration of the influence of the noise included in the image exerted upon the correlation values calculated in the block matching.

If the global motion vector and the local motion vector of the target block coincide with each other, it can be judged that the target block corresponds to the background image part. Accordingly, the index value indicating the degree of coincidence represents the degree as to whether the image of the target block coincides with the background image part (i.e. the degree of background coincidence).

If the target block corresponds to the background image part, it means that the target block is a still image part. Accordingly, the motion compensation of the image of the target block can be added with the rate of 100% (i.e. the rate of 1:1) with respect to the image of the target block, and thus the addition NR effect can be maximized.

If the degree of background coincidence is low, it is expected that the target block corresponds to the moving object part, and the adding rate of the motion compensated images with respect to the image is lowered in accordance with the degree of background coincidence to reduce the multi-exposure image state.

Here, if an image noise is not considered in the case in which the global motion vector and the local motion vector do not coincide with each other, it can be judged that all the target block corresponds to the moving object part. In this case, the correlation value for the reference block corresponding to the local motion vector is maximized (i.e. the SAD value is minimized), and is larger than the correlation value for the reference block corresponding to the global motion vector (i.e. the SAD value is small).

In general, an image, such as a captured image includes noise. In consideration of the image noise, the target block may correspond to the background part even if the global motion vector and the local motion vector do not coincide with each other. In such a target block, the difference between the correlation value for the reference block corresponding to the local motion vector and the correlation value for the reference block corresponding to the global motion vector seems to be smaller than the image noise component.

In the embodiment of the present invention, the correlation value for the reference block corresponding to the global motion vector is corrected to the value reflecting the image noise component, and the correlation value after correction and the correlation value for the reference block corresponding to the local motion vector are compared with each other. If the correlation value after the correction is larger than the correlation value for the reference block (i.e. if the SAD value is small), it is evaluated that the target block corresponds to the background image part. That is, in the embodiment of the present invention, the degree of background coincidence is evaluated based on the corrected correlation value. In this case, it can be recognized that the global motion vector coincides with the original local motion vector for the corresponding target block.

In the embodiment of the present invention, if it is judged that the target block corresponds to the background image part as a result of evaluating the degree of background coincidence, the global motion vector is output with respect to the corresponding target block as an output motion vector. In addition, if it is judged that the target block does not correspond to the background image part as a result of evaluating the degree of background coincidence, the local motion vector is output with respect to the corresponding target block as an output motion vector. In the embodiment of the present invention, the output motion vector is a motion vector for the subsequent process, and in this embodiment, a motion vector for NR process.

If the global motion vector and the local motion vector completely coincide with each other, either of the global motion vector and the local motion vector can be output as the output motion vector.

In the embodiment of the present invention, a motion compensated image (i.e. motion compensated frame) is generated by performing a position matching of the reference frame with respect to the target frame in the unit of a block using the output motion vector for each target block unit obtained as above. Then, the addition NR image is generated through overlapping of the target frame and the motion compensated frame.

Figure 12:
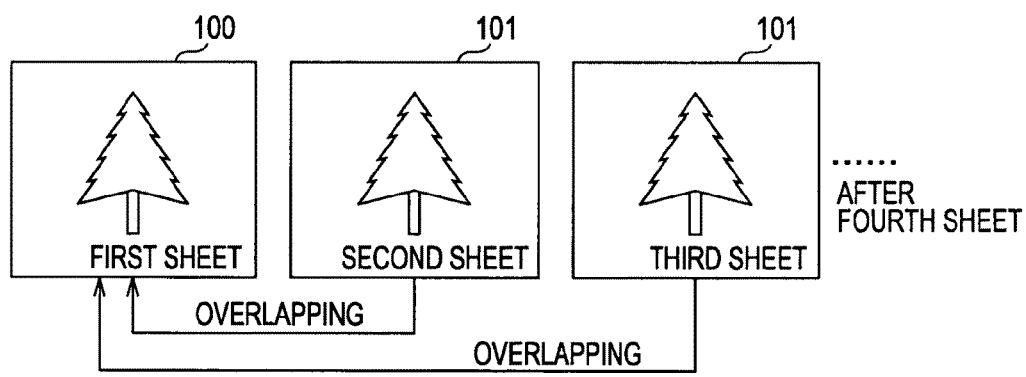
FIG. 12 is a diagram illustrating an example of an addition NR process of plural sheets of images in an image processing device according to an embodiment of the present invention.

In capturing a still image, as illustrated in FIG. 12, the capturing of plural still images is performed at high speed, and the first still image captured image is assumed as the target frame 100 in the capturing device according to this embodiment. Then, the overlapping is performed in consideration of the specified number of still image captured images as the reference frames 101 after the second image, and the overlapping image is recorded as the still image captured image.

That is, if a shutter button of the capturing device is pressed, a specified number of still images are captured at high speed. Then, the plural still images (i.e. frames) captured later in time overlap the first captured still image (i.e. frame) to be recorded.

Figure 13:
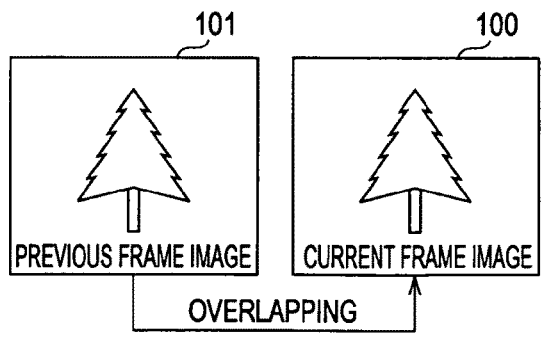
FIG. 13 is a diagram illustrating another example of an addition NR process of plural sheets of images.

While not described as a target of the embodiment of the present invention, in the case of picturing a moving image, as illustrated in FIG. 13, the current frame image being output from the pickup device is assumed as the image of the target frame 100, and the image of the previous frame is assumed as the image of the reference frame 101. That is, in the case of picturing a moving image, the previous frame image and the current frame image overlap each other to reduce the noise of the current frame image.

<Method of Evaluating Reliability of Motion Vector>

In the embodiment of the present invention, in consideration of the above-described situation, reliability index values that can effectively evaluate the reliability of the motion vector even in an image of a large-noise environment are obtained.

In the embodiment of the present invention, a difference or ratio between a first maximum value and a second maximum value of the correlation value between the target block and the reference block is assumed as the reliability index value of the motion vector. In the embodiment of the present invention, since the correlation value between the target block and the reference block is detected as the SAD value, the first maximum value and the second maximum value of the correlation value become a first minimum value and a second minimum value of the SAD value.

Figure 14:
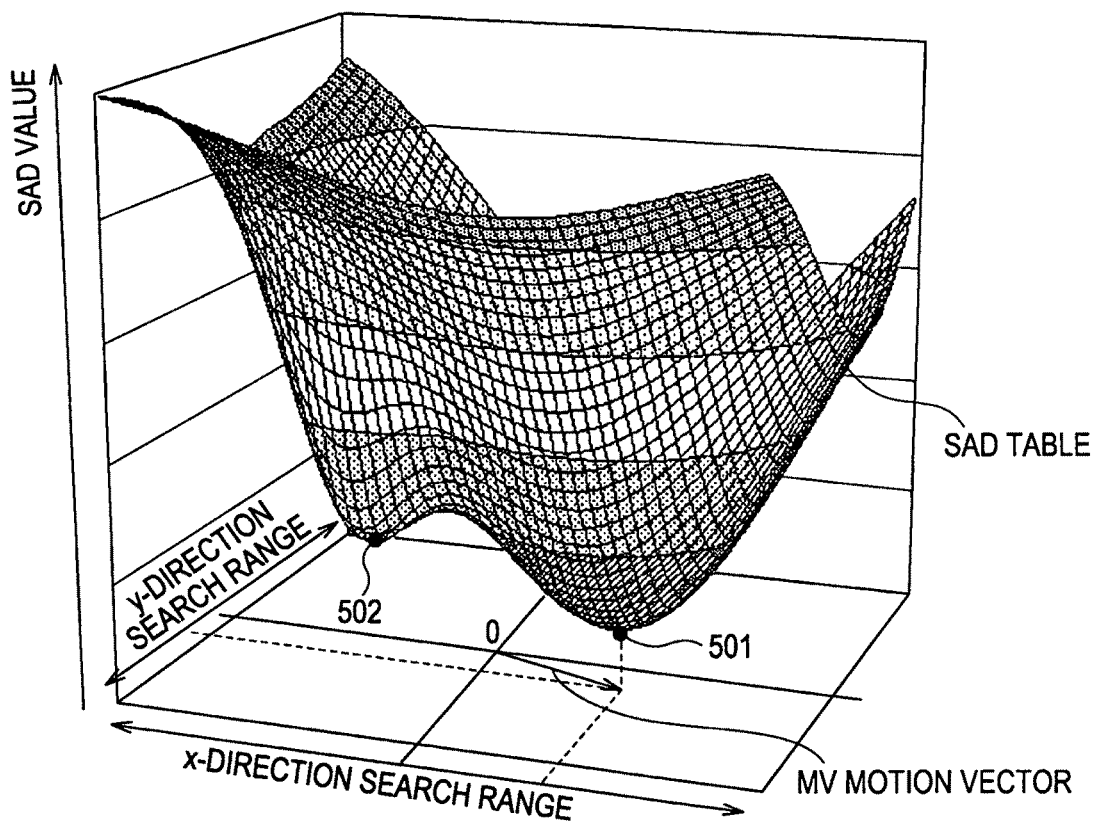
FIG. 14 is a diagram illustrating an image processing device according to an embodiment of the present invention.

FIG. 14 is a diagram schematically illustrating the SAD values in a SAD table with respect to one target block. In FIG. 14, the search range is two-dimensionally presented in horizontal and vertical directions (i.e. X-axis and Y-axis directions) of the image, and the height direction (i.e. a direction that is orthogonal to the X-axis and Y-axis directions) denotes the SAD values to present the SAD table in a three-dimensional curved surface.

In the case of a typical block matching process, in order to detect the motion vector, only the minimum value of the SAD value in the SAD table is detected. The minimum value of the SAD value is the first minimum value of the SAD value in the SAD table, and is represented as a position indicated by a point 501 in FIG. 14. In FIG. 14, a motion vector MV is detected as a vector between the motion original point (x=0, y=0) and the minimum value position of the SAD value indicated by this point 501.

If the correlation values between plural reference blocks and the target block in the search range are obtained in an ideal state in which no noise exists, the SAD table presented as a three-dimensional curved surface constantly curved downward, and only one minimum value of the SAD value exists. However, in an actual pickup situation, due to diverse noises, in addition to the influence of the change of light quantity, motion of a moving object, and the like, the SAD table that is presented as a three-dimensional curved surface scarcely curves downward, and it is general that minimum values of plural SAD values exist.

In the embodiment of the present invention, the motion vector MV is detected based on the position of the reference block indicating the first minimum value equal to the minimum value of the SAD value, and in addition, the minimum value among the SAD values other than the first minimum value of the SAD value, i.e. the second minimum value of the SAD value is detected to generate the reliability index. In FIG. 14, the position indicated by the point 501 represents the first minimum value, and the position indicated by the point 502 represents the second minimum value.

If the influence of the noise and so on is small, the difference between the first minimum value of the SAD value and the second minimum value of the SAD value becomes large, and the reliability of the motion vector MV detected from the first minimum value of the SAD value, i.e., the minimum value of the SAD value is heightened. On the other hand, in an environment in which large amount of noise exists, the difference between the first minimum value of the SAD value and the second minimum value of the SAD value becomes small, and it is not determined which one accurately corresponds to the motion vector MV, which means the reliability of the motion vector is low.

Figure 15:
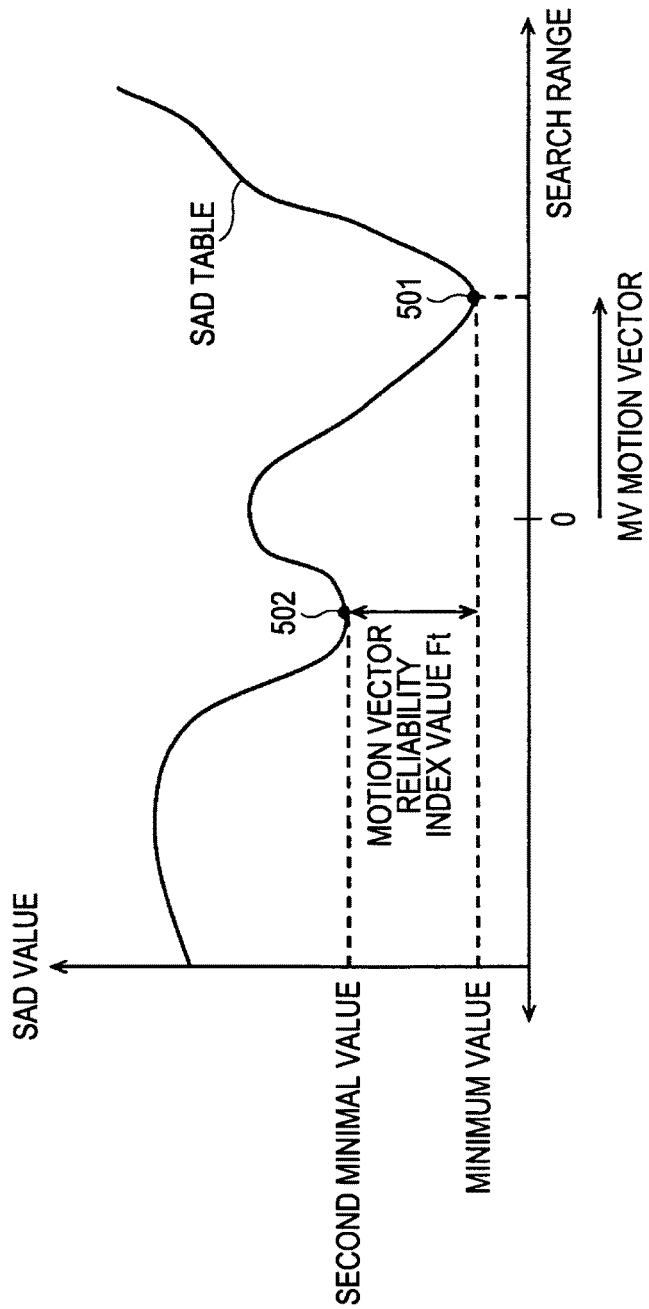
FIG. 15 is a diagram illustrating an image processing device according to an embodiment of the present invention.

As described above, in the embodiment of the present invention, the difference between the first minimum value (i.e. the minimum value of the SAD value) and the second minimum value of the SAD value is assumed as the reliability index of the detected motion vector. A SAD table in which the search range of FIG. 14 is re-displayed on the first-dimensional axis is shown in FIG. 15. In the embodiment of the present invention, as shown in FIG. 15, the difference value between the second minimum value and the first minimum value (i.e. the minimum value of the SAD value) is assumed as the index value Ft of the motion vector MV.

In this case, if only the first minimum value of the SAD value is obtained, and the second minimum value is not obtained, the theoretical maximum value of the SAD value or the maximum value of the SAD value in the SAD table is assumed as the reliability index value of the motion vector MV. Accordingly, the motion vector of such a block has a high reliability, but such a block hardly exists. Thus, the motion vector of the block, in which only the first minimum value of the SAD value is obtained, and the second minimum value is not obtained, may be excluded from the reliability evaluation.

Instead of the difference between the first minimum value of the SAD value (i.e. the minimum value of the SAD value) and the second minimum value of the SAD value, the ratio of the first minimum value of the SAD value (i.e. the minimum value of the SAD value) to the second minimum value of the SAD value may be assumed as the reliability index value Ft of the motion vector MV. However, in the following description of the invention, the difference between the first minimum value of the SAD value (i.e. the minimum value of the SAD value) and the second minimum value of the SAD value is used as the reliability index value Ft of the motion vector.

According to the reliability index of the motion vector in the embodiment of the present invention, since the image components such as the edge or characteristic according to the related art are not used, but only the correlation value between the target frame and the reference frame is used, the robustness is heightened with respect to the noise. That is, without being influenced by the noise in the image, the reliability index of the motion vector having a high precision is obtained.

According to the reliability index of the motion vector in the embodiment of the present invention, the difference or the ratio between the first maximum value of the correlation value (i.e. the first minimum value of the SAD value) and the second maximum value of the correlation value (i.e. the second minimum value of the SAD value) or the ratio thereof is used, which result in that the robustness is heightened with respect to the noise.

In general, if the noise level is heightened, the SAD value of the motion vector is increased even though the motion vector is accurate. Accordingly, in the case of determining a threshold value with respect to the reliability index value Ft of the motion vector and performing a comparison of the reliability index value with the threshold value for the purpose of extracting the motion vector having a high reliability, it is necessary to change the threshold value itself in accordance with the noise level.

According to the reliability index value Ft of the motion vector according to an embodiment of the present invention, if the noise level is heightened, both the first maximum value of the correlation value (i.e. the first minimum value of the SAD value) and the second maximum value of the correlation value (i.e. the second minimum value of the SAD value) are increased in accordance with the noise level. Accordingly, with respect to the difference between the first maximum value of the correlation value (i.e. the first minimum value of the SAD value) and the second maximum value of the correlation value, the influence of noise is offset.

That is, it becomes possible to process the threshold value to be constant without depending upon the noise level. Even in the case in which the ratio of the first maximum value of the correlation value (i.e. the first minimum value of the SAD value) to the second maximum value of the correlation value (i.e. the second minimum value of the SAD value) is used as the reliability index value Ft of the motion vector, the same effect can be achieved.

However, if the contrast of an image of a block, of which the block matching is to be performed, is low, the difference between the second minimum value of the SAD value and the minimum value of the SAD value is liable to be reduced. Accordingly, if the evaluation value Ix of the vector reliability is evaluated with the same threshold value when both a region in which the contrast is high and low exist in the same frame, the region having a high contrast is liable to be preferentially extracted.

Although this is a proper result in view of the reliability of the motion vector, in the embodiment of the present invention, an item for reducing the influence of contrast is added to an equation that obtains the reliability index value of the motion vector to relieve somewhat the region having low contrast. That is, a difference between the maximum illumination value and the minimum illumination value of the target frame is obtained, and the difference of the corresponding illumination is reflected in the reliability index value of the motion vector. Meanwhile, in order to avoid the detrimental influence of the noise, a low pass filtering is performed with respect to the image data of the target frame, and then the extraction of the maximum illumination and the minimum illumination is performed.

Based on the above-described fact, an equation of calculating the reliability index value Ft of the motion vector according to the embodiment of the present invention is $$Ft = (Btm2SAD - MinSAD) - MaxTAR - MinTAR) \times Co \quad \text{(Eq. 1)}$$

where, Ft is a reliability index value of a motion vector,
Btm2SAD is the second minimum value of the SAD value,
MinSAD is the minimum value (i.e. first minimum value) of the SAD value,
MaxTAR is the maximum illumination value of a target block,
MinTAR is the minimum illumination value of the target block, and
Co is a weight coefficient ($\leqq 1$).

Even in the case in which the ratio of the first maximum value of the correlation value to the second maximum value of the correlation value is used as the reliability index value of the motion vector, an item for reducing the influence of contrast to the reliability index value calculation equation in the same manner as Equation 1 as described above. First of all, in calculating the reliability index value Ft of the motion vector, it is not necessary to add an item for reducing the influence of contrast, and this item can be omitted.

[Calculation of Global Motion and Global Motion Vector GMV]

In the related art, the reliability index value of the motion vector as described above is not provided, and thus the global motion is calculated using all the local motion vectors LMV obtained for the target frame using the same weight.

By contrast, in the embodiment of the present invention, respective reliability index values Ft of plural local motion vectors LMV can be obtained with respect to the target frame.

Accordingly, the reliability index values Ft of the plural local motion vectors LMV are normalized, and for example, weight coefficients having values not less than 0 and not exceeding 1 can be set with respect to the respective local motion vectors LMV. In addition, the respective local motion vectors LMV do not use the same weight, but use weights in accordance with the respective weight coefficients to calculate the global motion. That is, in the embodiment of the present invention, an operation for calculating the global motion using all the obtained local motion vectors LMV is performed, and at the same time, the respective local motion vectors LMV use weights in accordance with the weight coefficients according to the reliability index values Ft.

However, in order to make the operation load light by simplifying the calculation operation process of the global motion, in the embodiment of the present invention, the weight coefficients W for the local motion vectors LMV have two values of 0 and 1.

Accordingly, in the embodiment of the present invention, the threshold value Th for the reliability index values Ft of the motion vectors is set in the case of $Ft > Th$, $W=1$ in the case of $Ft \leqq Th$, $W=0$ \quad (Eq. 2)

In this equation, the weight coefficients W for the respective local motion vectors LMV are calculated using the reliability index values Ft of the motion vectors.

That is, in the embodiment of the present invention, the reliabilities of the plural local motion vectors LMV are decided using the reliability index values Ft of the motion vectors, and only the local motion vectors LMV having a high reliability are extracted from the plural local motion vectors LMV. Then, the global motion is calculated using only the extracted local motion vectors LMV having a high reliability.

In the embodiment of the present invention, a relatively large number of target blocks exist in the target frame, and thus the calculation of the global motion having a good precision becomes possible even by the method of extracting only the local motion vectors LMV having a high reliability.

Meanwhile, the detailed process of calculating the global motion from the plural local motion vectors LMV will be described later.

<Example of Hardware Construction of Addition NR Processing Unit 20>

In the embodiment of the present invention, the addition NR processing unit 20, as illustrated in FIG. 1, includes a motion vector calculation unit 21, a motion compensated image generation unit 22, an adding unit 23, and an adding rate calculation unit 24.

The motion vector calculation unit 21 reads out image data of the target frame and image data of the reference frame from the image memory unit 4, after plural frames of images are written in the image memory unit 4.

Then, the motion vector calculation unit 21 detects the local motion vectors LMV by the block matching method, and simultaneously calculates the reliabilities of the local motion vectors LMV, the global motion, and global motion vectors GMV. In addition, the motion vector calculation unit generates a hit rate β by performing evaluation of the degree of background coincidence with respect to the target block.

In the embodiment of the present invention, image data TGv of the target frame, image data REFv of the reference frames, and the hit rate β are output from the motion vector calculation unit 21. In addition, information about motion vectors MVnr for NR process including the global motion vectors GMV or the local motion vectors LMV is output from the motion vector calculation unit 21.

The information about the motion vectors MVnr for the NR process from the motion vector calculation unit 21 and the image data REFv of the reference frames are supplied to the motion compensated image generation unit 22. The motion compensated image generation unit 22 generates motion compensated images by performing process corresponding to the global motion, i.e. deformation process, which includes parallel movement, rotation, extension, and reduction, by the motion vectors MVnr for NR process, with respect to the image data REFv of the reference frames.

Then, the image data TGv of the target frame is supplied from the motion vector calculation unit 21 to the adding unit 23, and simultaneously the image data MCv of the motion compensated images is supplied from the motion compensated image generation unit 22 to the adding unit 23.

In addition, the image data TGv of the target frame from the motion vector calculation unit 21 and the hit rate β are supplied to the adding rate calculation unit 24. The adding rate calculation unit 24 calculates the adding rate α for each target block of the target frame in accordance with the hit rate β that is the degree of background coincidence. Then, the adding rate calculation unit 24 supplies the adding rate α for each calculated target block to the adding unit 23.

The adding unit 23 performs the overlapping of images by adding the pixels of the positions corresponding to both the image data TGv and MCv, and outputs image data MIXv of their added images (i.e. NR images). This image overlapping is performed in the unit of a target block, and the image data of the block corresponding to the image data MCv of the motion compensated images to the image data of the target block at the adding rate α.

The image data MIXv of the added image from the adding unit 23 is overwritten on the image data of the previous target frame in a first frame memory 41 of the image memory unit 4 as the image data of the target frame.

That is, the image data of the target frame in the first frame memory 41 first becomes the image data of the first frame just after the shutter button is pressed. The image data of the target frame in the first frame memory 41, if the image data MCv of the motion compensated image of the second reference frame and the target frame are added together, is changed to the image data MIXv of the added image as a result of addition.

Then, the image frame MIXv of the added image becomes the image data of the target frame for the image data of the third reference frame. In the same manner, the motion vector MVnr for NR process is calculated through the motion vector calculation unit 21, and the overlapping of the images is performed through the adding unit 23.

Then, the image data MIXv of the added image as a result of addition is overwritten on the image data of the previous target frame in the first frame memory 41 of the image memory unit 4 as the image data of the target frame. Hereinafter, the same processing operation is performed with respect to the fourth and subsequent reference images.

Accordingly, after the image overlapping up to the N-th reference frame is performed, the NR image on which all the N frames are overlapped is written in the first frame memory 41 of the image memory unit 4.

The motion vector calculation unit 21 and the motion compensated image generation unit 22 can be configured by hardware. In addition, the motion vector calculation unit 21 and the motion compensated image generation unit 22 can be configured using a digital signal processor (DSP). Further, the motion vector calculation unit 21 and the motion compensated image generation unit 22 can be implemented by a software process performed by the CPU 1.

In the same manner, the adding unit 23 can be configured by hardware. In addition, the adding unit can also be configured using a DSP. Further, the adding unit 23 can be implemented by software process performed by the CPU 1. The still image codec unit 17 can be configured in the same manner as described above.

[Configuration Example of Motion Vector Calculation Unit 21]

Figure 16:
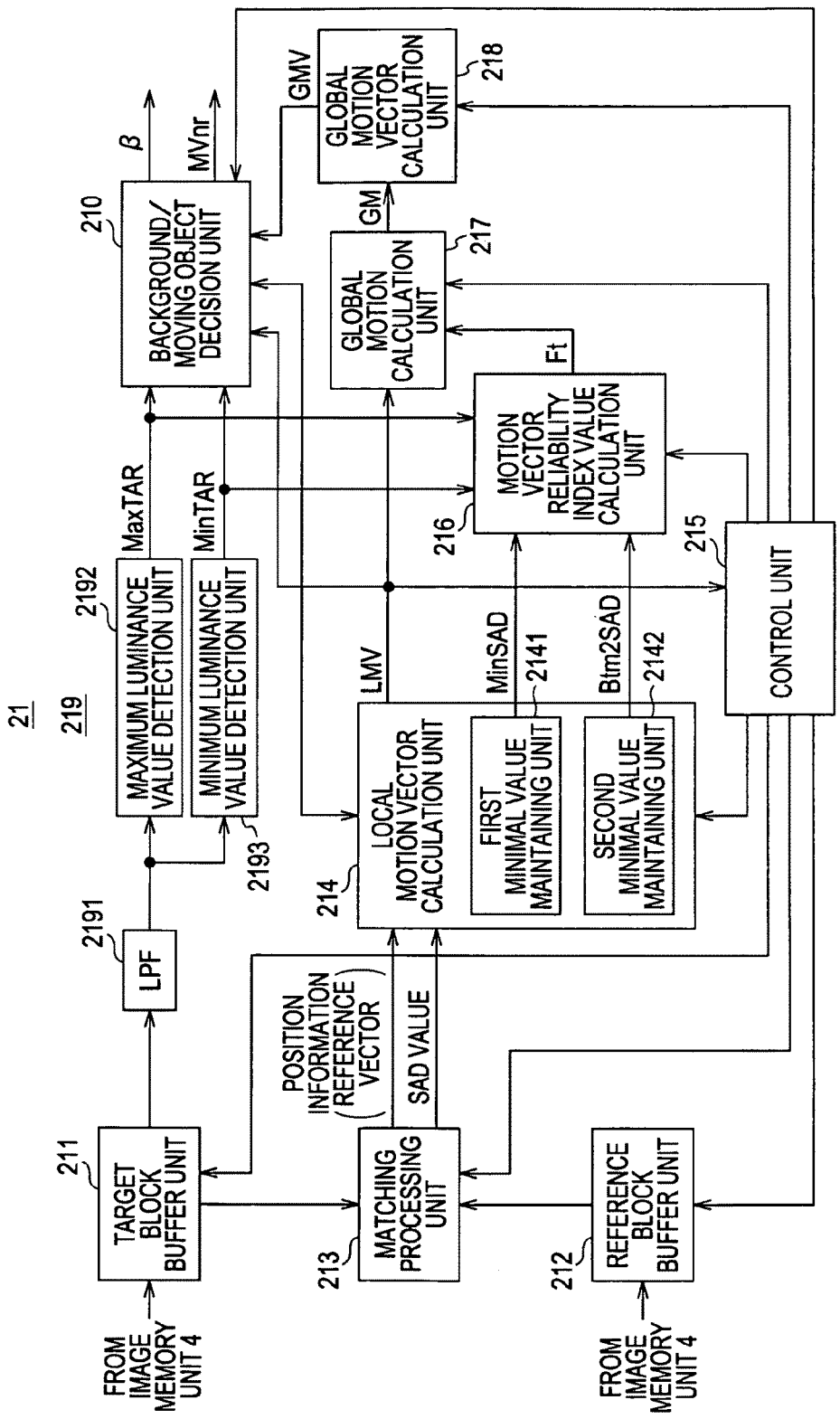
FIG. 16 is a block diagram illustrating an example of the configuration of a motion vector calculation unit in an image processing device according to an embodiment of the present invention.

An example of hardware configuration of the motion vector calculation unit 21 is illustrated in FIG. 16. In this example, the motion vector calculation unit 21 is provided with a target block buffer unit 211 maintaining the pixel data of the target block 102, and a reference block buffer unit 212 maintaining the pixel data of the reference blocks 108.

In addition, the motion vector calculation unit 21 is provided with a matching processing unit 213 calculating the SAD values for the pixels corresponding to the target block 102 and the reference block 108. The motion vector calculation unit 21 is also provided with a local motion vector calculation unit 214 calculating the local motion vectors from the SAD value information output from the matching processing unit 213. The motion vector calculation unit 21 is further provided with a control unit 215, a motion vector reliability index value calculation unit 216, a global motion calculation unit 217, a global motion vector calculation unit 218, a contrast calculation unit 219, and a background/moving object decision unit 210.

The contrast calculation unit 219 includes a low pass filter 2191, a maximum illumination value detection unit 2192, and a minimum illumination value detection unit 2193.

In this embodiment, although not illustrated in the drawing, reduced surface image data and intermediate surface image data for the target frame and the reference frame, which are generated from the image data of the target frame or the reference frame of the original image, are stored and maintained in the image memory unit 4.

The control unit 215 controls the process sequence in the motion vector calculation unit 21, and supplies a control signal to respective units as illustrated in the drawing.

The target block buffer unit 211, under the control of the control unit 215, reads out the image data of the indicated target block from the image data of the target frame in the image memory unit 4, and supplies the read-out image data to the matching processing unit 213.

The reference block buffer unit 212, under the control of the control unit 215, reads out the image data in an indicated matching processing range from the image data of the reference frame in the image memory unit 4. In addition, the reference block buffer unit 212 sequentially supplies the image data of the reference block among the image data in the matching processing range to the matching processing unit 213.

The matching processing unit 213 receives the image data of the target block from the target block buffer unit 211, and receives the image data of the reference block from the reference block buffer unit 212. The matching processing unit 213 also performs the block matching process under the control of the control unit 215. The matching processing unit 213 supplies reference vectors (i.e. position information of the reference block) and SAD values resulting from the blocking matching process to the local motion vector calculation unit 214.

The local motion vector calculation unit 214 is provided with a first SAD minimum value maintaining unit 2141 and a second SAD minimum value maintaining unit 2142, and performs detection of the first minimum value of the SAD value and the second minimum value of the SAD value from the SAD value from the matching processing unit 213.

The local motion vector calculation unit 214 updates the first minimum value of the SAD value of the first SAD minimum value maintaining unit 2141 and its position information (i.e. reference vector), and the second minimum value of the SAD value of the second SAD minimum value maintaining unit 2142 and its position information (i.e. reference vector). The local motion vector calculation unit 214 performs the update process until the block matching process for all the reference blocks of the matching processing range is completed.

When the block matching process is completed, the first minimum value of the SAD value for the target block at that time and its position information (i.e. reference vector) are stored and maintained in the first SAD minimum value maintaining unit 2141. In the second SAD minimum value maintaining unit 2142, the second minimum value of the SAD value and its position information (i.e. reference vector) are stored and maintained.

The local motion vector calculation unit 214, when the block matching process for all the reference blocks in the matching process range is completed, detects the information (i.e. position information) of the reference vector maintained in the first SAD minimum value maintaining unit 2141 as the motion vector. The processing operation of the local motion vector calculation unit 214 will be described in detail later.

The local motion vector LMV obtained from the local motion vector calculation unit 214 is supplied to the global motion vector calculation unit 217. The global motion calculation unit 217 temporarily maintains the received local motion vector LMV.

When the calculation of the local motion vector LMV through the local motion vector calculation unit 214 is completed, the control unit 215 enables the motion vector reliability index value calculation unit 216 to starts its operation. The local motion vector calculation unit 214 supplies the minimum value MinSAD of the SAD value of the first minimum value maintaining unit 2141 and the second minimum value Btm2SAD of the SAD value of the second minimum value maintaining unit 2142 to the motion vector reliability index value calculation unit 216.

At this time, the image data of the target block from the target block buffer unit 211 is supplied to the maximum illumination value detection unit 2192 and the minimum illumination value detection unit 2193 through a low pass filter 2191. In addition, the maximum illumination value MaxTAR and the minimum illumination value MinTAR detected from the maximum illumination value detection unit 2192 and the minimum illumination value detection unit 2193 are supplied to the motion vector reliability index value calculation unit 216.

The motion vector reliability index value calculation unit 216 calculates the reliability index value Ft of the motion vector in accordance with Equation 1 as described above, using the information supplied thereto. In addition, the motion vector reliability index value calculation unit 216 supplies the calculated reliability index value Ft of the motion vector to the global motion calculation unit 217. The global motion calculation unit 217 temporarily maintains the input reliability index value Ft of the motion vector in response to the local motion vector LMV being supplied at that time.

If the above-described process is completed with respect to the whole target block of the target frame, the control unit 215 supplies a control instruction signal for starting the calculation of the global motion to the global motion calculation unit 217.

In the embodiment of the present invention, the global motion calculation unit 217 receives the control instruction signal, and performs the reliability decision with respect to the plural local motion vectors LMV, using the reliability index value Ft of the motion vector maintained accordingly. In the embodiment of the present invention, the weight coefficients W for the respective local motion vectors LMV are calculated by Equation 2 as described above. The global motion calculation unit 217 extracts only the local motion vectors LMV having a high reliability, of which the weight coefficient W is W=1.

Then, the global motion calculation unit 217 performs an operation of calculating the global motion GM using only the extracted local motion vectors LMV having the high reliability. In the example, the global motion calculation unit 217 estimates and calculates the global motion using an affine transformation. The global motion calculation unit 217 then supplies the calculated global motion GM to the global motion vector calculation unit 218.

The global motion vector calculation unit 218 calculates the global motion GMV of the target block by applying the global motion GM to the coordinate position (e.g. the center position) of the target block.

The global motion vector calculation unit 218 supplies the calculated global motion vector GMV to the background/moving object decision unit 210. The local motion vector LMV from the local motion vector calculation unit 214 is also supplied to the background/moving object decision unit 210.

The background/moving object decision unit 210, as described above, decides the degree of coincidence, i.e. the degree of background coincidence, of the local motion vector LMV for each target block and the global motion vector GMV with respect to the target block by comparing the local motion vector LMV with the global motion vector GMV. In this case, the background/moving object decision unit 210 performs the decision of the background and the moving object by comparing correlation values (i.e. SAD values) for the reference blocks corresponding to the local motion vector LMV and the global motion vector GMV, respectively.

On the other hand, the local motion vectors LMV and the correlation values (i.e. SAD values) obtained to calculate the global motion through the local motion vector calculation unit 214 may be used by the background/moving object decision unit 210 for the above-described comparison.

In this case, however, it is necessary that the local motion vector calculation unit 214 maintains the corresponding local motion vectors and the SAD values for as long as the necessary processing time of the global motion calculation unit 217 and the global motion vector calculation unit 218. In this case, since it is not noticed which reference vector the global motion vector GMV corresponds to, it is necessary to maintain the whole SAD value table with respect to the respective target blocks. Accordingly, a large-capacity memory for maintaining the local motion vectors LMV and the SAD values is necessary.

Considering this point, in the embodiment of the present invention, the local motion vector calculation unit 214 recalculates the local motion vectors LMV for comparison and the SAD values in the background/moving object decision unit 210. Accordingly, the local motion vector calculation unit 214 does not necessitate a memory for maintaining the local motion vectors LMV and the SAD values, and thus the memory capacity problem can be avoided.

Accordingly, the background/moving object decision unit 210 obtains the hit rate $\beta$ that represents the degree of background coincidence for the target block using the recalculated local motion vectors LMV and SAD values. The background/moving object decision unit 210 also acquires the SAD values for the reference blocks (i.e. positions of the reference blocks) that coincide with the global motion vector GMV during the corresponding recalculation operation. In addition, the background/moving object decision unit 210 decides whether the target block corresponds to the background part or the moving object part using the recalculated local motion vectors LMV and SAD values.

The background/moving object decision unit 210, as described above, corrects the SAD values for the reference blocks corresponding to the global motion vector GMV to the values in which the image noise has been reflected to be compared to the SAD values for the reference blocks corresponding to the local motion vectors LMV.

In general, the image noise occurs in accordance with the illumination value of the image. Accordingly, in the embodiment of the present invention, the maximum illumination value MaxTAR from the maximum illumination value detection unit 2192 and the minimum illumination value MinTAR from the minimum illumination value detection unit 2193 of the contrast calculation unit 219 are supplied to the background/moving object decision unit 210.

The background/moving object decision unit 210 detects the illumination value of the image as the difference between the maximum illumination value MaxTAR and the minimum illumination value MinTAR, and determines the correction value of the SAD value for the reference block corresponding to the global motion vector GMV in accordance with the detected illumination value.

In addition, the background/moving object decision unit 210 compares the correlation value after correction with the correlation value for the reference block corresponding to the local motion vector, and decides whether the correction value of the SAD value for the reference block corresponding to the global motion vector GMV is smaller (the correction value is higher) than the correlation value for the reference block corresponding to the local motion vector. If the correction value is smaller than the correlation value, the background/moving object decision unit 210 decides and estimates that the target block corresponds to the background part.

The background/moving object decision unit 210, if the hit rate β corresponds to the fact that the target block can be considered to be the background part, outputs the global motion vector GMV as the motion vector MVnr for NR process. Otherwise, the background/moving object decision unit 210 outputs the local motion vector LMV with respect to the target block as the motion vector MVnr for NR process.

As described above, the motion vector MVnr for NR process from the background/moving object decision unit 210 is supplied to the motion compensated image generation unit 22.

The motion compensated image generation unit 22 performs the deformation process corresponding to the motion vector MVnr for NR process with respect to the image data REFv of the reference frame sent through the motion vector calculation unit 21, and generates motion compensated image data MCv. The generated motion compensated image data MCv is supplied to the adding unit 17.

In addition, the background/moving object decision unit 210 supplies the obtained hit rate β to the adding rate calculation unit 21. The adding rate calculation unit 21 calculates the adding rate α of the motion compensated image for the target image based on the hit rate β.

In this case, the adding rate α can be calculated in the unit of a block or a pixel. Even in the case of calculating the adding rate α in the unit of a pixel, the hit rate β, which is in the unit of a block, takes part in the calculation of the adding rate α in the unit of a block.

In the case of calculating the adding rate α in the unit of a block, the adding rate α can be calculated only according to the hit rate β. The adding rate α can also be calculated by adding other adding rate calculation elements except for the hit rate β. In the embodiment of the present invention, the adding rate α is calculated by adding factors, such as a difference in pixel unit between the target image and the motion compensated image, noise of the target image, and the like, to be described later, in addition to the hit rate β.

The adding rate α obtained by the adding rate calculation unit 21 is supplied to the adding unit 23. The adding unit 23 adds the image data MCv of the motion compensated image to the image data TGv of the target image being sent with the adding rate α.

In the embodiment of the present invention, in the adding unit 23, the target image and the motion compensated image overlap each other at an adding rate according to the degree of background coincidence (i.e. hit rate β) of the target block. That is, in a still image part, the adding rate of the motion compensated image to the target image is heightened, while in a moving object part, the adding rate of the motion compensated image to the target image is lowered.

Accordingly, in the embodiment of the invention, in the background part and the moving object part, image overlapping can be performed at proper adding rates, respectively. Thus, the NR image obtained by the image overlapping is satisfactory.

In addition, in the embodiment of the present invention, since the global motion and the global motion vector GMV are generated from the local motion vector LMV having a high reliability, it is a motion vector having a high accuracy, and thus a good addition NR image can be obtained.

[Whole Processing Flow for NR Image Generation]

Figure 17:
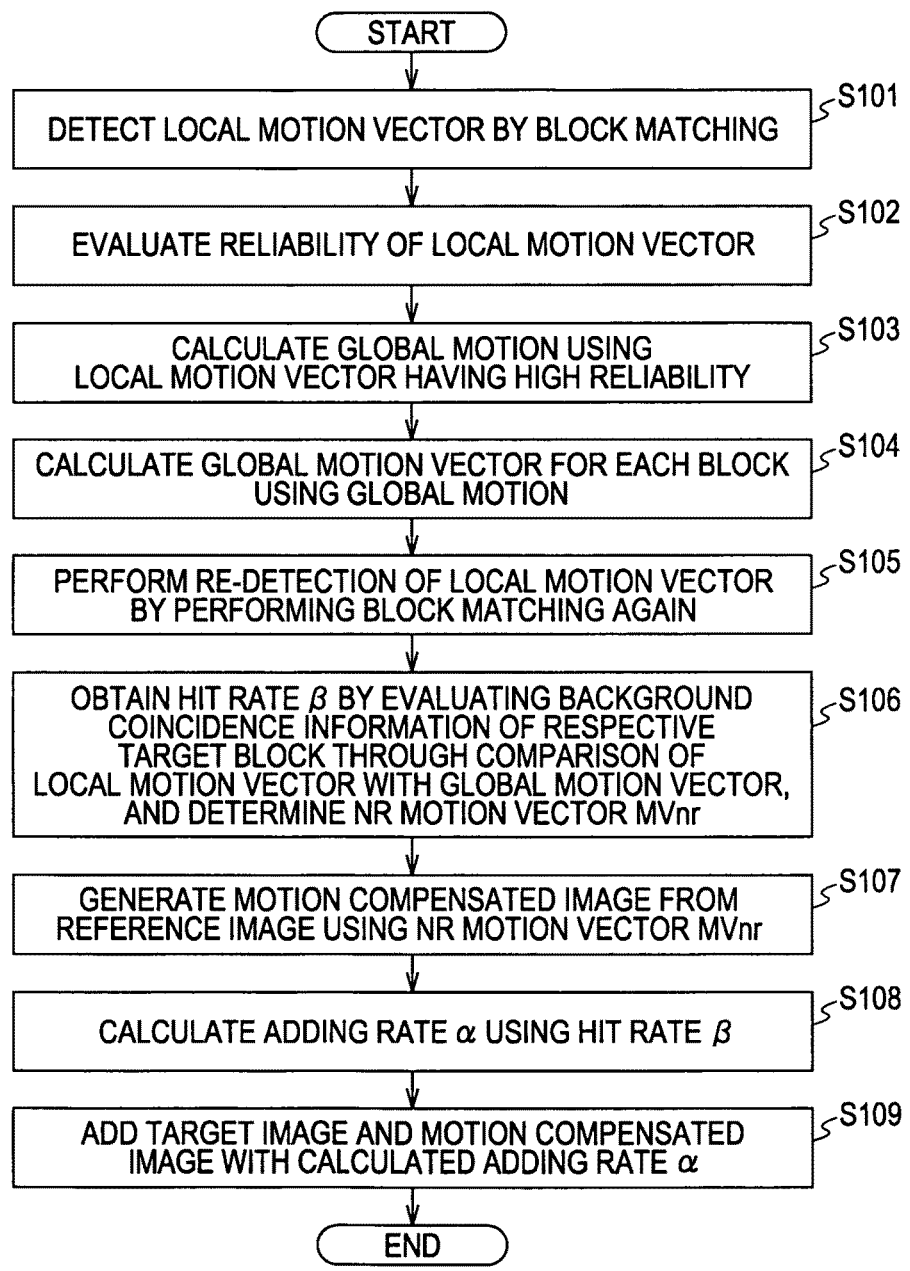
FIG. 17 is a diagram illustrating a flowchart explaining a primary processing operation of an image processing device according to an embodiment of the present invention.

FIG. 17 is a flowchart illustrating a processing flow of generating an NR image with respect to the captured image received in the image memory 4.

First, the motion vector calculation unit 21 detects the local motion vector LMV generated by blocking matching in the local motion vector calculation unit 214 (step S101). Then, the motion vector reliability index value calculation unit 216 calculates the reliability index value Ft for the detected local motion vector LMV using the first minimum value MinSAD of the SAD value calculated in the local motion vector calculation unit 214 and the second minimum value Btm2SAD (step S102).

Then, the global motion calculation unit 217 extracts local motion vectors LMV having a high reliability based on the calculated reliability index value Ft, and calculates the global motion GM using only the extracted local motion vectors LMV having a high reliability (step S103).

Then, by using the global motion GM calculated in step S103, the global motion vector GMV is calculated for each target block (step S104).

In addition, the local motion vector calculation unit 214 redetects the local motion vectors LMV by re-performing the block matching process (step S105). Then, the SAD value (MinSAD) in the reference block position (i.e. reference vector), in which the local motion vectors LMV are detected, is maintained, and simultaneously, the SAD value for the reference block corresponding to the global motion vector GMV calculated in step S104 is also maintained. In this case, it is not necessary to calculate the reliability index value Ft of the local motion vector LMV.

Then, the background/moving object decision unit 210 compares the local motion vector LMV calculated in step S105 with the global motion vector GMV obtained in step S104, and obtains the hit rate β by evaluating the degree of background coincidence for each target block. In addition, the background/moving object decision unit 210 determines and outputs the motion vector MVnr for NR process for each target block to the motion compensated image generation unit 22 (step S106).

In comparing the local motion vector LMV with the global motion vector GMV in step S106, the SAD values for the reference blocks corresponding to the local motion vector LMV and the global motion vector GMV are compared with each other. Further with respect to the SAD values for the reference block corresponding to the global motion vector GMV, as described above, the correction is performed in accordance with the image noise.

Then, the motion compensated image generation unit generates a motion compensated image for each reference block using the motion vector MVnr for the NR process determined in step S106, and outputs the generated motion compensated image to the adding unit 23 (step S107).

Then, the adding rate calculation unit 21, as described above, in this embodiment, calculates the adding rate α for each pixel using the hit rate β obtained in step S106, and supplies the calculated adding rate to the adding unit 23 (step S108).

The adding unit 23 then generates an NR image by making the target image and the motion compensated image generated in step S107 overlap each other for each pixel at the adding rate α calculated in step S108 (step S109). Through the above-described processes, the NR image process is completed.

FIG. 17 shows an image processing operation for one sheet of a certain target frame. In the case of overlapping three or more sheets of images, the process of FIG. 17 is repeated in a state in which the generated addition NR image is considered as the target frame and an image newly to overlap is considered as the reference frame.

Hereinafter, the detailed processing operation of primary parts of the motion vector calculation unit 21 will be described.

<Processing Operation of Global Motion Calculation Unit 217 and Global Motion Vector Calculation Unit 218>
<Regarding Extended Affine Transformation>

In the embodiment of the present invention, the global motion is calculated (i.e. estimated) from the plural local motion vectors LMV, and the global motion vector GMV is calculated (i.e. the global motion is estimated) from the calculated global motion. In this case, a method of expressing the global motion in affine transformation is used.

As a method of deriving the most desirable global motion from many and unspecified vectors, in the embodiment of the present invention, a method of using the affine transformation as described above is used. According to this method, parameters of the global motion are processed using a least square method as the local motion vectors of a block, which is not suitable to the global motion, such as a moving object, among the blocks having a high reliability, are gradually excluded.

In FIG. 18, a general affine transformation equation is shown as Equation 3. In Equation 3, "v" denotes a horizontal component of a motion vector of a target block, "w" denotes a vertical component of a motion vector of a target block, and "a, b, c, d, e, and f" denote affine parameters. Here, in affine transformation, affine parameters a, b, c, d, e, and f are fixed values. "x" and "y" denote horizontal and vertical components of the center coordinates of the target block.

In the processing operation of the global motion, a motion vector (this vector is called an ideal motion vector) according to the global motion is obtained from the obtained affine parameters and the center coordinates of the respective target block. The sum ε of errors between the ideal vector and the observed (i.e. detected by block matching) motion vector is represented as in Equation 4 in FIG. 19.

The subject of the global motion derivation is to estimate affine parameters a, b, c, d, e, and f that minimize the sum ε of errors, and this can be solved, for example, by the least square method.

However, a typical affine transformation has a drawback that it may not cope with a "trapezoidal correction." The trapezoidal correction is a phenomenon caused by a rotation component of a pitch axis (i.e. axis in a vertical direction) or yaw axis (i.e. horizontal axis perpendicular to the vertical direction) of vibration (hand blur). According to this phenomenon, a tetragonal plane positioned in front is deformed to a trapezoidal plane, and thus this phenomenon is called a trapezoidal distortion or keystone in FIG. 20.

Figure 20B:
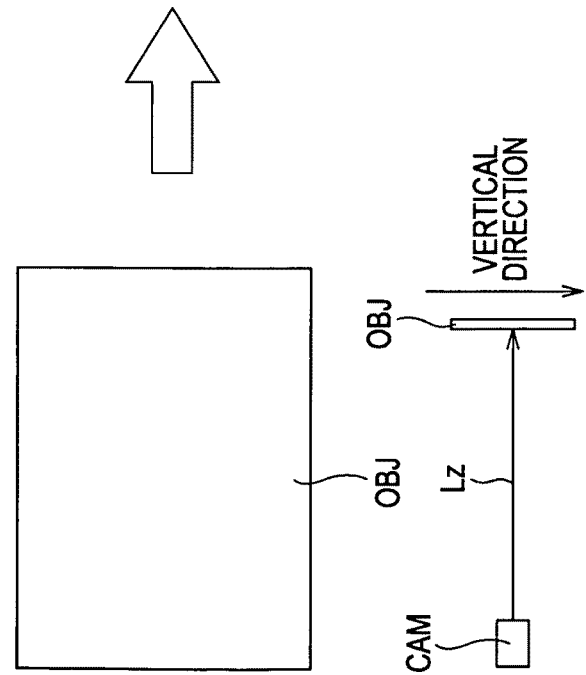
FIGS. 20A and 20B are diagrams illustrating extended affine transformation used to obtain global motion from a local motion vector in an image processing device according to an embodiment of the present invention.
Figure 20A:
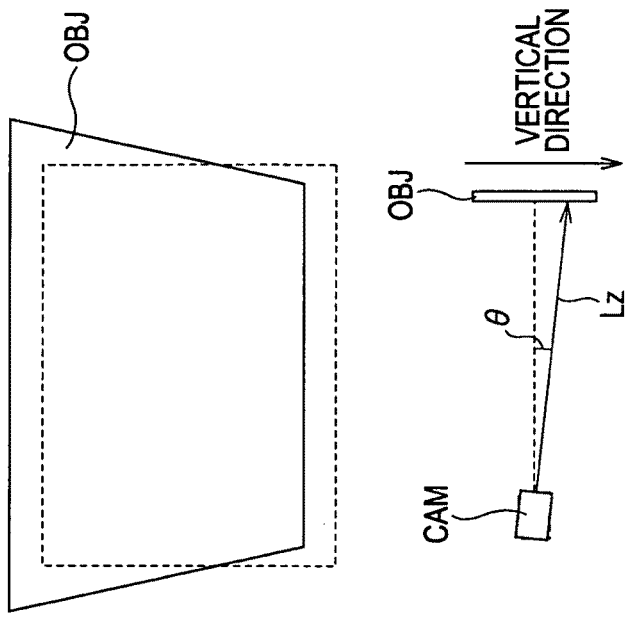

That is, as illustrated in a lower part of FIG. 20A, if the camera CAM is positioned to directly face the object OBJ so that the optical axis Lz of the camera CAM is perpendicular to the tetragonal plane of the object OBJ, the captured image of the tetragonal plane of the object OBJ becomes the tetragonal plane as illustrated in an upper part of FIG. 20A.

By contrast, as illustrated in a lower part of FIG. 20B, if the optical axis Lz of the camera CAM does not directly face the object OBJ, but is rotated about a pitch axis by an angle θ (i.e. rotated within a vertical plane), the captured image of the tetragonal plane of the object OBJ is changed to become a trapezoid, as shown in an upper part of FIG. 20B. Specifically, the length of the tetragonal plane in left/right direction (i.e. horizontal direction of the image) is linearly changed in accordance with the angle θ to form a trapezoid.

At this time, although not illustrated in the drawing, if the optical axis Lz of the camera CAM does not directly face the object OBJ, but is rotated about a yaw axis by an angle θ (i.e. rotated within a horizontal plane), the captured image of the tetragonal plane of the object OBJ is changed to become a trapezoid. Specifically, the length of the tetragonal plane in an upward/downward direction (i.e. vertical direction of the image) is linearly changed in accordance with the angle θ to form a trapezoid.

Although a process of reforming the image captured with vibration (i.e. hand blur) into its original state in which the camera directly faces the object is called a trapezoidal correction or trapezoidal correction, as described above, it is not able to be expressed in parameters of affine transformation. For example, as illustrated in FIG. 20B, in the case of considering a trapezoidal correction for returning the trapezoidal image to a tetragonal image, an upper part of the captured image is horizontally reduced along the vertical axis (i.e. y-axis), and a lower part of the captured image is horizontally extended.

However, a parameter of horizontal extension or reduction, among parameters of the affine transformation as described above, is a, and since this parameter a has a constant value, the affine transformation is not able to correspond to this correction.

In the embodiment of the present invention, in consideration of the above-described points, a method capable of successfully detect the global motion, even if there is a trapezoidal deformation in the image, is used.

That is, in the embodiment of the present invention, an extended affine transformation (hereinafter referred to as an extended affine transformation), which is modified from a typical affine transformation as illustrated in FIG. 18, is used.

Figures 21, 22:
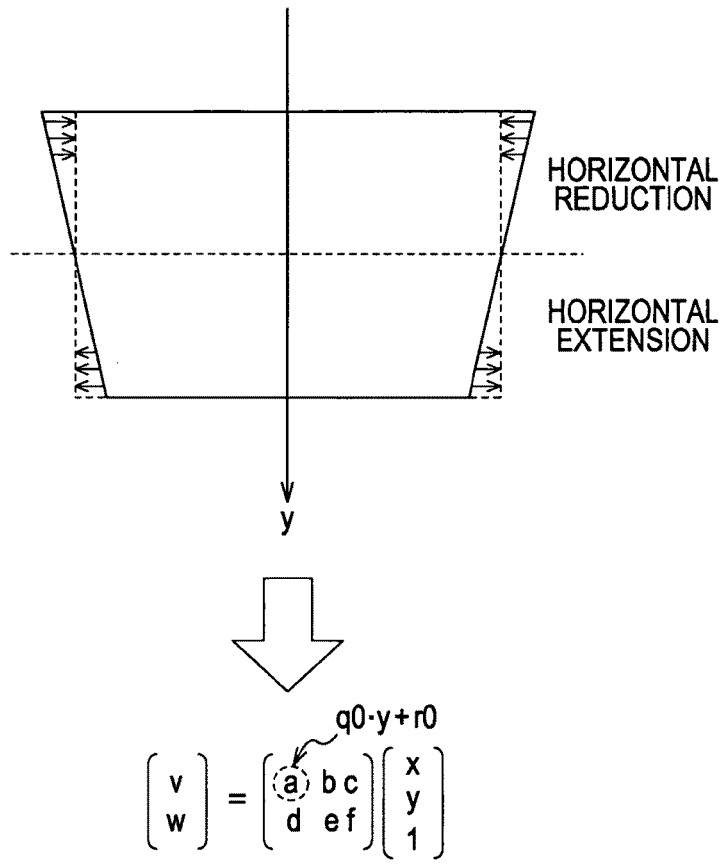
FIG. 21 is a diagram illustrating extended affine transformation used to obtain global motion from a local motion vector in an image processing device according to an embodiment of the present invention.
FIG. 22 is a diagram illustrating an equation used to explain a process example of obtaining global motion from a local motion vector in an image processing device according to an embodiment of the present invention.

In the case of considering the trapezoidal correction for returning the trapezoidal image as indicated as solid line in FIG. 21 to a tetragonal (or rectangular) image as indicated as dotted line in FIG. 21, an upper half of the trapezoidal image is horizontally reduced and a lower half thereof is horizontally extended along the vertical axis (i.e. y-axis) as indicated as an arrow in FIG. 21.

In a typical affine transformation, a parameter a related to horizontal extension/reduction among parameters a, b, c, d, e, and f of the affine transformation is a, and this parameter a has a constant value, the typical affine transformation is not able to correspond to the trapezoidal correction.

Accordingly, as illustrated on lower side of FIG. 21, by replacing the parameter a by q0·y+r0 so that the value of the parameter a is changed along y-axis, the extension/reduction rate in the horizontal direction is linearly changed along the vertical axis. That is, the parameter a is replaced with a function of a variable y on y-axis for the trapezoidal correction. Here, for the trapezoidal correction in FIG. 21, the parameter a refers to a linear function, i.e. the first-order function q0·y+r0.

Although FIG. 21 is in consideration of the trapezoidal correction in accordance with rotation of a pitch axis, it is also necessary to consider a trapezoidal correction in accordance with the rotation of yaw axis, or a trapezoidal correction in accordance with both rotations of the pitch axis and the yaw axis.

Accordingly, in the embodiment of the present invention, the way of thinking explained using FIG. 21 is extended. That is, in order to extend/reduce the affine transformation along a certain axis in a direction perpendicular to the axis, parameters a, b, d, and e should be replaced with pn·x+qn·y+rn (n=0, 1, 2, and 3), as Equation 5 in FIG. 22.

Here, the affine parameters a, b, d, and e are parameters participating in deformation of an image, while the affine parameters c and f are parameters participating in shift of an image in left, right, upward, and downward directions. Accordingly, the affine parameters c and f are not replaced with functions.

Equation 5 includes 14 parameters in total, and thus the extended affine transformation seems to have a high complicity. However, by expanding and arranging Equation 5, equation 5 is changed to Equation 6 using 12 parameters as illustrated in FIG. 23.

Although the extended affine transformation equation is complicated, it is possible to constantly derive solutions for plural local motion vectors by a least square method. Since this method is the same as the affine transformation, only the final results are presented in Equations 7 to 11 respectively as illustrated in FIGS. 24 to 28.

In the embodiment of the present invention, as illustrated in FIG. 22, all the affine parameters a, b, d, and e, participating in deformation of the image, are replaced with functions. However, in the case in with the deformation of the image occurs only in a specified direction, only the parameters in the direction are necessary to be replaced by function. For example, in the case of considering only the deformation appearing on an upper side in FIG. 21, only the parameter a is replaced with a function as indicate on the lower side in FIG. 21.

In the extended affine transformation as described above, the function replacing the parameter is a first-order function since a linear displacement is presented. In the case of presenting a curved displacement, a second or more order function may be used.

<Calculation of Global Motion Using Extended Affine Transformation>

Figure 30:
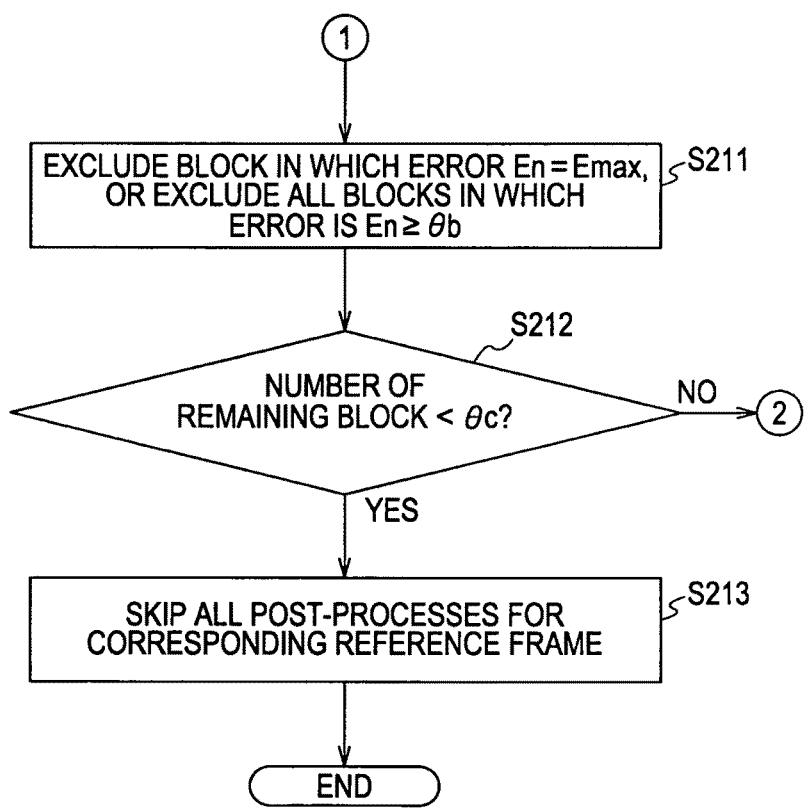
FIG. 30 is a diagram illustrating a part of a flowchart explaining a processing operation of a global motion calculation unit in an image processing device according to an embodiment of the present invention.

As a method of deriving the most preferable global motion from many and unspecified vectors, in the embodiment of the present invention, a method represented in flowcharts of FIGS. 29 and 30 is used. According to this method, parameters of the global motion are processed using a least square method as the local motion vectors of a block, which is not suitable to the global motion, such as a moving object, among blocks having a high reliability, are gradually excluded.

In the processes of FIGS. 29 and 30, by introducing the extended affine transformation, it is possible to derive the optimal global motion including the trapezoidal, at an actual operation cost, as excluding error vectors, such as a moving object and so on, from many local motion vectors having a low precision.

However, since the extended affine transformation according to the embodiment of the present invention has many deformation parameters and is flexible, there is a possibility that it operates on false motion vectors, such as moving object, noise, and the like, in operating the global motion, and thus such false motion vectors is not able to be excluded.

Accordingly, in the embodiment of the present invention, as illustrated in FIGS. 29 and 30, at an initial stage of a procedural operation loop, exclusion of false motion vectors (called error vectors) is performed using the typical affine transformation, and then the procedural operation using the extended affine transformation is performed. In other words, by using the typical affine transformation, vector errors are reduced to the extent that the vectors of trapezoidal components are not excluded, and then by using the extended affine transformation, a method for testing the high precision procedure corresponding to the trapezoidal components is used.

In addition, in the embodiment of the present invention, the maximum value of the vector error, which corresponds to a difference between the motion vector (i.e. global motion vector) obtained from the global motion GM obtained in the procedural operations and the detected motion vector (above-described local motion vector LMV)

Then, if the detected maximum value of the vector error is larger than a predetermined threshold value, the typical affine transformation is continuously performed, while the detected maximum value of the vector error is below the predetermined threshold value, the procedural operation using the extended affine transformation is performed.

This will be described with reference to flowcharts in FIGS. 29 and 30.

First, the motion vector calculation unit 21 compares the reliability index value Ft of the motion vector with a predetermined threshold value, with respect to plural local motion vectors LMV. Then, if the reliability index value Ft of the motion vector is larger than the threshold value as a result of comparison, the motion vector calculation unit 21 selects only a target block (hereinafter referred to as a "block") of the local motion vectors LMV having a higher reliability than the threshold value (step S201). This process, as described above using Equation 7, corresponds to a case in which two values of 1 and 0 are used as the weight coefficients W.

Then, the motion vector calculation unit 21 judges whether the loop of the procedural operation is the first loop (step S202). If it is decided that the loop of the procedural operation is the first loop, the motion vector calculation unit 21 uses only the local motion vectors LMV of the selected plural blocks, and derives (i.e. estimates) the global motion GM using the typical affine transformation (step S203). That is, it calculates the affine parameters a, b, c, d, e, and f for the global motion GM.

Then, the motion vector calculation unit 21 calculates theoretical local motion vectors LMVs of the selected block, based on the derived global motion GM (step S206).

Then, in the selected blocks, the motion vector calculation unit calculates an error En between the local motion vector LMV obtained by block matching process, and the theoretical local motion vector LMVs obtained in step S206 (step S207).

The calculation of the error between the motion vector obtained by the block matching and the theoretical motion vector is performed by accurately calculating a distance from Pythagoras's theorem if the accuracy of the operation is accounted much. However, if a light operation is accounted much, rather than the precision of the operation, the horizontal and vertical distances are obtained, and their sum is used as an approximate distance.

Then, using the whole errors En obtained with respect to the selected plural blocks, a mean value Eave of errors and the maximum value Emax are calculated (step S208). Then, it is judged whether the mean value Eave is smaller than the predetermined threshold value θa, and whether the maximum value Emax is smaller than the predetermined threshold value θb (step S209).

If it is judged that the result of judgment in step S209 does not satisfy the condition, the block having an error of En=Emax among errors En of the respective blocks obtained in step S207 is excluded from the plural blocks deriving the global motion. On the other hand, blocks in which the error En is En≧θb is detected, and the whole detected blocks are excluded from plural blocks for deriving the global motion GM (step S211 in FIG. 30).

In step S211, then, it is decided whether the number of the remaining blocks, as a result of block exclusion, is smaller than the predetermined threshold value θc (step S212). In step S212, if it is judged that the number of the remaining blocks is not smaller than the threshold value θc, the motion vector calculation unit goes back to step S202, and repeats the process of step S202 and subsequent steps, considering the remaining blocks as the selected blocks.

If the number of the remaining blocks is smaller than the threshold value θc, a proper global motion GM is not obtained, and the image of the reference frame to be an object to overlap is not able be used for image overlapping. Accordingly, if it is judged that the number of the remaining blocks is smaller than the threshold value θc in step S212, the subsequent process for the corresponding reference frames is not performed to be skipped (step S213).

In step S202, then, if it is judged that the loop of the procedural operation is not the first loop, the motion vector calculation unit 21 decides whether the maximum value Emax of the error En of the respective block obtained in step S207 is larger than the predetermined threshold value θd (step S204).

Here, the threshold value θd is selected to have a value to the extent that the global motion GM is operated using the typical affine transformation, and the vectors of the trapezoidal components are not excluded when the error vectors are excluded in step S211.

If it is judged that the maximum value Emax of the error En is larger than the predetermined threshold value θd in step S204, the motion vector calculation unit 21 goes to step S203, and derives the global motion GM using the typical affine transformation. That is, it calculates the parameters of the extended affine parameters. Then, it repeats the process of step S203 and the subsequent steps.

If it is judged that the maximum value Emax of the error En is equal to or smaller than the predetermined threshold value θd in step S204, the motion vector calculation unit 21 uses only the local motion vectors LMV of the selected plural blocks, and derives the global motion using the extended affine transformation (step S205). After step S205, the motion vector calculation unit repeats the process of the step S206 and subsequent steps.

Then, in step S206 in FIG. 29, if it is judged that the mean value Eave of the error En is smaller than the threshold value θa, and the maximum value Emax of the error En is smaller than the threshold value θb, the motion vector calculation unit considers that the operation is processed, and confirms the global motion GM at that time (step S210), and then terminates the processing routine.

In step S211, whether only the blocks of which the error En is the maximum error Emax are excluded, or whether the blocks in which the error En is equal to or larger than the threshold value θb are excluded, may be determined by the balance between the procedural speed and accuracy when the global motion vector GMV is obtained. If the accuracy is preferential, the former is adopted, and the error blocks are excluded one by one, while if the speed is preferential, the latter can be adopted.

In the above-described example, in deciding the conversion of the operation using the typical affine transformation and the operation using the extended affine transformation, the maximum value Emax of the error En is used in step S204.

However, the decision of conversion in step S204 may be made in consideration of not only by the maximum value Emax of the error En but also the mean value Eave of the error En.

That is, it is judged whether the mean value Eave of the error En is larger than the predetermined threshold value in step S204, and if the mean value Eave is larger than the threshold value, the operation using the typical affine transformation is performed. If the mean value Eave is the threshold value or less, the operation using the extended affine transformation is started.

In addition, it is judged whether both the maximum value Emax of the error En and the mean value Eave are larger than the predetermined threshold value in step S204. If it is judged that both values are larger than the threshold value, the operation using the typical affine transformation is performed, and if both values are smaller than the threshold value, the operation using the extended affine transformation is started.

In this case, the range of the vibration correction can be specified from the optical zoom magnification or a set form. Since the maximum value of the trapezoidal components is obtained from the maximum amount of vibration, the specification of the threshold value is relatively easy.

The global motion vector calculation unit 218 calculates the global motion vector GMV for each target block based on the calculated global motion GM. That is, the global motion vector calculation unit 218 obtains the motion vectors (corresponding to the theoretical local motion vectors LMVs) for each target block by Equation 6 in FIG. 23, using the parameters a, b, c, d, e, f, g, h, i, j, k, and l (See FIG. 23) of the extended affine transformation for the calculated global motion GM. In Equation 6 in FIG. 23, x and y become the coordinates of the center position for each target block. The obtained motion vector will be the global motion vector GMV for each target block.

Then, the motion compensated image generation unit 22 receives the global motion vector GMV for each target block, obtained as described above. In addition, the motion compensated image generation unit 22 generates the motion compensated image for each target block, and supplies the motion compensated image every the produced block to the adding unit 23, by using the global motion vector GMV for each target block.

[Example of Configuration and Processing Operation of Background/Moving Object Decision Unit 210]

As described above, the background/moving object decision unit 210 acquires the SAD values for the reference blocks corresponding to the global motion vector GMV calculated by the global motion vector calculation unit 218 when the block matching is repeated by the local motion vector calculation unit 214. The background/moving object decision unit 210 corrects the acquired SAD value by the correction value in accordance with the image noise, as described above. In the embodiment of the present invention, two correction methods by the correction value are provided.

First Example

SAD Value Correction by Offset Addition

Figure 31:
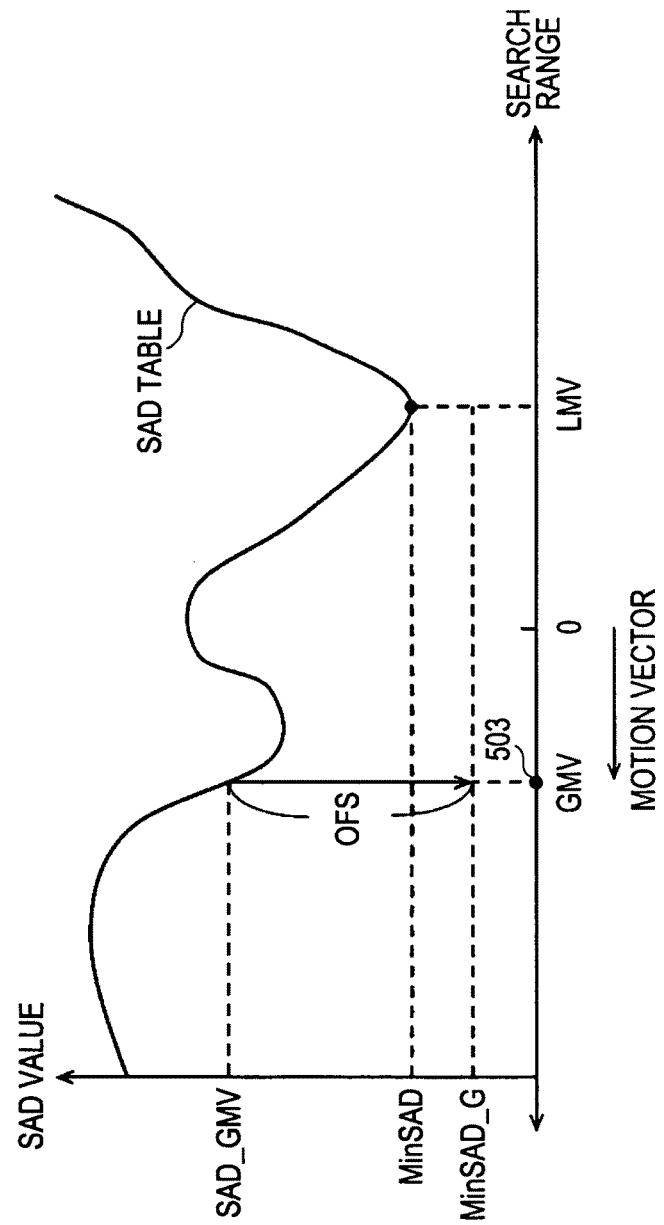
FIG. 31 is a diagram illustrating a process of evaluating the degree of background coincidence of a target block using a global motion vector GMV according to an embodiment of the present invention.

FIG. 31 is a diagram explaining the feature of the first example. FIG. 31 shows the contents (i.e. SAD values) of a SAD table for one target block in a state in which the horizontal axis represents a search range and the vertical axis represents SAD values. Each value on the horizontal axis refers to a position of a reference block (i.e. reference vector), and a solid line indicates the contents of the SAD table. This is completely identical to that illustrated in FIG. 15.

In FIG. 31, the position (i.e. the reference vector) 501 of the reference block that corresponds to the minimum SAD value, in the same manner as in FIG. 15, it is detected as the local motion vector LMV by block matching. On the other hand, the position of the reference block that corresponds to the global motion vector GMV becomes the position 503 in FIG. 31.

In this case, if the SAD value in the local motion vector LMV and the SAD value in the global motion vector GMV are in a difference range in accordance with the image noise, there is a possibility that the global motion vector GMV becomes the reference vector that takes the minimum SAD value.

That is, it is assumed that although it is natural that the SAD value in the global motion vector GMV (i.e. the position of the reference block) becomes the minimum value, the position of another reference block (i.e. local motion vector LMV) is actually detected to have the minimum value due to the noise.

Accordingly, in this example, the correction is performed by adding the offset value OFS according to the image noise to the SAD value in the global motion vector GMV. In this case, the correction is made by subtracting the offset value OFS from the SAD value (so called SAD_GMV) in the global motion vector GMV. That is, the SAD value after the correction MinSAD_G is obtained by $$\text{MinSAD\_G} = \text{SAD\_GMV} - OFS \quad \text{(Eq. 12)}$$

Here, if a too large offset value OFS is set, even the motion vector of the moving object is decided as the minimum SAD value. Accordingly, in the embodiment of the present invention, the offset value OFS is set to a value which is smaller than the threshold value th (See Equation 2) against the reliability index value Ft of the local motion vector.

Then, the background/moving object decision unit 210 compares the SAD value MinSAD_G after correction with the SAD value MinSAD in the local motion vector LMV. If MinSAD_G<MinSAD as a result of comparison, it is evaluated that the minimum value of the SAD value for the corresponding target block is MinSAD_G which is the corrected value of the SAD value for the reference block corresponding to the global motion vector GMV. FIG. 31 shows the case in which the SAD value MinSAD_G after correction is smaller than the SAD value MinSAD in the local motion vector LMV, i.e. MinSAD_G<MinSAD.

As shown in FIG. 31, if the SAD value MinSAD_G after correction is smaller than the SAD value MinSAD in the local motion vector LMV, i.e. MinSAD_G<MinSAD, it is evaluated that the actual local motion vector for the corresponding target block coincides with the global motion vector GMV. In this case, it is evaluated that the degree of background coincidence for the corresponding target block is high, and a large value is set as the hit rate β for the corresponding target block. In addition, the motion vector for NR process for the corresponding target block becomes the global motion vector GMV.

In the embodiment of the preset invention, the hit rate β is a value in the range of 0≦β≦1. When the local motion vector LMV completely coincides with the global motion vector GMV, the hit rate β becomes 1. However, in this example, it is not evaluated whether the local motion vector LMV completely coincides with the global motion vector GMV, but the evaluation is made by comparing the SAD value MinSAD_G after correction with the SAD value MinSAD in the local motion vector LMV. Accordingly, the results of evaluation may include a case in which the local motion vector LMV completely coincides with the global motion vector GMV, and a case in which the local motion vector does not coincide with the global motion vector.

As described later, in the embodiment of the present invention, if the SAD value MinSAD_G after correction is smaller than the SAD value MinSAD in the local motion vector LMV, i.e. MinSAD_G<MinSAD, the hit rate β is, for example, β=0.75. Here, the reason why the hit rate β is not set to 1 is that the comparison result includes a case in which the local motion vector LMV does not coincide with the global motion vector GMV as described above.

Figure 32:
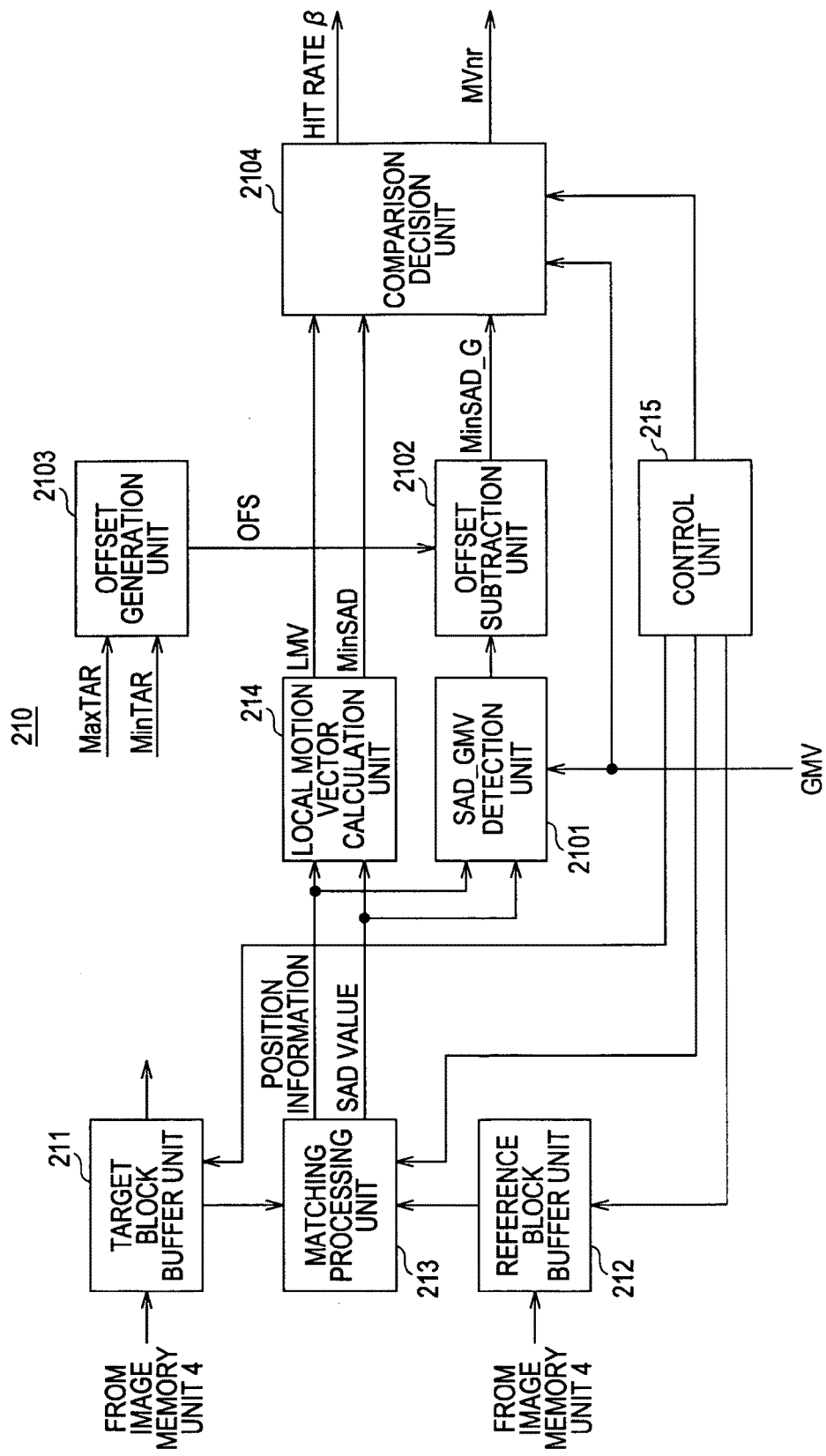
FIG. 32 is a block diagram illustrating an example of the configuration of a background/moving object decision unit in an image processing device according to an embodiment of the present invention.

FIG. 32 shows an example of the configuration of the background/moving object decision unit 210 (i.e. functional block diagram) in the first example and its peripheral parts.

In the example of FIG. 32, the background/moving object decision unit 210 is provided with a SAD_GMV detection unit 2101, an offset subtraction unit 2102, an offset generation unit 2103, and a comparison decision unit 2104.

In this example, the SAD value calculated when the block matching is re-performed through the matching processing unit 213 and position information (i.e. information of the reference vector) of the respective reference block are supplied to the local motion vector calculation unit 214. The local motion vector calculation unit 214 detects the minimum SAD value MinSAD when the block matching is re-performed, and calculates the local motion vector LMV (i.e. position information (i.e. information of the reference vector) of the reference block). Then, the local motion vector calculation unit 214 supplies the local motion vector LMV and the minimum SAD value MinSAD, which are obtained as a result of re-performing the block matching, to the comparison decision unit 2104.

The SAD value calculated when the block matching is repeated through the matching processing unit 213 and position information (i.e. information of the reference vector) of the respective reference block are also supplied to the SAD_GMV detection unit 2101. The SAD_GMV detection unit 2101 detects the SAD value SAD_GMV for the reference block of the reference vector that coincides with the global motion vector GMV, and supplies the detected SAD value SAD_GMV to the offset subtraction unit 2102.

The offset subtraction unit 2102 subtracts the offset value OFS from the offset generation unit 2103 from the SAD value SAD_GMV from the SAD_GMV detection unit 2101, and generates the SAD value MinSAD_G after correction. In addition, the offset subtraction unit 2102 supplies the generated SAD value MinSAD_G after correction to the comparison decision unit 2104.

The offset generation unit 2103 generates the offset value OFS in accordance with the image noise, and supplies the generated offset value to the offset subtraction unit 2102. Considering that the image noise depends upon the illumination value of the image, information of a table corresponding to diverse illumination value and the offset values OFS is stored in the offset generation unit 2103.

The offset generation unit 2103 calculates the illumination value of the target block as a difference between the maximum illumination value MaxTAR from the maximum illumination value detection unit 2192 and the minimum illumination value MinTAR from the minimum illumination value detection unit 2193. The offset generation unit 2103 considers the calculated illumination value of the target block as a factor, searches for the corresponding table, and acquires the offset value OFS corresponding to the illumination value of the factor.

The comparison decision unit 2104, as described above, compares the minimum SAD value MinSAD corresponding to the local motion vector LMV with the SAD value Min-SAD_G after correction from the offset subtraction unit 2102, and generates and outputs the hit rate β in accordance with the result of comparison.

In addition, the comparison decision unit 2104 also supplies the local motion vector LMV recalculated from the local motion vector calculation unit 214 and the global motion vector GMV from the global motion vector calculation unit 218.

If the SAD value MinSAD_G after correction is smaller than the SAD value MinSAD in the local motion vector LMV, i.e. MinSAD_G<MinSAD, the degree of background coincidence is heightened, and thus the comparison decision unit 2104 outputs the global motion vector GMV to the motion compensated image generation unit 22 as the vector MVnr for NR process. If the SAD value MinSAD_G after correction is not smaller than the SAD value MinSAD in the local motion vector LMV, i.e. MinSAD_G≧MinSAD, the degree of background coincidence is lowered, and thus the comparison decision unit 2104 outputs the local motion vector LMV to the motion compensated image generation unit 22 as the vector MVnr for NR process.

On the other hand, SAD value detection unit 2101 of the global motion vector GMV and the offset subtraction unit 2102 may be configured to be included in the local motion vector calculation unit 214. In this case, the local motion vector calculation unit 214 performs the subtraction of the offset OFS by detecting the SAD value SAD_GMV for the reference block corresponding to the global motion vector GMV as it re-performs the block matching.

<Flow of Background/Moving Object Decision Process>

Figure 33:
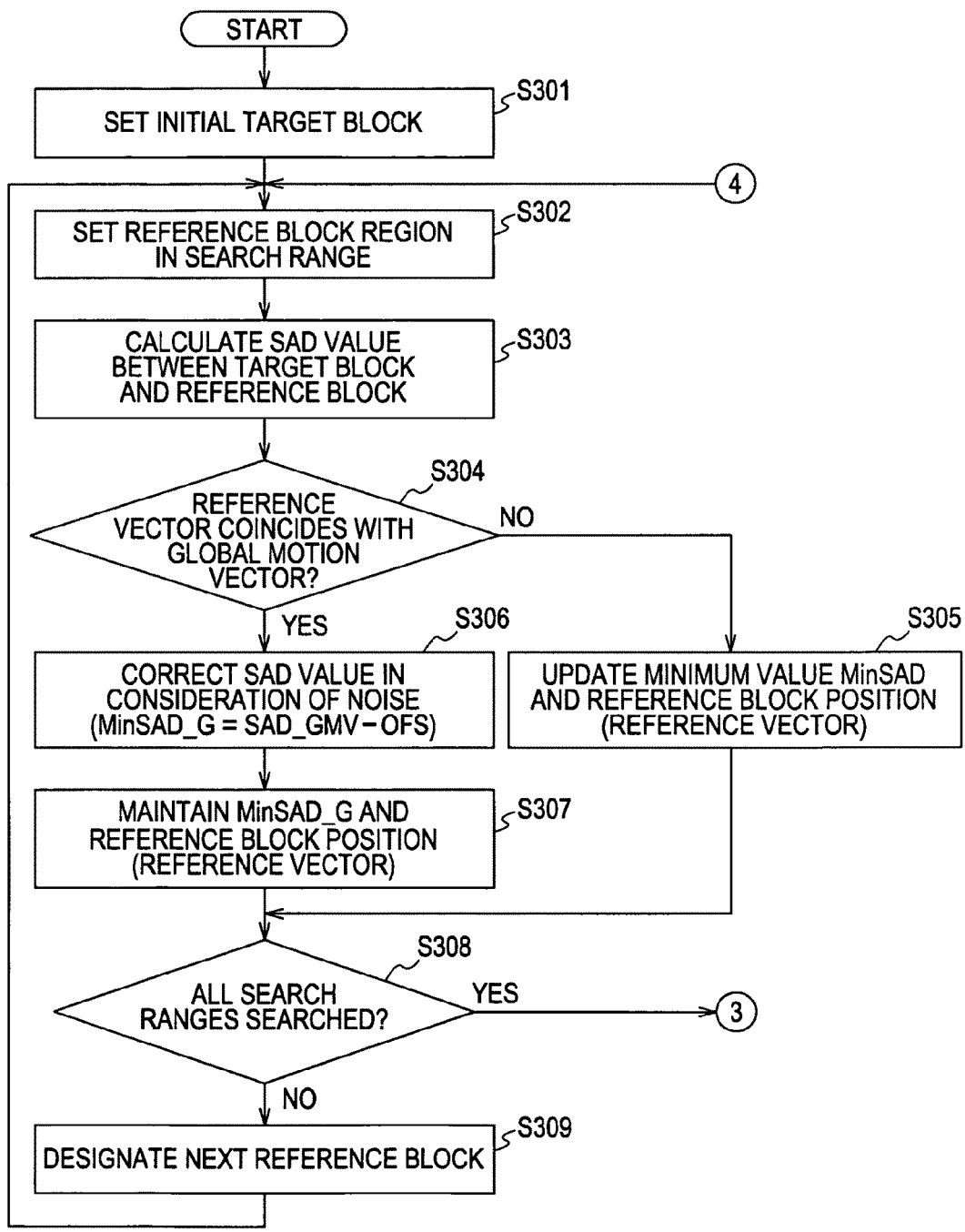
FIG. 33 is a diagram illustrating a part of a flowchart explaining a processing operation of a background/moving object decision unit in an image processing device according to an embodiment of the present invention.
Figure 34:
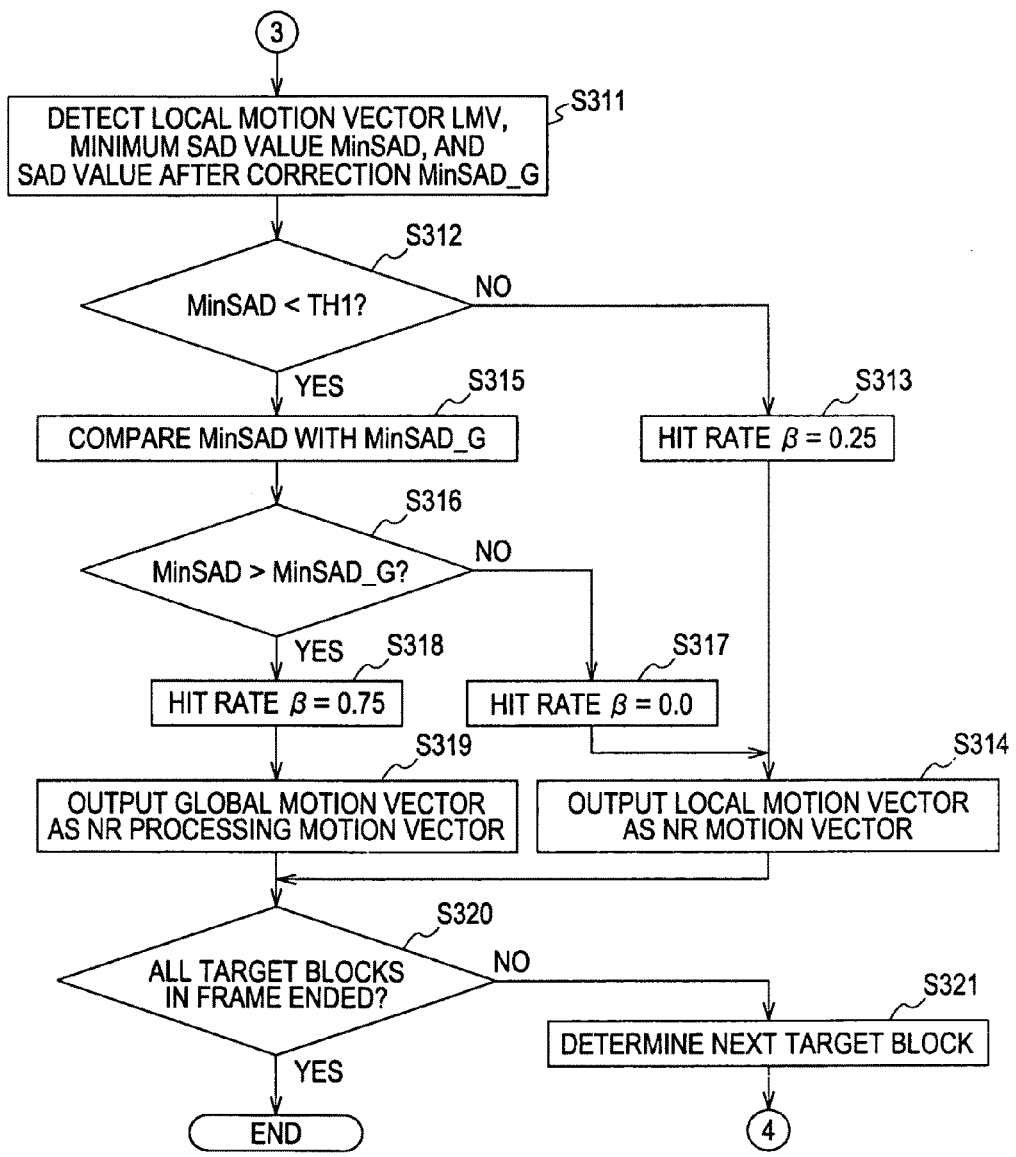
FIG. 34 is a diagram illustrating a part of a flowchart explaining a processing operation of a background/moving object decision unit in an image processing device according to an embodiment of the present invention.

The flow of the repetition of the block matching through the local motion vector calculation unit 214 having the configuration of FIG. 32 and the evaluation process of the degree of background coincidence through the background/moving object decision unit 210 will be described in more detail with reference to the flowchart of FIGS. 33 and 34. The process as illustrated in FIGS. 33 and 34 is performed by respective units under the control of the control unit 215. In the example of FIGS. 33 and 34, the SAD_GMV detection unit 2101 and the offset subtraction unit 2102 are included in the local motion vector calculation unit 214.

First, under the control of the control unit 215, the block matching is repeated, and an initial target block is set in the target block buffer unit 211 (step S301). Then, under the control of the control unit 215, a reference block to be block-matched is set among the image data of the reference frame in a matching processing range, which is buffered in the reference block buffer 212 (step S302).

The matching processing unit 213 calculates the SAD value by performing the block matching processing with respect to the set target block and the set reference block. Then, the matching processing unit 213 supplies the obtained SAD value to the local motion vector calculation unit 214 together with the position information (i.e. reference vector) of the reference block (step S303).

The local motion vector calculation unit 214 judges whether the reference vector coincides with the global motion vector GMV (step S304). This corresponds to the processing operation of the SAD_GMV detection unit 2101.

In step S304, if it is judged that the reference vector does not coincide with the global motion vector GMV, the local motion vector calculation unit 214 updates the minimum SAD value MinSAD and its reference block position (i.e. reference vector) (step S305). That is, the local motion vector calculation unit 214 compares the minimum SAD value MinSAD maintained at that time with the newly calculated SAD value, and maintains the SAD value that is smaller than the other as the minimum SAD value MinSAD. Simultaneously, the local motion vector calculation unit 214 updates the reference block position (i.e. reference vector) so that the reference block position appears as the minimum SAD value.

Then, the control unit 215 judges whether the block matching with the target block for all the reference blocks in the search range is completed (step S308).

If it is judged that the processing of all the reference blocks in the search region is not completed in step S308, the control unit 215 sets the next reference block (step S309). Then, the control unit goes back to step S302 and repeats the process of the step S302 and the subsequent steps.

On the other hand, if it is judged that the reference vector coincides with the global motion vector GMV in step S304, the local motion vector calculation unit 214 subtracts the offset value OFS from its SAD value SAD_GMV (step S306). Then, the local motion vector calculation unit 214 sets the result of subtraction as the SAD value MinSAD_G after correction, and maintains its reference block position (i.e. reference vector=global motion vector GMV) (step S307).

Then, the local motion vector calculation unit 214 goes to step S308, and judges whether the processing of all the reference blocks in the search region is completed.

If it is judged that the processing of all the reference blocks in the search region is completed in step S308, the local motion vector calculation unit 214 detects and supplies the local motion vector LMV and the minimum SAD value MinSAD to the comparison decision unit 2104. In addition, the local motion vector calculation unit 214 also supplies the SAD value MinSAD_G after correction to the comparison decision unit 2104 (step S311 in FIG. 34).

Then, the comparison decision unit 2104 of the background/moving object decision unit 210 judges whether the minimum SAD value MinSAD is smaller than a predetermined threshold value TH1 (step S312). The process of this step S312 is provided to cope with the following problems.

For example, if a block corresponding to the moving object part on the target image is lost by movement or greatly deformed on the reference image, the matching may not be performed with any reference block in the search region with the target block.

In this case, the SAD values in the SAD table become the same large value, and are close to values which are different from the minimum SAD value MinSAD. Under these circumstances, the SAD value MinSAD_G after correction, which is obtained by subtracting the offset value OFS from the SAD value in the reference vector that coincides with the global motion vector GMV, becomes inevitably smaller than the minimum SAD value MinSAD to cause an erroneous detection as the background part.

In order to solve this problem, in the embodiment of the present invention, the process of correcting the SAD value in the reference vector that coincides with the global motion vector GMV and deciding the degree of background coincidence is not performed when the minimum SAD value MinSAD is larger than the threshold value TH1.

Accordingly, if it is judged that the minimum SAD value MinSAD is larger than the threshold value TH1 in step S312, the comparison decision unit 2104 does not decide the degree of background coincidence by using the global motion vector GMV, and sets the hit rate β to 0.25 (step S313). The reason whey the hit rate β is not set to 0 is that a block that coincides with the background may exist even in the target block indicating the SAD value larger than the threshold value TH1.

Then, the comparison decision unit 2104 outputs the recalculated local motion vector LMV to the motion compensated image generation unit 22 as the motion vector for NR process of the corresponding target block (step S314).

The control unit 215 judges whether the processing of all the target blocks in the target frame is completed (step S320), and if not, the control unit sets the next target block (step S321). Then, the control unit returns to the step S302, and repeats the processing of the step S302 and the subsequent steps under the control of the control unit 215.

If it is judged that in step S312 the minimum SAD value MinSAD is smaller than the threshold value TH1, the comparison decision unit 2104 compares the minimum SAD value MinSAD with the SAD value MinSAD_G after correction (step S315). Then, the comparison decision unit 2104 judges whether the minimum SAD value MinSAD is larger than the SAD value MinSAD_G after correction, i.e. MinSAD≧MinSAD_G (step S316), and if not, it judges that the target block does not coincide with the background, and sets the hit rate β to 0 (step S317).

After the step S317, it proceeds to step S314, and the comparison decision unit 2104 goes to step S314, and outputs the re-calculated local motion vector LMV to the motion compensated image generation unit 22 as the motion vector for NR process of the corresponding target block. Then, it returns to step S320, and repeats the processing of step S320 and the subsequent steps.

On the other hand, in step S316, if it is judged that the minimum SAD value MinSAD is larger than the SAD value MinSAD_G after correction, i.e. MinSAD≧MinSAD_G, the comparison decision unit 2104 decides that the target block has a high degree of background coincidence, and sets the hit rate β 0.75 (step S318). Then, the comparison decision unit 2104 outputs the global motion vector GMV to the motion compensated image generation unit 22 as the motion vector for NR process of the corresponding target block (step S319).

After the step S319, it proceeds to step S320, and judges whether the control unit 215 judges whether the processing of all the target blocks in the target frame is completed. If it is judged that the processing of all the target blocks in the target frame is not completed in step S320, the control unit 215 sets the next target block (step S321), and then goes back to step S302.

On the other hand, if it is judged that the processing of all the target blocks in the target frame is completed in step S320, the control unit 215 terminates the background/moving object decision process.

In the embodiment of the present invention, the corrected SAD value MinSAD_G is obtained by subtracting the offset value OFS from the SAD value SAD_GMV of the global motion vector GMV, and compares the corrected SAD value with the minimum SAD value MinSAD. However, the value obtained by adding the offset value OFS to the minimum SAD value MinSAD of the local motion vector LMV (i.e. MinSAD+OFS) is completely equivalent to the SAD value SAD_GMV of the global motion vector GMV.

Second Example

SAD Value Correction by Gain Multiplication

According to the first example, the SAD value SAD_GMV for the reference block of the reference vector position that coincides with the global motion vector GMV is corrected by addition of the offset value OFS.

In the same manner, the SAD value SAD_GMV can also be corrected by multiplication of a gain g in consideration of the image noise, instead of the offset addition. In this case, the SAD value SAD_GMV is multiplied by the gain g in a smaller direction (where, g<1). If the correlation value is increased in accordance with the strength of the correlation, the gain g becomes g>1.

In the second example, the SAD value MinSAD_G after correcting the SAD value SAD_GMV in the global motion vector GMV is $$MinSAD\_G = SAD\_GMV \times g \quad \text{(Eq. 13)}$$

<Configuration Example of Adding Rate Calculation Unit 24>

In the embodiment of the present invention, the adding rate calculation unit 24 obtains the adding rate α (0≦α≦1) in the unit of a pixel. Then, as described above, the adding rate α is calculated in accordance with the difference in pixel unit between the target image and the motion compensated image and the hit rate β. Accordingly, to the adding rate calculation unit 24, the hit rate β, data TGv of the target image and data MCV of the motion compensated image are supplied.

Here, if there is a great difference in pixel unit between the target image and the motion compensated image, the corresponding part seems to be a motion part, and thus the adding rate α should be lowered. However, if there is no difference in the pixel unit or the difference is small, the adding rate α may be heightened. On the other hand, if it is unclear whether the target block corresponds to a background still image part or a moving object part, as described above, it is necessary to suppress the adding rate α relatively low so that the double exposure image state becomes invisible.

However, in the embodiment of the present invention, since the degree of coincidence as the background still image part is obtained by the hit rate β, the adding rate α should be heightened as the hit rate β and the degree of background coincidence become high.

In addition, in the embodiment of the present invention, since the image noise depends upon the brightness of the image, the adding rate calculation unit 24, with respect to the difference in pixel unit between the target image and the motion compensated image, considers the noise according to the brightness of the corresponding image. That is, if the difference in pixel unit between the target image and the motion compensated image is within the noise range, it is judged that the actual difference between both images is small. If the difference in pixel unit is larger than the noise range, it is judged that the actual difference between both images is large.

In consideration of the noise, the adding rate calculation unit 24 receives the maximum illumination value MaxTAR and the minimum illumination value MinTAR from the motion vector calculation unit 21. The adding rate calculation unit 24 calculates the brightness of each target block, i.e. illumination Lx, from the maximum illumination value MaxTAR and the minimum illumination value MinTAR.

To the adding rate calculation unit 24, in the embodiment of the present invention, a gain GA for addition control is supplied so as to control the adding degree of the adding rate calculation unit 24 from an outside. The value of the gain GA for addition control may be selected by a user among prepared gain values. The value of the gain GA for addition control may be determined in accordance with the ISO sensitivity of the captured image. In the latter, for example, the brightness of an image is determined and decided the value of gain GA for addition control in accordance with the exposure value or shutter speed during an image pickup operation. That is, in the case of a bright image, the noise becomes visible, and thus the gain is lowered to reduce the adding rate, while in the case of a dark image, the gain is set to a high value to heighten the adding rate.

Figure 35:
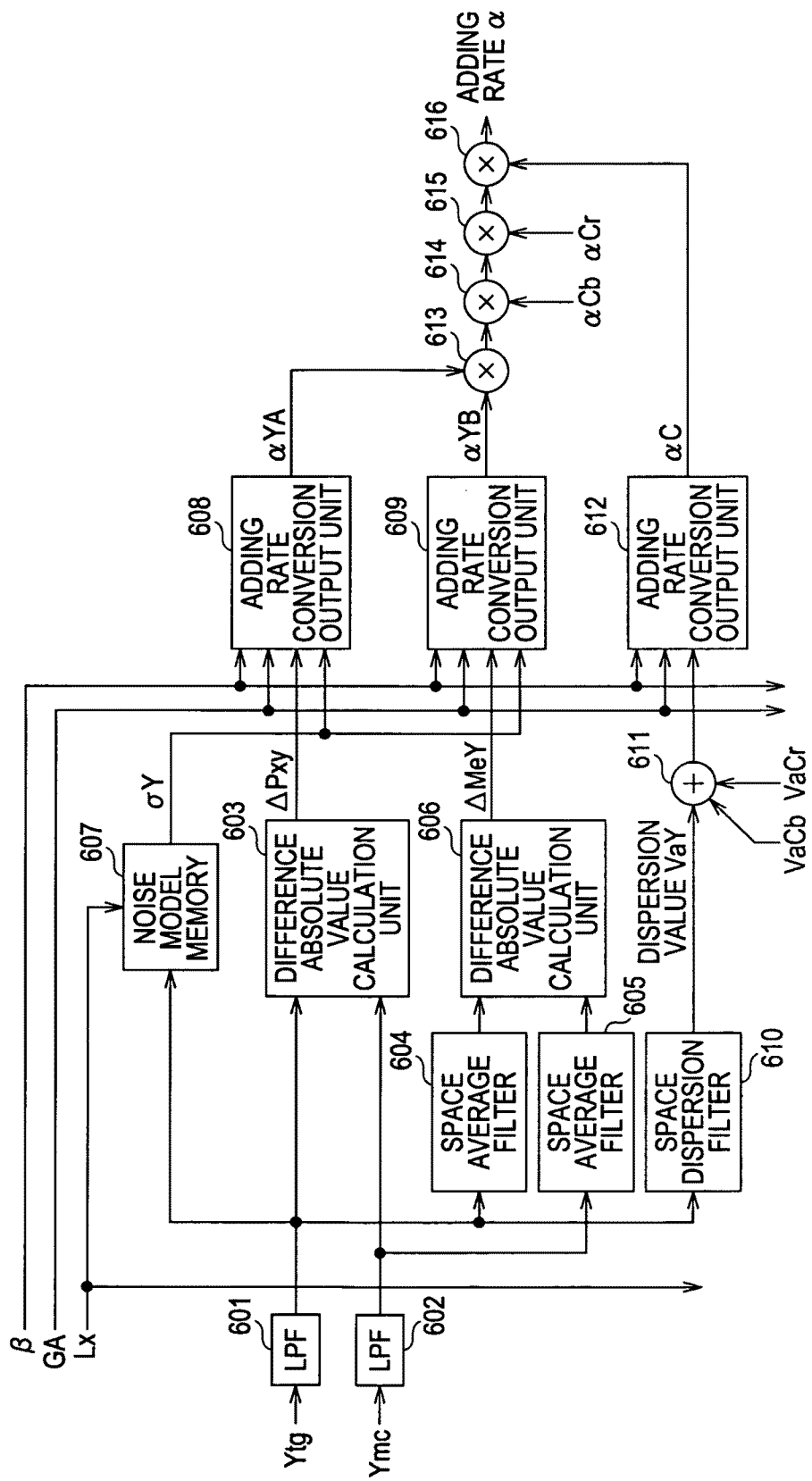
FIG. 35 is a block diagram illustrating a part of the configuration example of an adding rate calculation unit in an image processing device according to an embodiment of the present invention.
Figure 36:
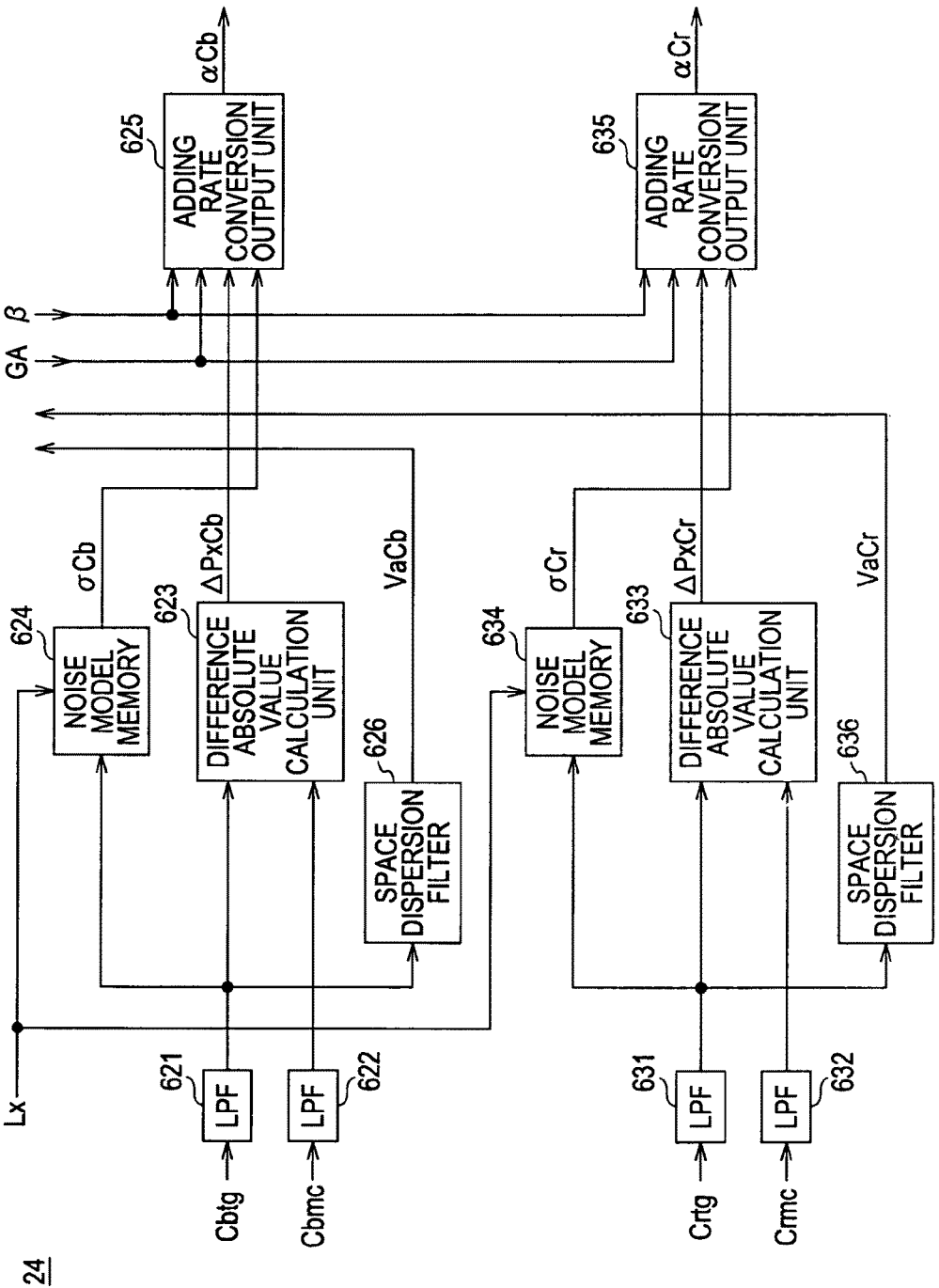
FIG. 36 is a block diagram illustrating a part of the configuration example of an adding rate calculation unit in an image processing device according to an embodiment of the present invention.

The hardware construction example of the adding rate calculation unit 24 according to an embodiment of the present invention is illustrated in FIGS. 35 and 36. In an example of FIGS. 35 and 36, the data TGv of the target image and the data MCv of the motion compensated image are separately performed with respect to the illumination component and the chrominance component.

FIG. 35 illustrates a illumination component processing part in the adding rate calculation unit 24. Referring to FIG. 35, the adding rate calculation process with respect to the illumination component will be first described.

Illumination data Ytg among data TGv of the target image is supplied to an absolute difference value calculation unit 603 through a low pass filter 601. In addition, illumination data Ymc among data MCv of the motion compensated image is supplied to the absolute difference value calculation unit 603 through a low pass filter 602.

The absolute difference value calculation unit 603 calculates a pixel absolute difference value $\Delta P \times Y$ of the illumination data Ytg and the illumination data Ymc, and supplies the calculated pixel absolute difference value $\Delta P \times Y$ to an adding rate conversion output unit 608.

The illumination data Ytg having passed through the low pass filter 601 is supplied to a space mean filter 604. On the other hand, the illumination data Ymc having passed through the low pass filter 602 is supplied to a space mean filter 605.

The space mean filters 604 and 605 obtain a mean value Mtg of eight pixels around a pixel (referred to as a "noticed pixel"), from which the absolute difference value calculation unit 603 obtains the pixel difference, and a mean value Mmc of its nine pixels. The space mean dispersion filters 604 and 605 supply the obtained mean values Mtg and Mmc to the absolute difference value calculation unit 606.

The absolute difference value calculation unit 606 calculates a mean absolute difference value $\Delta MeY$ of the mean value Mtg and the mean value Mmc, and supplies the calculated mean absolute difference value $\Delta MeY$ to the adding rate conversion output unit 609.

Figure 37:
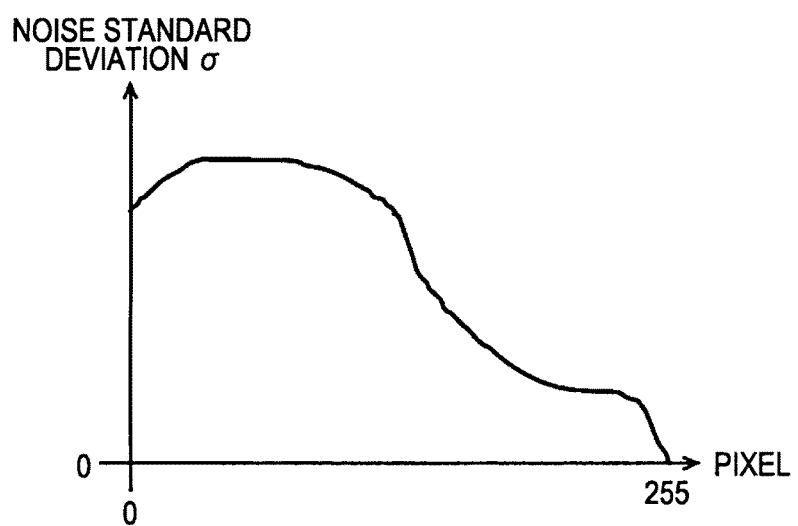
FIG. 37 is a diagram illustrating an example of the configuration of an adding rate calculation unit according to an embodiment of the present invention.

In this example, a noise model memory 607 for the illumination component is installed. In the noise model memory 607, a noise standard deviation $\sigma$ for the illumination value of the pixel value is pre-calculated and stored. That is, on the assumption that the horizontal axis represents the illumination value of the pixel value, and the vertical axis represents the noise standard deviation $\sigma$, the noise standard deviation $\sigma$ may be, for example, as illustrated in FIG. 37. With respect to a bright pixel, the noise standard deviation $\sigma$ becomes small, while with respect to a dark pixel, the noise standard deviation $\sigma$ becomes large, as illustrated in FIG. 37.

The characteristic diagram of FIG. 37 is not for raw data, but for captured data after a gamma correction is performed.

Since the noise model differs in accordance with the brightness of the image, plural noise models according to the illumination Lx of the image are stored in the noise model memory 607.

As described above, the illumination Lx for each target block obtained from the maximum illumination value Max-TAR and the minimum illumination value MinTAR is supplied in the noise model memory 607 by selecting the noise models in accordance with the illumination. Accordingly, it is determined by the illumination Lx which noise model among the noise models stored in the memory 607 is to be used.

The illumination data Ytg of the target image data TGv having passed through the low pass filter 601 is supplied to the noise model memory 607, and the noise standard deviation $\sigma Y$ determined by the illumination Lx and the illumination data Ytg is obtained from the noise model memory 607. This noise standard deviation $\sigma Y$ is supplied to the adding rate conversion output units 608 and 609.

To the adding rate conversion output units 608 and 609, the hit rate $\beta$ from the motion vector calculation unit 21 and the gain GA from an outside are supplied.

The adding rate conversion output unit 608 outputs the adding rate $\alpha YA$ based on the pixel absolute difference value $\Delta P \times Y$ by using a transformation function having the pixel absolute difference value $\Delta P \times Y$, the noise standard deviation $\sigma Y$, the hit rate $\beta$, and the gain GA as transformation parameters.

In addition, the adding rate conversion output unit 609 outputs the adding rate $\alpha YB$ based on the mean absolute difference value $\Delta MeY$ by using a transformation function having the mean absolute difference value $\Delta MeY$, the noise standard deviation $\sigma Y$, the hit rate $\beta$, and the gain GA as transformation parameters.

Figure 38:
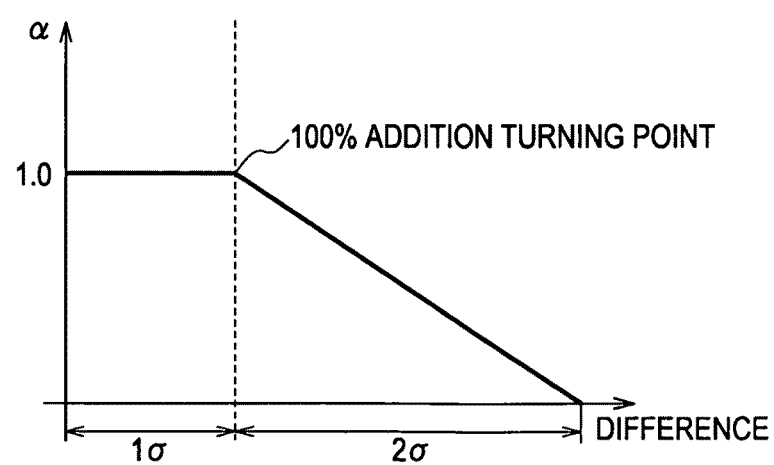
FIG. 38 is a diagram illustrating an example of the configuration of an adding rate calculation unit according to an embodiment of the present invention.

As illustrated in FIG. 38, the adding rate conversion output units 608 and 609 basically determines the adding rate $\alpha$ from the noise standard deviation $\sigma$ and the difference value. In the adding rate conversion output units 608 and 609, the noise standard deviation $\sigma$ is the noise standard deviation $\sigma Y$ from the noise model memory 607, the difference value includes the pixel absolute difference value $\Delta P \times Y$ and the mean absolute difference value $\Delta MeY$, and the output adding rate $\alpha$ includes the adding rates $\alpha YA$ and $\alpha YB$.

In the embodiment of the present invention, as illustrated in FIG. 38, if the difference value is equal to or lower than a specified first threshold value, which can be set as a multiple of the noise standard deviation $\sigma$, the target image is considered to be a background image part, and thus the adding rate $\alpha$ becomes the maximum value, i.e. $\alpha=1$.

In the range of (first threshold value<difference value<second threshold value), the difference value is a part which may not judge which of the background part and the moving object part, and as shown in FIG. 38, the adding rate $\alpha$ is linearly decreased as the difference value is increased. In the range of (difference value $\geq$ second threshold value), it is judged as the moving object part, and the adding rate $\alpha$ becomes a minimum value ($\alpha=0$).

In the case in which the degree of background coincidence of the target block is not clear, as described above, in order to alleviate the state, such as double exposure in the moving object part, the first threshold value becomes a safe-anticipation value, and the adding rate $\alpha$ is wholly suppressed. That is, if the background image part is known, the first threshold value and the second threshold value are set as large values, so that image addition can be performed at the adding rate as high as possible.

In the case in which the degree of background coincidence is not clear, it is necessary to consider alleviation of the state, such as double exposure in the moving object part, with respect to the overall target block. For this reason, as shown in the example of FIG. 38, the first threshold value is let to be one time ($1\sigma$) of standard variation $\sigma$, and the second threshold value is let to be three times ($3\sigma$) of standard variation $\sigma$.

On the other hand, in this embodiment, the degree of background coincidence is calculated as a hit rate $\beta$ which is the index value with respect to each target block, as described above. Accordingly, by using the index value $\beta$ as the degree of background coincidence, it is possible to add as higher adding rate in the background still image part.

Figure 39:
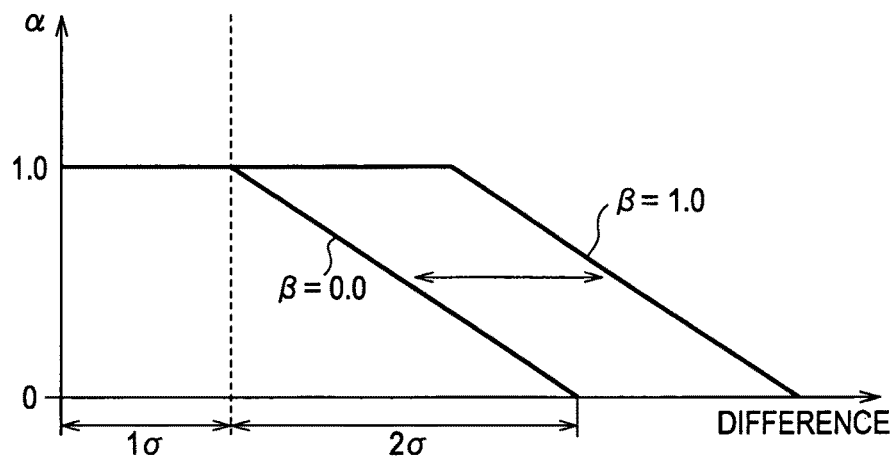
FIG. 39 is a diagram illustrating an example of the configuration of an adding rate calculation unit according to an embodiment of the present invention.

In the case of considering the hit rate $\beta$, an adding rate conversion characteristic in adding rate conversion output units 608 and 609 is shown in FIG. 39.

That is, in the example of FIG. 39, the first threshold value with respect to the difference value is let to be changed in accordance with the hit rate β. That is, if the hit rate β is minimum, that is, β=0 (moving object part), the first threshold value is let be one time (1σ) of the standard variation σ, similar to the example of FIG. 39. If the hit rate β is β>0, the first threshold value is changed to be larger depending upon the value of the hit rate β.

In the example of FIG. 39, a slope of decrescent straight line of the adding rate α as the difference value is larger than the first threshold value is constant. Accordingly, in the example of FIG. 39, the second threshold value is automatically changed in accordance with the change of the first threshold value.

Figure 40:
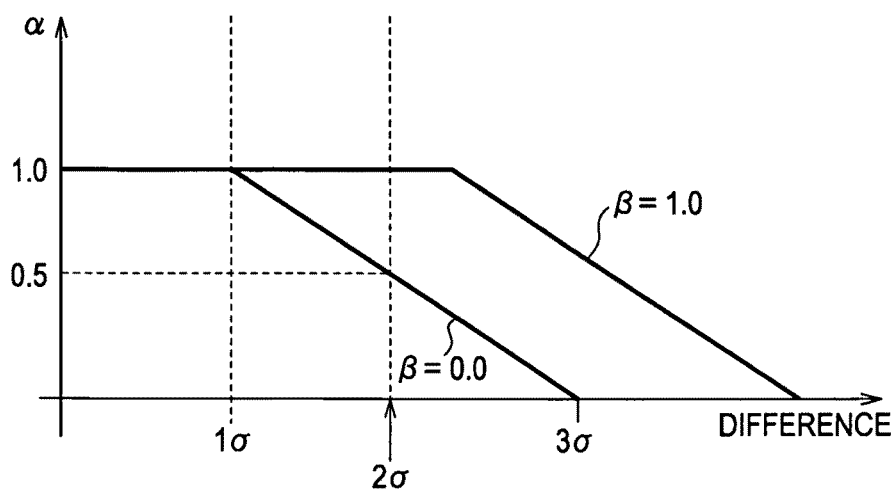
FIG. 40 is a diagram illustrating an example of the configuration of an adding rate calculation unit according to an embodiment of the present invention.

For example, as shown in FIG. 40, in the case not taking consideration of the hit rate β of the example of FIG. 38 (β=0), when the difference value is 2σ, the adding rate α is consistently 0.5. By contrast, in the case of taking consideration of the hit rate, as shown in FIG. 40, the adding rate α is 1 at the background still image part of which the hit rate β=1.0, and thus it is added at the maximum adding rate.

As such, since the larger adding rate α is set at the background still image part in accordance with the hit rate β, the desired effect of noise reduction is obtained. Further, since the adding rate α can be set to be low at the moving object part in accordance with the hit rate β, the effect of reducing the state of double exposure can be maintained.

In the above-described example, only the first threshold value is changed in accordance with the hit rate β, and the slope of decrescent straight line of the adding rate α as the difference value is larger than the first threshold value is constant. However, the second threshold value may be changed in accordance with the hit rate β, and the slope of the decrescent straight line may be changed.

Next, the contribution of a gain GA in the adding rate conversion output units 608 and 609 will be described.

The gain GA is a parameter to further change and control the adding rate α calculated by this way. As described above, the gain GA is set by a user or in accordance with brightness of the image which is caused by the imaging conditions. For example, in the case in which the gain is set by the user, the gain GA is set to be large in order to obtain the larger effect of the noise reduction by NR addition. Then, the adding rate α calculated by the above-described way is changed and controlled by a value related to the gain GA.

FIG. 41 is a diagram illustrating a relationship of the gain GA, the hit rate β and the adding rate α in the configuration of the adding rate conversion output units 608 and 609. In FIG. 41, the adding rate α is a reference adding rate α0 in the case in which the hit rate β=0, and the adding rate α is represented based on the reference adding rate α0.

In the example of FIG. 41, the gain GA can be changed and set in four levels of GA=0, GA=1, GA=2 and GA=3 by the user or the imaging conditions. Also, the hit rate β can be set in four levels of β=0, β=0.25, β=0.5 and β=1.0.

The adding rate α equals to multiplication of reference adding rate α0 and a coefficient K (K≧1) as shown in FIG. 41, but the coefficient K is a multiple in accordance with combination of the gain GA and the hit rate β.

In this way, the adding rate conversion output unit 608 outputs the output adding rate αYA based on the pixel difference value of the illumination component from a pixel difference absolute value ΔP×Y, a noise standard variation αY, the hit rate β, and the gain GA. Further, the adding rate conversion output unit 608 outputs the output adding rate αYB based on the pixel difference value of the illumination component from an average difference absolute value ΔMeY, a noise standard variation αY, the hit rate β, and the gain GA.

As to a chromatic aberration signal component, an average difference value is not calculated, and only the pixel difference absolute value is calculated, so that the adding rate based on the chromatic aberration component is calculated by the same method as the illumination component.

FIG. 36 is a section of processing the chromatic aberration component in the adding rate calculation unit 24. The process of calculating the adding rate for the chromatic aberration component will be described with reference to FIG. 36.

That is, chromatic aberration data Cbtg of blue color among data TGv of the target image is supplied to the difference absolute value calculation unit 623 via a low-pass filter 621. Further, chromatic aberration data Cbmc of blue color among data MCv of the motion compensated image is supplied to the difference absolute value calculation unit 623 via a low-pass filter 622. The difference absolute value calculation unit 623 calculates the pixel difference absolute value ΔP×Cb of the chromatic aberration data Cbtg and the chromatic aberration data Cbmc with respect to each pixel, and supplies the calculated pixel difference absolute value ΔP×Cb to an adding rate conversion output unit 625.

In the same manner as the illumination component, a noise model memory 624 for the blue color difference component of the pixel value is installed, and a noise standard deviation σ of the blue color difference component value of the pixel value is pre-calculated and stored in the noise model memory 624. In the same manner as the illumination component, plural noise models according to the illumination Lx of the image are stored in the noise model memory 624.

The illumination Lx of every target block and the chromatic aberration data Cbtg of the target image data TGv through the low-pass filter 621 are supplied to the noise model memory 624. Accordingly, the noise standard variation σCb determined by the illumination Lx and the chromatic aberration data Cbtg is obtained from the noise model memory 624, and then is supplied to the adding rate conversion output unit 625.

Further, the adding rate conversion output unit 625 is supplied with the hit rate β from the motion vector calculation unit 21 and the gain GA from the exterior.

The adding rate conversion output unit 625 has the same configuration as that of the adding rate conversion output units 608 and 609, and obtains the adding rate αCb determined by combination of the pixel difference absolute value ΔP×Cb, the noise standard variation σCb, the hit rate β and the gain GA.

Similarly, chromatic aberration data Crtg of red color among data TGv of the target image is supplied to the difference absolute value calculation unit 633 via a low-pass filter 631. Further, chromatic aberration data Crmc of red color among data MCv of the motion compensated image is supplied to the difference absolute value calculation unit 633 via a low-pass filter 632. The difference absolute value calculation unit 633 calculates the pixel difference absolute value ΔP×Cr of the chromatic aberration data Crtg and the chromatic aberration data Crmc with respect to each pixel, and supplies the calculated pixel difference absolute value ΔP×Cr to an adding rate conversion output unit 635.

Similar to the case of the illumination component, a noise model memory 624 for the chromatic aberration component of red color of the pixel value is installed, and the noise model memory 634 is stored with the noise standard variation σ for the red color chromatic aberration component of the pixel value which has been previously calculated. Similar to the case of the illumination component, the noise model memory 634 is stored with a plurality of noise models according to the illumination Lx of the image.

The illumination Lx and the chromatic aberration data Crtg of the target image data TGv through the low-pass filter 631 every target block are supplied to the noise model memory 634. Accordingly, the noise standard variation σCr determined by the illumination Lx and the chromatic aberration data Crtg is obtained from the noise model memory 634, and then is supplied to the adding rate conversion output unit 635.

Further, the adding rate conversion output unit 635 is supplied with the hit rate β from the motion vector calculation unit 21 and the gain GA from the exterior.

The adding rate conversion output unit 635 has the same configuration as that of the adding rate conversion output units 608 and 609, and obtains the adding rate αCr determined by combination of the pixel difference absolute value ΔP×Cr, the noise standard variation σCr, the hit rate β and the gain GA.

In addition, in this embodiment, the adding rate is obtained based on a pixel distribution value of the target image. The distribution value is obtained with respect to an attention pixel (local pixel) and, for example, 8 pixels around the attention pixel. The distribution value is obtained for each of the illumination component and the chromatic aberration component. Then, the adding rate is calculated from all the obtained distribution values.

That is, as shown in FIG. 35, the illumination data Ytg of the image data TGv of the target block is supplied to a space dispersion filter 610 via the low-pass filter 601. A distribution value VaY for 9 pixels, in total, of the attention pixel (local pixel) and, for example, 8 pixels around the attention pixel is obtained from the space dispersion filter 610.

Further, as shown in FIG. 36, the chromatic aberration data Cbtg of blue color in the image data TGv of the target block is supplied to a space dispersion filter 626 via the low-pass filter 621. A distribution value VaCb for 9 pixels, in total, of the attention pixel (local pixel) and, for example, 8 pixels around the attention pixel is obtained from the space dispersion filter 626.

Moreover, the chromatic aberration data Crtg of red color in the image data TGv of the target block is supplied to a space dispersion filter 636 via the low-pass filter 631. A distribution value VaCr for 9 pixels, in total, of the attention pixel (local pixel) and, for example, 8 pixels around the attention pixel is obtained from the space dispersion filter 636.

The distribution values VaY, VaCb and VaCr is added by an adder 611, as shown in FIG. 35, and then is supplied to the adding rate conversion output unit 612. Further, the adding rate conversion output unit 612 is supplied with the hit rate β from the motion vector calculation unit 21 and the gain GA from the exterior.

An object of the adding rate αC obtained from the adding rate conversion output unit 612 is to suppress the adding rate in the case in which the image of the target block has small texture components and a variation of the illumination level is smooth (in the case of gradation). In the treatment of the block-divided image as in this embodiment, it takes into consideration that a block boundary is likely to be noticed by a visible effect of a human, and in particular, in the case in which the variance of the illumination level is smooth, it is particularly likely to be noticed.

In order to achieve the object, as the distribution value in the block is low, the adding rate should be low. The adding rate conversion output unit 612 of the embodiment determines the output adding rate according to the distribution value of each step, as shown in FIG. 42A, by taking the distribution value to an abscissa axis and simultaneously dividing the distribution value into several steps for every predetermined step width.

Figures 42A, 42B, 42C:
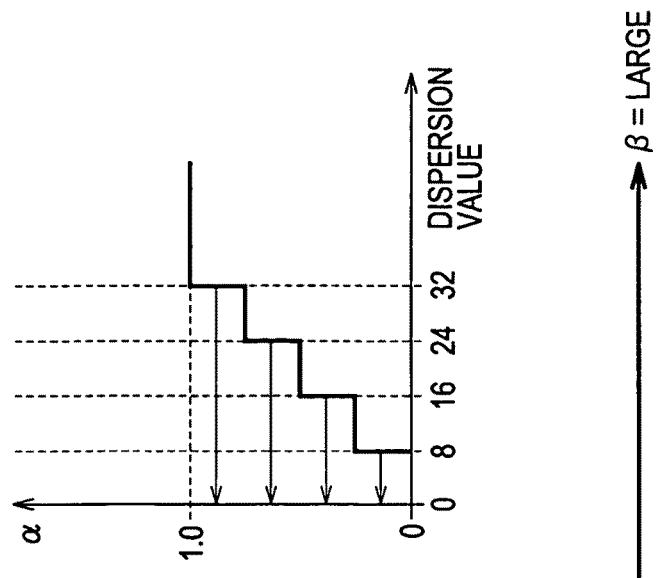
FIGS. 42A to 42C are diagrams illustrating examples of the configuration of an adding rate calculation unit according to an embodiment of the present invention.

In the example shown in FIG. 42A, the distribution value is divided into 5 steps for every 8 step width, and the adding rate for the distribution values 0-7 is set as 0.0, the adding rate for the distribution values 8-15 is set as 0.25, the adding rate for the distribution values 16-23 is set as 0.5, the adding rate for the distribution values 24-31 is set as 0.75, and the adding rate for the distribution values 32 or more is set as 1.0.

In the case in which the images overlap each other, the boundary between the blocks is noticed since there are differences between the overlapping images. In other words, since there is no difference between the overlapping images in the background still image part, it is not necessary to suppress the adding rate in accordance with the distribution values.

Therefore, in this embodiment, the adding rate conversion output unit 612 controls the stage width of the distribution value in accordance with the hit rate β, thereby lowering the step width of the distribution value as the hit rate β is high. Consequently, in the background still image part, it is possible to suppress the reduction of the adding rate in accordance with the distribution value, thereby adding it at the adding rate as high as possible.

That is, in the example of FIG. 42, if the hit rate β is a low value, for example, β=0, the step width of the distribution value is 8, as shown in FIG. 42A. If the hit rate β is a value, for example, β=0.5, the step width of the distribution value is 4, as shown in FIG. 42B.

Further, if the hit rate β is 1 which indicates background still image part, the step width of the distribution value is 0, as shown in FIG. 42C. In this instance, the reduction of the adding rate by the distribution value is not performed.

As described above, the adding rate conversion output unit 612 is supplied with the gain GA, and controls the output adding rate by the gain GA. In this instance, the step width of the distribution value is changed and controlled by combination of the hit rate β in accordance with the gain GA.

FIG. 43 is a diagram illustrating a relationship of the gain GA, the hit rate β and the step with the configuration of the adding rate conversion output unit 612. In the example of FIG. 43, the gain GA can be changed and set in four levels of GA=0, GA=1, GA=2 and GA=3 by the user or the imaging conditions. Also, the hit rate β can be set in four levels of β=0, β=0.25, β=0.5 and β=1.0.

In this instance, in the example of FIG. 43, the step width can be achieved by a bit shift operation.

As shown in FIG. 42, in this embodiment, plural steps for the distribution value is set by using the step width in order to calculate the adding rate using the distribution value. Alternatively, plural steps are not set, and the configuration may linear-interpolate the plural steps. Further, the linear interpolation is not performed, and quadratic curve interpolation or cubic curve interpolation may be performed.

As described above, each of the adding rate conversion output units 608, 609, 612, 625 and 635 calculates the adding rate αYA, αYB, αC, αCb, and αCr according to the illumination difference value, the chromatic aberration difference value, the illumination average difference value, and the distribution value, and a value of the hit rate β.

In this embodiment, the adding rate αYA, αYB, αC, αCb, and αCr are configured to obtain the output adding rate α of the adding rate calculation unit 21. That is, as shown in FIG. 35, the adding rate αYA and αYB from the adding rate conversion output units 608 and 609 is multiplied in the multiplier 613, and the multiplied result is supplied to the multiplier 614. The multiplier 614 is supplied with the adding rate αCb from the adding rate conversion output unit 625, which is then multiplied by the multiplied result of the multiplier 613.

The multiplied result of the multiplier 614 is supplied to the multiplier 615. The multiplier 615 is supplied with the adding rate αCr from the adding rate conversion output unit 635, which is then multiplied by the multiplied result of the multiplier 614. Further, the multiplied result of the multiplier 615 is supplied to the multiplier 616. The multiplier 616 is supplied with the adding rate αC from the adding rate conversion output unit 612, which is then multiplied by the multiplied result of the multiplier 615.

Then, the multiplier 616 is obtained with all of the calculated adding rate αYA, αYB, αC, αCb, and αCr, which are output as the output adding rate α of the adding rate calculation unit 24.

In this way, the adding rate calculation unit 24 calculates the adding rate α as a value related to the hit rate β, and then is supplied to the adder 23.

The adder 23 adds the image data TGv of the target block and the image data MCv of the motion compensation block in a pixel unit in accordance with the adding rate α from the adding rate calculation unit 24 every pixel. The added image data from the adder 23 is recorded in the record/playback device unit 5 through the image memory unit 4 and the still image codec unit 16.

Effects of Embodiments

According to the embodiments of the present invention as described above, the lateral chromatic aberration correction is not performed with respect to the whole plural image frames, for which the addition NR process is to be performed, but is performed with respect to only one reference image frame among the plural image frames for which the addition NR process is to be performed. Since the lateral chromatic aberration correction is performed with respect to only one image frame, the processing time can be shortened. Accordingly, even if the lateral chromatic aberration correction is implemented by software, its processing load is reduced, and thus short-time process becomes possible.

In the embodiment of the present invention, the hit rate β, which is the index value of the degree of background coincidence, is used for each block. In a still image part, since the adding rate α can be increased, and thus a large image having a high noise reduction effect can be obtained as an NR image.

On the other hand, in a moving object part, since the adding rate α is reduced, the motion part is prevented from being in a double-exposure image state.

In the embodiment of the present invention, the lateral chromatic aberration correction is performed with respect to the first sheet of image frame, which is the basis of addition, among the plural image frames to be added, and with respect to the second and subsequent image frames, the lateral chromatic aberration correction is not performed.

Accordingly, there is a growing tendency that a part, in which color distortion (i.e. image deterioration) caused by the lateral chromatic aberration is severe, is decided to be the moving object part, due to a difference between the first image, which is the basis of the addition, and the image in which the lateral chromatic aberration correction is not performed. In this case, the adding rate is lowered. Accordingly, the part, which is decided as a moving object part and in which the color distortion (i.e. image deterioration) caused by the lateral chromatic aberration is severe, is not added to the reference image.

Accordingly, in a part in which the image deterioration is severe, there is a tendency that the image part of the reference image, of which the correction of image deterioration has been performed, is output as it is. Thus, even if the adding process is performed considering the results of addition as the basis of the addition, the third and subsequent images will be the same state.

In the embodiment of the present invention, the lateral chromatic aberration correction is performed with respect to the reference image frame among the plural image frames for which the addition NR process is to be performed, and the output image, to which the correction of image deterioration has been performed and which has a noise reduction effect through the addition NR process, can be obtained as the length of correction processing time is kept in an actually permissible range.

In this case, since the addition NR process is not performed with respect to a part in which the image deterioration due to the color distortion caused by the lateral chromatic aberration is severe, the noise reduction effect of an image in a time direction may deteriorate. However, although the image deterioration caused by the lateral chromatic aberration is liable to be seen at an edge region of the image, the image noise is difficult to be seen at the edge region of the image. Accordingly, even if the noise reduction effect might deteriorate, its evil influence would be lowered.

Other Embodiments and Modifications

Various still picture NR processes are available depending upon in what manner a target image and a reference image are selectively set or in what order different images overlap each other.

Where plural images are to overlap one another, an image to be used as a reference for motion compensation is necessary. In the embodiment as described above, the first captured image is determined as a reference image considering that an image at an instant at which the shutter is operated is an image intended by the image pickup person. In other words, on a photograph captured first when the image pickup person operates the shutter, an image captured later in time is used to carry out overlapping.

In the addition method, an NR image resulted from overlapping the target image and the reference image is used as the next target image, and in the second time image overlapping and subsequent image overlapping, the target image is normally in a state wherein the NR process is applied thereto. The addition method is referred to as a target addition method.

Figure 44:
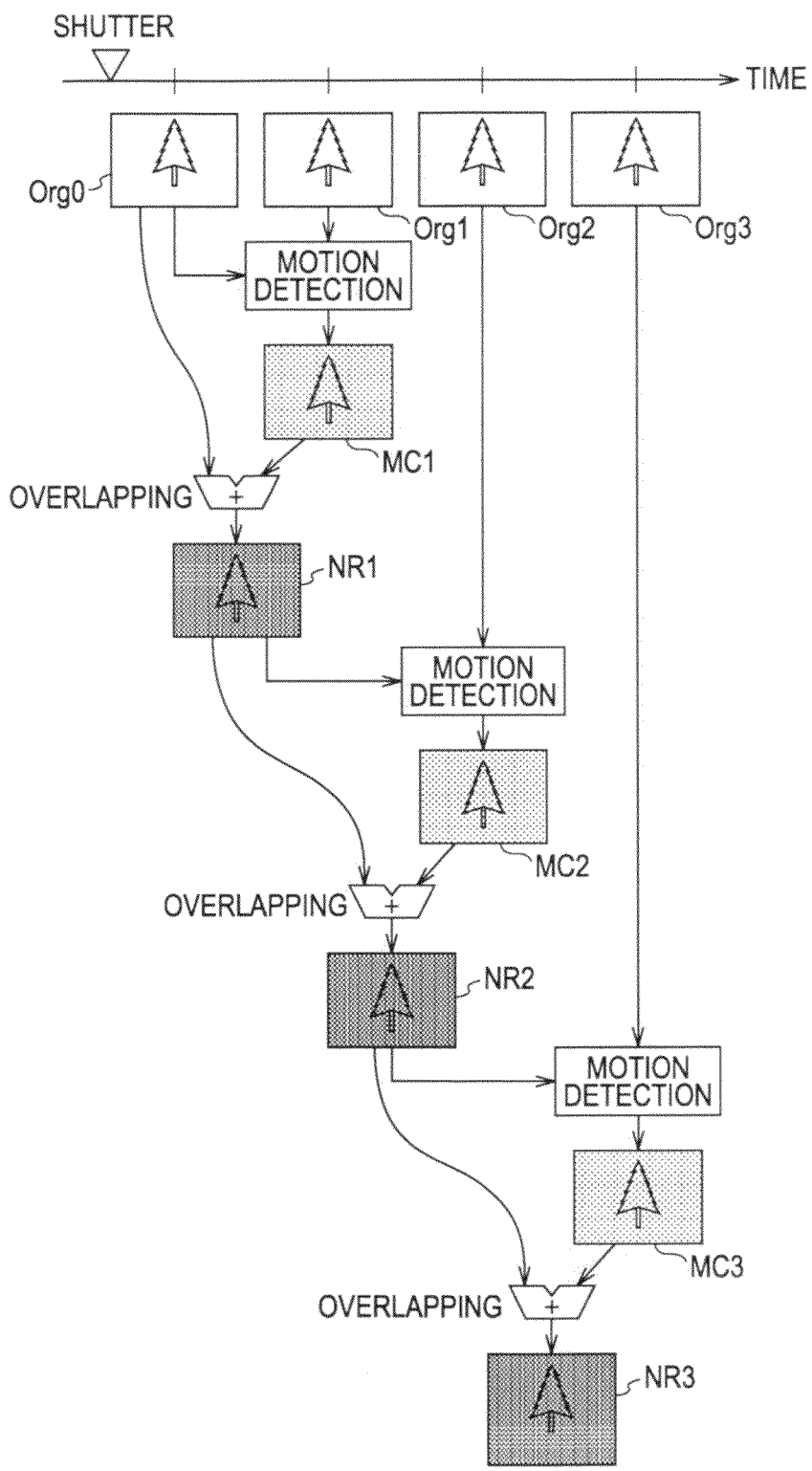
FIG. 44 is a diagram illustrating an example of a plural image adding process in an adding unit according to an embodiment of the present invention.

The concept of target addition type image overlapping is illustrated in FIG. 44, where four images are captured by high-speed successive image pickup.

The captured images are denoted by Org0, Org1, Org2 and Org3 in an ascending order of the time interval from the point of time at which the shutter is depressed. First, the captured image Org0 is set to a target image and the captured image Org1 is set to a reference image, and a motion compensated image MC1 is produced from them, as seen in FIG. 44. That is, first sheet of captured image Org0 of the target image is a reference image frame. Then, the captured image Org0 and the motion compensated image MC1 overlap each other to produce an addition NR image NR1.

Then, the addition NR image NR1 is determined as a target image and the captured image Org2 is determined as a reference image, and a motion compensated image MC2 is produced from them. Then, the addition NR image NR1 and the motion compensated image MC2 overlap each other to produce an addition NR image NR2.

Then, the addition NR image NR2 is determined as a target image and the captured image Org3 is determined as a reference image, and a motion compensated image MC3 is produced from them. Then, the addition NR image NR2 and the motion compensated image MC3 overlap each other to produce an addition NR image NR3 which finally synthesized in one sheet with four sheets of images.

In addition to the target addition method in which the addition NR image is consistently produced from the target image, there is a reference addition method in which the NR image is consistently provided from the reference image, and the present invention can be applied to the reference addition method.

Figure 45:
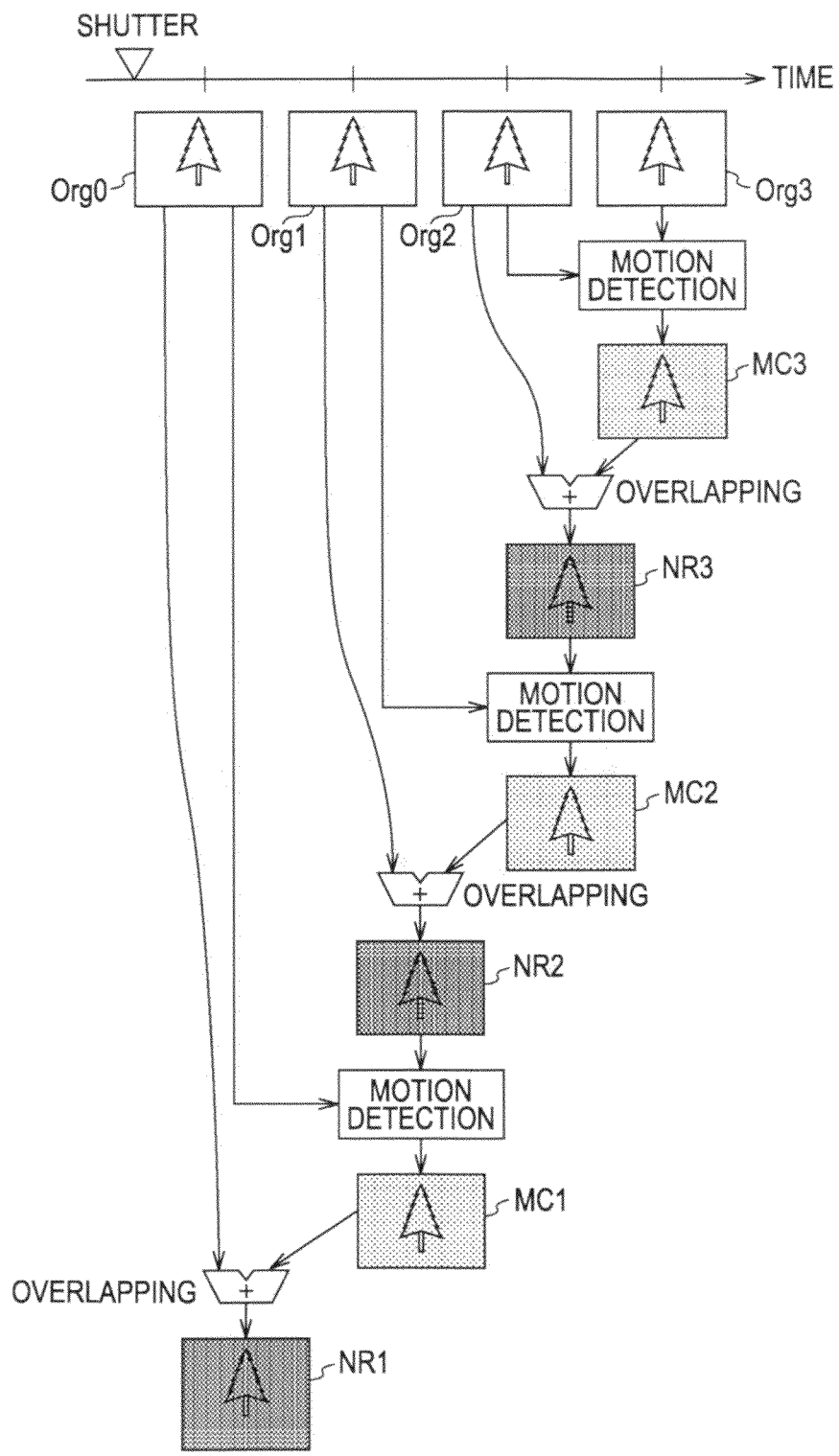
FIG. 45 is a diagram illustrating another example of a plural image adding process in an adding unit according to an embodiment of the present invention.
Figure 46:
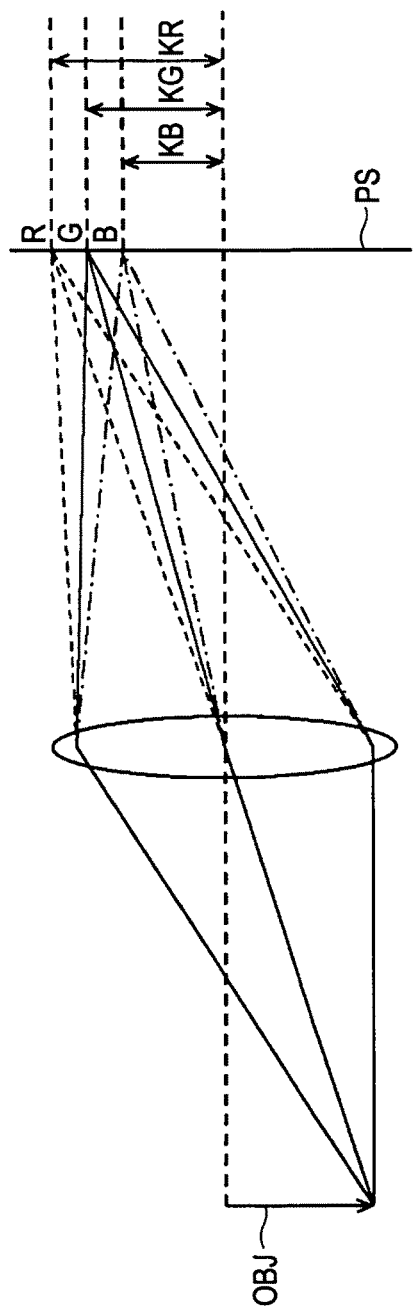
FIG. 46 is a diagram illustrating color distortion based on a lateral chromatic aberration of a lens in an optical pickup system.

FIG. 45 illustrates a concept of the reference addition method where four images are captured by high-speed successive image pickup as an example similarly as in the case of FIG. 44.

First, the captured image Org2 is determined as a target image and the captured image Org3 is determined as a reference image to produce a motion compensated image MC3. Then, the captured image Org2 and the motion compensated image MC3 overlap each other to produce an addition NR image NR3.

Then, the captured image Org1 is determined as a target image and the addition NR image NR3 is determined as a reference image to produce a motion compensated image MC2. The captured image Org1 and the NR image NR3 overlap each other to produce an addition NR image NR2.

Thereafter, the captured image Org0 is determined as a target image and the NR image NR2 is determined as a reference image to produce a motion compensated image MC1. Then, the captured image Org0 and the motion compensated image MC1 are supposed to produce an addition NR image NR1. The addition NR image NR1 is a finally synthesized NR image.

In the above example, the first captured image Org0 which is a final target image is a reference image frame.

Accordingly, in the case of the reference addition method, the first captured image Org0 is subjected to the chromatic aberration of magnification, and the second and later captured images Org1, Org2 and Org3 are not subjected to the chromatic aberration of magnification.

In this instance, only one image of plural image frames which are treated with the addition NR is subjected to the chromatic aberration of magnification, and other image frames are not subjected, so that the compensation processing time for plural image frames are shortened.

However, in the case in which at least one image of plural image frames is not subjected to the chromatic aberration of magnification, the compensation processing time can be shortened as compared with the related art, so that one or more image frames may be subjected to the chromatic aberration of magnification.

In this instance, although the case of the addition NR processing is described for instance as the processing using plural images, the invention is not limited thereto. For example, the invention can be applied to the processing of producing one image of high resolution by using plural images or the processing of producing one image by using the plural images to promote a high dynamic range.

In these processings, there is a reference image frame of plural image frames to be used in the processing. Accordingly, the chromatic aberration of magnification is executed for the one reference image frame, and the chromatic aberration of magnification may not be executed for other image frames of plural image frames used in the processing. Further, the frame to be compensated may be plural frames.

In addition, in the case in which the chromatic aberration of magnification is executed for one captured image frame, the image frame which is subjected to the compensation processing may be not the first frame, but any frame such as the second frame, the third frame or the like. Similarly, in the case in which the chromatic aberration of magnification is executed for plural captured image frames, the position of the image frame is optional. However, in the processing unit using plural image frames, the chromatic aberration of magnification is executed for at least image frame serving as a reference of the processing.

In this instance, the configuration of the magnification chromatic aberration correction unit 14 used in the embodiment is one example, and the invention is not limited thereto.

Further, the image distortion produced on the image by the optical pickup system is not limited to the color distortion based on the chromatic aberration of the pickup lens, and there are various image distortions. The invention may be applied to the case of correcting the image distortions.

That is, as an example of the image distortion produced by the optical pickup system having the pickup lens, the image distortion based on a distortion aberration of the pickup lens is known.

For example, when a square object is captured, if a wide-angle lens is used as the pickup lens, there is an image distortion in which the square is transformed into a wine barrel shape. Further, if a telescopic lens is used as the pickup lens, there is an image distortion in which the square is transformed into a bobbin shape.

Accordingly, for the captured image, it is necessary to carry out the correction processing which eliminates or reduces the image distortion (also referred to as "lens distortion") based on the distortion aberration characteristic of the pickup lens.

Several methods of correcting the lens distortion of the pickup lens have been proposed hitherto, and the image processing method of correcting the captured image signals from the pickup element has been proposed, in addition to a method of studying the configuration of the optical picturing system. Generally, the correction method is carried out by software. The invention is not limited to the chromatic aberration of magnification, and can be applied to a case in which the correction of lens distortion which is executed based on the distortion aberration characteristic of the lens is performed at the former step such as addition NR processing.

In this embodiment, although the image processing device is a capturing device, the image processing device to which the invention is applied is not limited to a product equipped to the pickup device.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising: a process output image generation means generating one sheet of a process output image by performing a process using plural sheets of captured images sequentially output from a pickup device in consideration of one of the plural sheets of captured images as a reference image;

a deterioration correction means correcting image deterioration occurring in the captured images by an optical pickup system including a pickup lens, with respect to the captured images in a front end of the process output image generation means; and a control means capable of controlling whether to perform the correction in the deterioration correction means for every one sheet of the captured images, and controlling to perform the correction with respect to one reference image among the plural sheets of captured images, wherein the deterioration correction is performed by software and corrects for lateral chromatic aberration, and wherein the process output image generation means performs noise reduction in a time direction through addition of the plural sheets of captured images while it compensates for motion between the captured images, and includes an image adding means that performs the addition of the plural sheets of captured images through determination of an adding rate so that the adding rate is lowered in a part in which motion occurs.

* * * * *